(12) United States Patent
Flake et al.

(10) Patent No.: US 12,083,048 B2
(45) Date of Patent: Sep. 10, 2024

(54) METHOD AND APPARATUS FOR EXTRACORPOREAL SUPPORT OF PREMATURE FETUS

(71) Applicant: The Children's Hospital of Philadelphia, Philadelphia, PA (US)

(72) Inventors: Alan Flake, Philadelphia, PA (US); Marcus Davey, Philadelphia, PA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 481 days.

(21) Appl. No.: 17/172,239

(22) Filed: Feb. 10, 2021

(65) Prior Publication Data

US 2021/0161744 A1 Jun. 3, 2021

Related U.S. Application Data

(63) Continuation of application No. 16/848,085, filed on Apr. 14, 2020, now Pat. No. 10,945,903, which is a continuation of application No. 15/736,825, filed as application No. PCT/US2016/038045 on Jun. 17, 2016, now Pat. No. 10,751,238.

(Continued)

(51) Int. Cl.
A61G 11/00 (2006.01)
A01N 1/02 (2006.01)
A61G 10/02 (2006.01)

(52) U.S. Cl.
CPC ............ *A61G 11/00* (2013.01); *A01N 1/0247* (2013.01); *A61G 10/02* (2013.01); *A61G 11/006* (2013.01); *A61G 11/008* (2013.01); *A61G 11/009* (2013.01); *A61G 2203/34* (2013.01); *A61G 2210/30* (2013.01)

(58) Field of Classification Search
CPC ....... A61M 1/3621; A61M 1/28; A61B 5/026; A61B 5/0022; A61B 5/08; A61B 5/02411; A61B 5/1464; A61B 5/14542; A61G 10/026; A61G 10/023; A61G 10/02; A61G 10/04; A61G 10/005; A61G 2203/46; A61G 10/00; A61G 7/05784
See application file for complete search history.

(56) References Cited

U.S. PATENT DOCUMENTS 2,600,240 A 6/1952 Grieb
2,723,660 A 11/1955 Greenberg
(Continued)

FOREIGN PATENT DOCUMENTS

CN 203663028 U 6/2014
CN 103381094 B 1/2015
(Continued)

OTHER PUBLICATIONS

Zapol et al., Artificial Placenta: Two Days of Total Extrauterine Support of the Isolated Premature Lamb Fetus, Oct. 1969, Science 166:617-618.

(Continued)

*Primary Examiner* — Christine H Matthews
(74) *Attorney, Agent, or Firm* — BakerHostetler

(57) ABSTRACT

A system configured to support growth and development of a premature fetus is disclosed. Specifically, a method and apparatus configured to provide extracorporeal support for premature fetuses is disclosed.

15 Claims, 42 Drawing Sheets

Related U.S. Application Data

(60) Provisional application No. 62/260,251, filed on Nov. 26, 2015, provisional application No. 62/181,861, filed on Jun. 19, 2015.

(56) References Cited

U.S. PATENT DOCUMENTS

| | | | |
|---|---|---|---|
| 4,048,684 | A | 9/1977 | Korner et al. |
| 4,509,505 | A | 4/1985 | Mercey et al. |
| 4,617,912 | A | 10/1986 | Beer et al. |
| 4,796,605 | A | 1/1989 | Sasaki et al. |
| 5,063,924 | A | 11/1991 | Galvan et al. |
| 5,207,639 | A | 5/1993 | Cooper |
| 5,218,958 | A | 6/1993 | Cooper |
| 5,308,310 | A | 5/1994 | Roff et al. |
| 5,494,032 | A | 2/1996 | Robinson et al. |
| 6,611,978 | B1 | 9/2003 | Schmidt et al. |
| 8,333,686 | B2 | 12/2012 | Marseille et al. |
| 10,085,907 | B2 | 10/2018 | Flake et al. |
| 2001/0033813 | A1 | 10/2001 | Filho et al. |
| 2002/0069877 | A1 | 6/2002 | Villareal et al. |
| 2004/0133064 | A1 | 7/2004 | Castillon et al. |
| 2004/0193096 | A1 | 9/2004 | Cooper |
| 2005/0056787 | A1 | 3/2005 | Cong et al. |
| 2005/0124850 | A1 | 6/2005 | Mackin |
| 2006/0247678 | A1 | 11/2006 | Weisenburgh et al. |
| 2007/0010005 | A1 | 1/2007 | Sitzmann |
| 2008/0014622 | A1 | 1/2008 | Federspiel et al. |
| 2008/0274546 | A1 | 11/2008 | Kabayama et al. |
| 2009/0149776 | A1* | 6/2009 | Adams .......... A61B 5/20 600/584 |
| 2010/0028979 | A1* | 2/2010 | Faulkner ........ A61M 1/3639 435/284.1 |
| 2010/0101657 | A1 | 4/2010 | Morley et al. |
| 2010/0168502 | A1 | 7/2010 | Delaporte et al. |
| 2010/0204652 | A1 | 8/2010 | Morrissey et al. |
| 2011/0125010 | A1 | 5/2011 | Vaquero et al. |
| 2012/0226258 | A1 | 9/2012 | Otto et al. |
| 2013/0274543 | A1 | 10/2013 | Matsubara et al. |
| 2015/0094751 | A1 | 4/2015 | Chen et al. |
| 2016/0022524 | A1 | 1/2016 | Flake et al. |
| 2016/0270993 | A1 | 9/2016 | Wilden et al. |
| 2017/0128322 | A1 | 5/2017 | Fassihi et al. |
| 2018/0256088 | A1 | 9/2018 | Ray |
| 2019/0380900 | A1 | 12/2019 | Flake et al. |
| 2021/0204820 | A1 | 7/2021 | Zhang et al. |

FOREIGN PATENT DOCUMENTS

| | | | |
|---|---|---|---|
| EP | 0447256 | A2 | 9/1991 |
| EP | 1049510 | B1 | 10/2003 |
| GB | 1082381 | A | 9/1967 |
| JP | 08-294519 | A | 11/1996 |
| JP | 2010-518907 | A | 6/2010 |
| JP | 2013-066756 | A | 4/2013 |
| JP | 2013-233194 | A | 11/2013 |
| JP | 2016-064032 | A | 4/2016 |
| JP | 2016-513571 | A | 5/2016 |
| JP | 2016-537096 | A | 12/2016 |
| JP | 2020-501679 | A | 1/2020 |
| RU | 2376969 | C1 | 12/2009 |
| WO | 98/39039 | A1 | 9/1998 |
| WO | 2006/125955 | A1 | 11/2006 |
| WO | 2013/026148 | A1 | 2/2013 |
| WO | 2013/029044 | A1 | 2/2013 |
| WO | 2014/145494 | | 9/2014 |
| WO | 2016/205622 | A1 | 12/2016 |
| WO | 2018/171905 | A1 | 9/2018 |

OTHER PUBLICATIONS

U.S. Appl. No. 16/848,085, filed Apr. 14, 2020.
Arens et al, "NeonatOx:A Pumpless Extracorporeal Lung Support for Premature Neonates", Artificial Organs, vol. 35, No. 11, 2011, pp. 997-1001.
Arens et al, "NeonatOxiA Pumpless Extracorporeal Lung Support for Premature Neonates", Artificial Organs, vol. 35, No. 11, 2011, pp. 997-1001.
Awad et al. (1995) J. Invest. Surg., 8:21-30.
Awad et al., Pumpless Resipiratory Assistance Using a Membrane Oxygenator as an Artificial Placenta: A Preliminary Study in Newborn and Preterm Lambs, 1995, J. Invest. Surg., 8:21-30.
Behrman et al., ed., Institute of Medicine (US) Committee on Understanding Premature Birth and Assuring Healthy Outcomes; Washington DC: National Academies Press; 2007.
Boston et al. (2013) J. Thorac. Cardiovasc. Surg., 146:e42-e43.
Boston et al., Paracorporeal lung assist device: An innovative surgical strategy for bridging to lung transplant in an infant with severe pulmonary hypertension caused by alveolar capillary dysplasia, Oct. 2013, J. Thorac. Cardiovasc. Surg., 146:e42-e43.
Callaghan et al., Studies in the Development of an Artificial Placenta, 1963, Circulation 27:686-690.
Creasy et al., Determination of Fetal, Placental and Neonatal Blood Volumes in the Sheep, Oct. 1970, Circulation Research, Res., 27:487-494.
Crossley KJ, Nicol MB, Hirst JJ, Walker DW, Thorburn GD. Suppression of arousal by progesterone in fetal sheep. Reproduction, fertility and development. 1997:9(8):767-774.
Crossley KJ, Nicol MB, Hirst JJ, Walker DW, Thorburn GD. Suppression of arousal by progesterone in fetal sheep. Reproduction, fertility and development. 1997; 9(8):767-774.
European Application 14763073, Supplementary European Search Report dated Jan. 4, 2017, 7 pages.
Faber et al., Foetal Placental Blood Flow in the Lamb, 1972, J. Pysiol., 223:375-393.
Hanif et al. (2007) Am. J. Perinatol., 24:501-505.
Hanif et al., Variables that affect the middle cerebral artery peak systolic velocity in fetuses with anemia and intrauterine growth restriction, Sep. 2007, Am. J. Perinatal., 24:501-505.
Hanif et al., Variables that affect the middle cerebral artery peak systolic velocity in fetuses with anemia and intrauterine growth restriction, Sep. 2007, Am. J. Perinatal., 24:501-505.
Huddleston et al., Lung Transplantation in Children, 2002, Ann Surg., 236:270-276.
IJsselstein et al., Long-term outcome of children treated with neonatal extracorporeal membrane oxygenation: Increasing problems with increasing age, Mar. 2014, Semin. Perinatal., 38:114-121.
IJsselstein et al., Long-term outcome of children treated with neonatal extracorporeal membrane oxygenation: Increasing problems with increasing age, Mar. 2014, Semin. Perinatal., 38:114-121.
International Patent Application No. PCT/US2017/065950; Int'l Preliminary Report on Patentability; dated Jun. 27, 2019; 7 pages.
International Search Report and Written Opinion issued in International Application No. PCT/US14/30277 on Aug. 11, 2014.
Kumar et al. (1994) Pediatrics 93:951-955.
Kumar et al., Post extracorporeal membrane oxygenation single photon emission computed tomography (SPECT) as a predictor of neurodevelopmental outcome, Jun. 1994, Pediatrics 93:951-955.
Kuwabara et al. (1989) Artificial Organs 13:527-531.
Kuwabara et al., Artificial Placenta: Long-Term Extrauterine Incubation of Isolated Goat Fetuses, Dec. 1989, Artificial Organs 13:527-531.
Kuwabara et al., Development of Extrauterine Fetal Incubation System Using Extracorporeal Membrane Oxygenator, 1987, Artificial Organs 11:224-227.
Martin et al., Preterm Births—United States, 2006 and 2010, MMWR Surveill. Summ., 62 (Suppl 3): 136-138, Nov. 2013.
Mirua et al. (2012) Pediatr. Res., 72:490-494.
Miura et al, "Novel Modification of an Artificial Placenta: Pumpless Arteriovenous Extracorporeal Life Support in a Premature Lamb Model", Pediatric Research, vol. 72, No. 5, Nov. 2012.
Miura et al., "Novel modification of an artificial placenta: pumpless arteriovenous extracorporeal life support in a premature lamb model.", Pediatric Research., vol. 72, No. 5, (Nov. 19, 2012), URL: https://www.nature.com/articles/pr2012108 Jul. 21, 2014.
Miura et al., Novel modification of an artificial placenta: pumpless arteriovenous extracorporeal life support in a premature lamb model, Pediaric Research, Nov. 19, 2012, [Retrieved on Jul. 21,

(56) References Cited

OTHER PUBLICATIONS

2014]. Retrieved from the internet: <http://www.nature.com/pr/journal/v72/n5/full/pr2012108a/html>.

Papademetriou et al., Wavelet Cross-Correlation to Investigate Regional Variations in Cerebral Oxygenation in Infants Supported on Extracorporeal Membrane Oxygenation, 2013, Adv. Exp. Med. Biol., 765:203-209.

Reoma et al., J. Ped. Surg. (2009) 44:53-59.

Rochow et al, "Artificial Placenta—Lung Assist Devices for Term and Pre-term Newborns With Respiratory Failure", Int. J. Artif. Organs 2013; 36 (6) pp. 377-391.

Rochow et al, "Integrated Microfluidic Oxygenator Bundles for Blood Gas Exchange in Premature Infants", MEMS 2012, Paris, France, Jan. 2012, pp. 957-960.

Schoberer et al, Miniaturization: the clue to clinical application of the artificial placenta, Mar. 2014, Artificial Organs 38:208-14.

Short et al. (1993) Pediatr. Res., 33:289-294.

Short et al., Impairment of Cerebral Autoregulation during Extracorporeal Membrane Oxygenation in Newborn Lambs, 1993, Pediatr. Res., 33:289-294.

Stolar et al. (1988) J. Pediatr. Surg., 23:1163-1168.

Stolar et al., Extracorporeal membrane oxygenation causes significant changes in intracranial pressure and carotid artery blood flow in newborn lambs, Dec. 1988, J. Pediatr. Surg., 23:1163-1168.

Unno et al. (1997) Artificial Organs 21:1239-1246.

Unno et al., An Evaluation of the System to Control Blood flow in Maintaining Goat Fetuses on Arterio-Venous Extracorporeal membrane Oxygenation: A Novel Approach to the Development of an Artificial Placenta, Dec. 1997, Artificial Organs 21:1239-1246.

Unno et al., Development of an Artificial Placenta: Survival of Isolated Goat Fetuses for Three Weeks with Umbilical Arteriovenous Extracroporeal Membrane Oxygenation, Dec. 1993, Artificial Organs 17:996-1003.

Vutskits, L., Cerebral blood flow in the neonate, 2014, Pediatr. Anesth., 24:22-29.

Walker et al. (1996) Crit. Care Med., 24:2001-2006.

Walker et al., Impairment of cerebral autoregulation during venovenous extracorporeal membrane oxygenation in the newborn lamb, Dec. 1996, Crit. Care Med., 24:2001-2006.

Yasufuku et al. (1998) J. Pediatr. Surg., 33:442-448.

Yasufuku et al., Arterio-venous extracorporeal membrane oxygenation of fetal goat incubated in artificial amniotic fluid (Artificial placenta): Influence on lung growth and maturation, Mar. 1998, J. Pediatr. Surg., 33:442-448.

Zapol et al. (1969) Science 166:617-618.

Muller et al., "Pharmacokinetics of Penicillin G in Infants with a Gestational Age of Less than 32 Weeks," Antimicrob. Agents Chemotherap., Oct. 2007, 51(10): 3720-3725.

\* cited by examiner

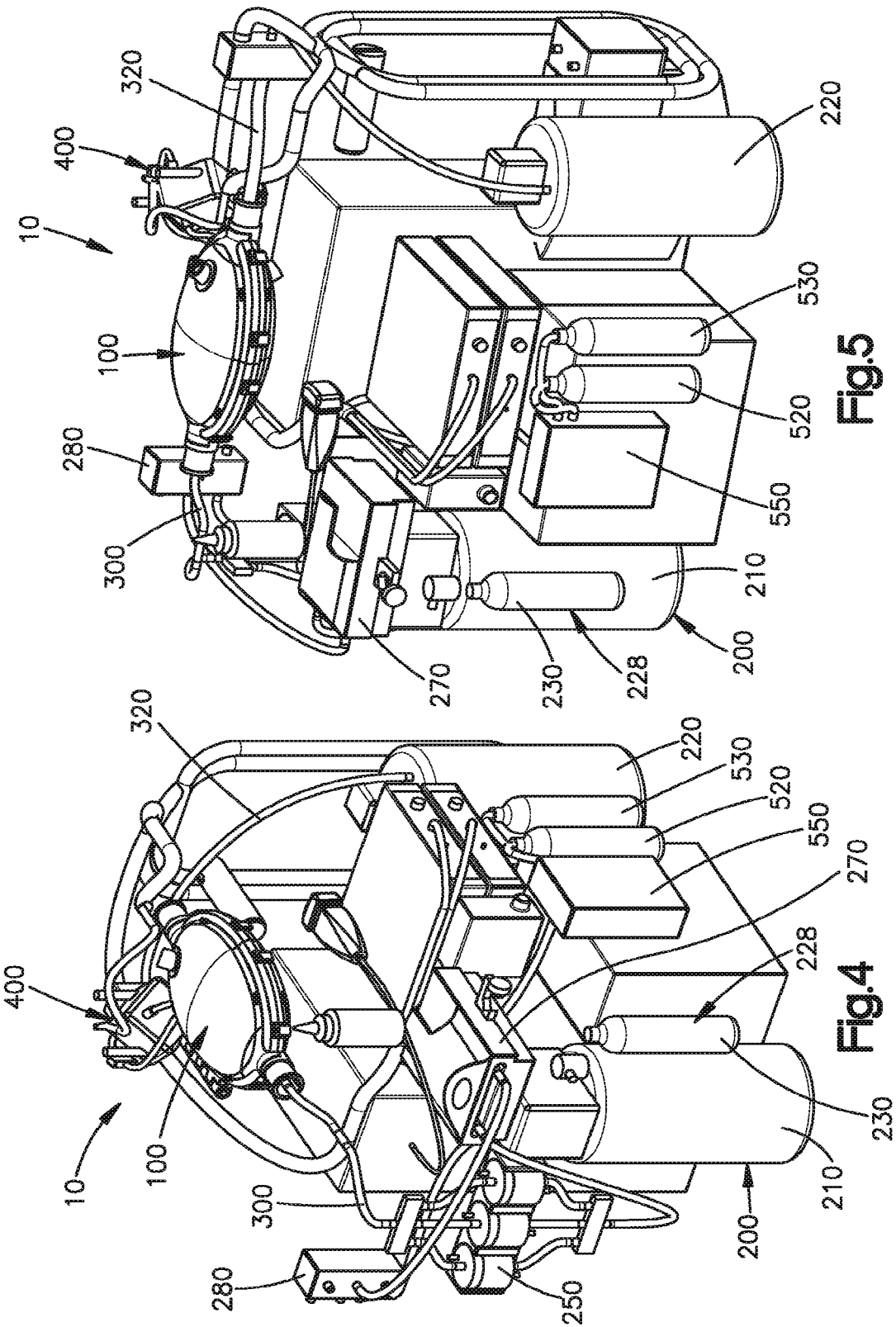

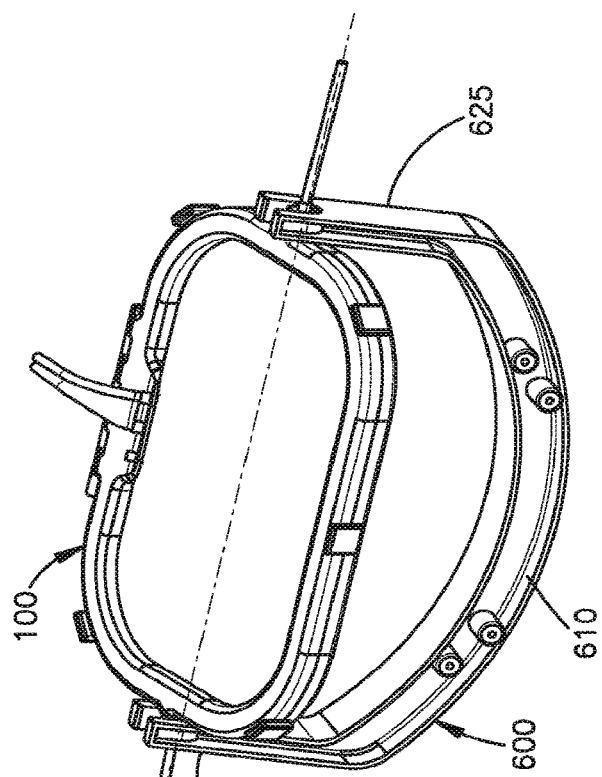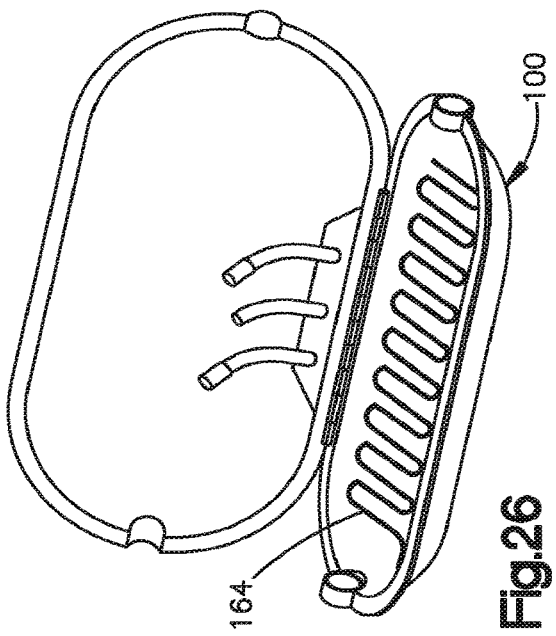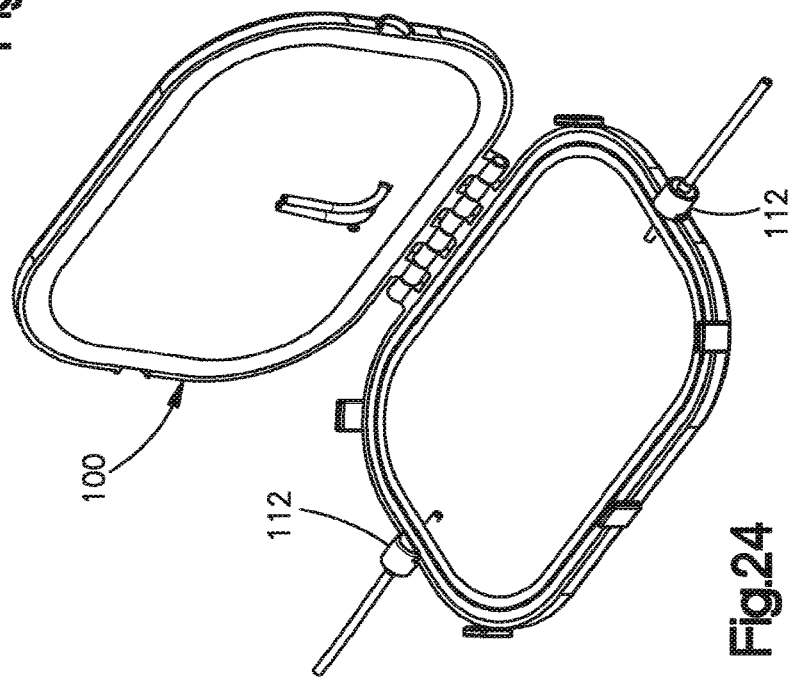

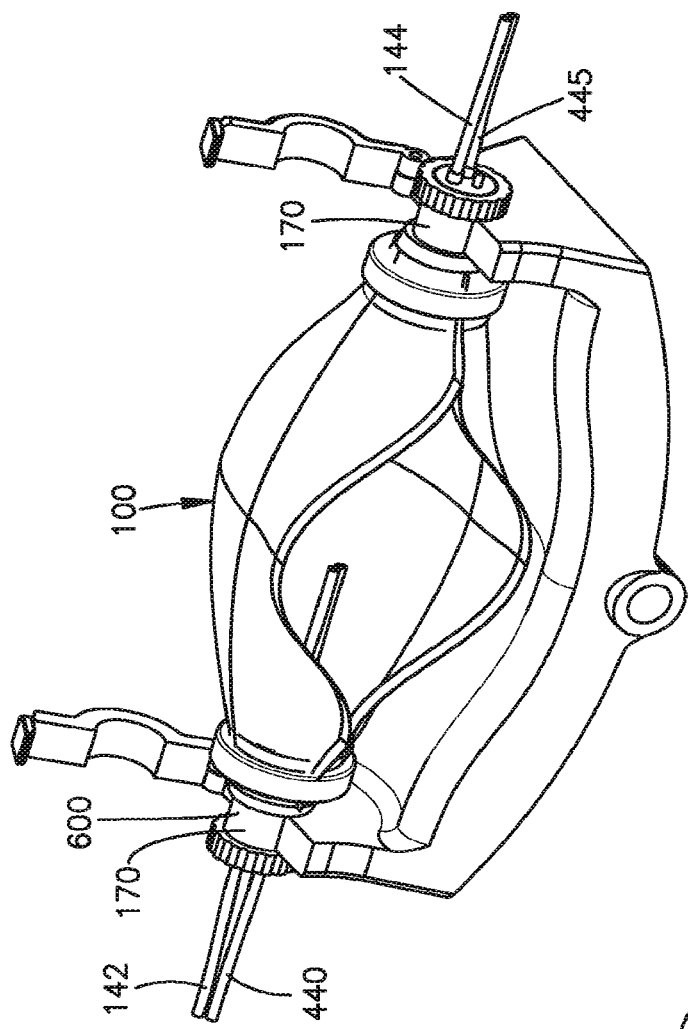
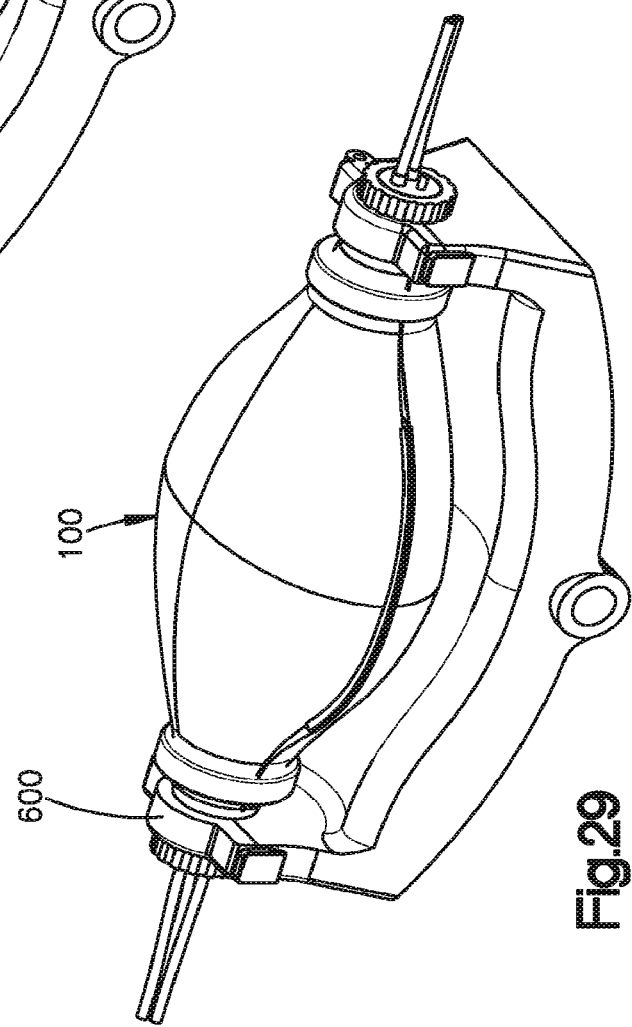

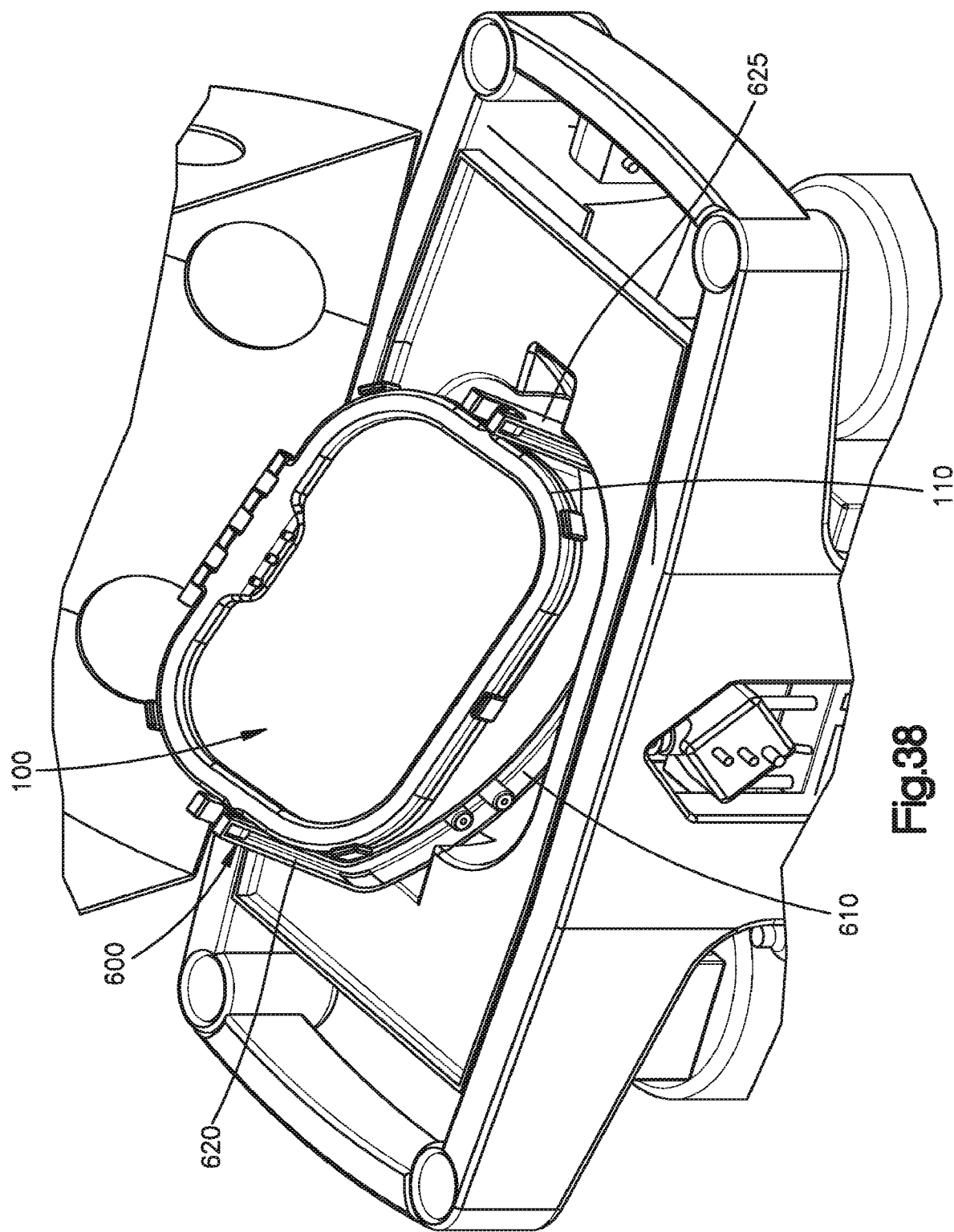

|  | In utero (GA 125 d) | Lamb 1 | Lamb 2 | Lamb 3 | Lamb 4 | Lamb 5 | Mean |
|---|---|---|---|---|---|---|---|
| Hgb (g/dl) | 8.9 | 13.2 | 12.1 | 11.6 | 11.7 | 11.5 | 12.0 |
| "Circuit" flow (ml/kg*min) | 200 (umbil. flow) | 76.8 | 83.2 | 83.1 | 94.0 | 117.8 | 91.0 |
| Total $O_2$ delivery (ml/kg*min) | 19.6 | 14.3 | 13.7 | 13.5 | 17.0 | 19.2 | 15.5 |
| Total $O_2$ consumption (ml/kg*min) | 6.7 | 6.9 | 6.2 | 5.0 | 5.5 | 8.6 | 6.4 |
| Total $O_2$ extraction (%) | 34.2 | 48.0 | 45.5 | 37.8 | 33.4 | 44.2 | 41.8 |
| Carotid $P_{O2}$ (mm Hg) | 23.1 | 31.2 | 34.5 | 36.9 | 42.6 | 34.1 | 35.9 |
| Carotid $O_2$ sat (%) | 62.0 | 52.7 | 56.5 | 62.6 | 68.5 | 57.6 | 59.6 |
| Carotid $O_2$ content (ml $O_2$/dl blood) | 7.5 | 9.5 | 9.3 | 9.8 | 10.9 | 9.0 | 9.7 |
| Plasma lactate (mmol/L) | 1.8 | 1.5 | 0.7 | 0.5 | 0.4 | 0.8 | 0.8 |

Fig.50

|  | Day 0-7 | Day 8-14 | Day 15+ |
|---|---|---|---|
| Total protein (g/dL) | 2.9 | 3.2 | 3.4 |
| Albumin (g/dL) | 1.7 | 1.8 | 1.9 |
| AST (U/L) | 37 | 48 | 52 |
| ALT (U/L) | 5 | 5 | 6 |
| Alk phosphatase (U/L) | 195 | 208 | 181 |
| Total bilirubin (mg/dL) | 1.3 | 2.2 | 2.7 |
| BUN (mg/dL) | 20 | 19 | 9 |
| Creatinine (mg/dL) | 0.74 | 0.76 | 0.33 |
| Sodium (mEq/L) | 141 | 143 | 142 |
| Potassium (mEq/L) | 4.3 | 4.7 | 4.0 |
| Chloride (mEq/L) | 106 | 106 | 103 |
| Calcium (mg/dL) | 11.0 | 11.8 | 10.7 |
| Magnesium (mEq/L) | 1.6 | 1.6 | 1.9 |
| Phosphorus (mg/dL) | 6.0 | 4.5 | 2.6 |
| WBC (*$10^3$/μL) | 2.1 | 1.8 | 1.4 |
| Neutrophils (per μL) | 627 | 378 | 678 |
| Lymphocytes (per μL) | 1324 | 1185 | 693 |
| Platelets (per μL) | 268 | 322 | 112 |
| Hemoglobin (g/dL) | 12.0 | 12.2 | 10.1 |

Fig.55

| Prototype | Total fluids infused, ml/kg*hr (mean ± SEM) | Blood transfused, ml/kg*day (mean ± SEM) |
|---|---|---|
| II | 14.4 ± 2.5 | 6.5 ± 1.6 |
| III | 8.3 ± 0.3 | 6.8 ± 0.9 |

|  | In utero (micro-sphere) | In utero (echo) | Lamb 5 Day 1 | Lamb 5 Mean (>600 h) |
|---|---|---|---|---|
| Combined CO (ml/kg*min) | 490 | 681 | 633 | 700 |
| RV output (ml/kg*min) | 321 | 416 | 359 | 392 |
| LV output (ml/kg*min) | 169 | 265 | 274 | 318 |
| RV:LV output ratio | 1.90 | 1.57 | 1.31 | 1.23 |
Fig.60
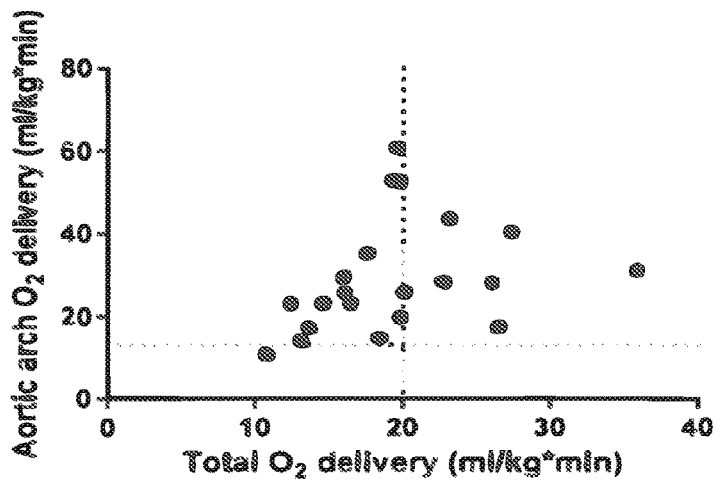
Fig.61
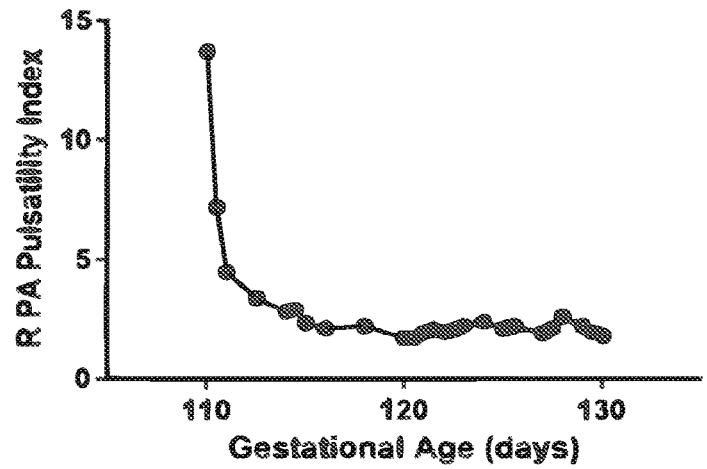
Fig.62

| | FO open | FO closed/ restricted |
|---|---|---|
| Carotid PaO$_2$ (mm Hg) | 33 | 37.3 |
| R pulm art. PI (≥ 115 days GA) | 2.18 | 1.79 |
| RV:LV output ratio | 1.26 | 0.97 |
| DA flow (ml/min) | 65.5 | -34.8 |

METHOD AND APPARATUS FOR EXTRACORPOREAL SUPPORT OF PREMATURE FETUS

CROSS REFERENCE TO RELATED APPLICATIONS

This application is a continuation of U.S. patent application Ser. No. 16/848,085, filed on Apr. 14, 2020, which is a continuation of U.S. patent application Ser. No. 15/736,825, filed on Dec. 15, 2017, which is a National Stage Application filed under 35 U.S.C. 371 of International PCT/US2016/038045, filed on Jun. 17, 2016, which claims the benefit of U.S. Provisional Application No. 62/181,861, filed Jun. 19, 2015, and U.S. Provisional Application No. 62/260,251, filed Nov. 26, 2015, the disclosures of which are incorporated herein by reference in their entireties.

TECHNICAL FIELD

The present disclosure relates generally to neonatal care. More specifically, the present disclosure describes devices, systems, and methods related to the maintenance of homeostasis in an extreme premature fetus outside of the womb. According to one aspect, the present disclosure relates to improving outcomes of premature fetuses born prior to 28 weeks gestation.

BACKGROUND

Extreme prematurity is the leading cause of infant morbidity and mortality in the United States, with over one third of all infant deaths and one half of cerebral palsy diagnoses attributed to prematurity. Respiratory failure represents the most common and challenging problem associated with extreme prematurity, as gas exchange in critically preterm neonates is impaired by structural and functional immaturity of the lungs. Advances in neonatal intensive care have achieved improved survival and pushed the limits of viability of preterm neonates to 22 to 24 weeks gestation, which marks the transition from the canalicular to the saccular phase of lung development. Although survival has become possible, there is still a high rate of chronic lung disease and other complications of organ immaturity, particularly in fetuses born prior to 28 weeks gestation. The development of a system that could support normal fetal growth and organ maturation for even a few weeks could significantly reduce the morbidity and mortality of extreme prematurity, and improve quality of life in survivors.

Premature birth may occur due to any one of a multitude of reasons. For example, premature birth may occur spontaneously due to preterm rupture of the membranes (PROM), structural uterine features such as shortened cervix, secondary to traumatic or infectious stimuli, or due to multiple gestation. Preterm labor and delivery is also frequently encountered in the context of fetoscopy or fetal surgery, where instrumentation of the uterus often stimulates uncontrolled labor despite maximal tocolytic therapy.

The 2010 CDC National Vital Statistics Report notes birth rates at a gestational age of less than 28 weeks in the United States over the past decade have remained stable at approximately 0.7%, or 30,000 births annually. Similarly, birth rates at gestational ages 28-32 weeks over the past decade in the United States have been stable at 1.2%, or 50,000 births annually. Patients with pulmonary hypoplasia secondary to congenital diaphragmatic hernia, oligohydramnios, or abdominal wall defects are also significant. The National Birth Defects Prevention Network reports an annual incidence of congenital diaphragmatic hernia between 0.9 to 5.8 per 10,000 live births in the United States, or approximately 375-2,500 births annually. The incidence of other causes of pulmonary hypoplasia is not well documented.

Respiratory failure remains the major challenge to survival in the critically premature infant. The development of an extrauterine system to support ongoing fetal growth and development would represent a changing paradigm in the management of such patients. The development of an "artificial placenta" has been the subject of investigation for over 50 years with little success. Previous attempts to achieve adequate oxygenation of the fetus in animal models have employed traditional extracorporeal membrane oxygenation (ECMO) with pump support, and have been limited by circulatory overload and cardiac failure in treated animals. The known systems have suffered from unacceptable complications, including: 1) progressive circulatory failure due to after-load or pre-load imbalance imposed on the fetal heart by oxygenator resistance or by circuits incorporating various pumps; and 2) contamination and fetal sepsis.

Accordingly, despite previous attempts to address the long-felt need for a system to support fetal growth and development for preterm fetuses, a solution has remained elusive.

SUMMARY

The present disclosure provides an extracorporeal system to support a mammal, such as a premature fetus. According to one aspect of the disclosure, the system includes a fluid reservoir having one or more flexible walls. The fluid reservoir is configured to enclose a fetus within a fluid environment and may have an expandable volume and a sealable opening. The system may include a fluid supply line configured to supply a volume of fluid into the fluid reservoir. The system may further include a fluid discharge line configured to discharge fluid from the fluid reservoir. The system may include a pumpless pediatric oxygenator configured to exchange oxygen and carbon dioxide in the blood of the fetus while the fetus is maintained within the fluid reservoir.

According to another aspect of the disclosure, a method of treatment for a premature fetus is provided. The method includes the steps of providing a fluid reservoir having one or more flexible walls, filling the fluid reservoir with fluid, placing the premature fetus within the fluid reservoir, connecting the premature fetus to a pumpless oxygenator that is configured to exchange oxygen and carbon dioxide with the blood of the premature fetus, or any combination thereof. The method may further include the steps of enclosing the premature fetus within the fluid reservoir, maintaining the premature fetus within the fluid reservoir for a period of time during which the premature fetus can grow and/or develop, while the premature fetus is within the fluid reservoir modifying the fluid reservoir to expand the volume of fluid reservoir, while the premature fetus is within the fluid reservoir infusing fluid into the fluid reservoir, and while the premature fetus is within the fluid reservoir discharging fluid from the fluid reservoir.

According to another aspect of the disclosure, an extracorporeal system configured to support a mammal, such as a premature fetus, is provided. The system includes a fluid reservoir configured to maintain the premature fetus in a sealed, liquid environment, a pumpless pediatric oxygenator configured to exchange oxygen and carbon dioxide in the blood of the premature fetus while the premature fetus is maintained within the fluid reservoir, a mechanism configured to manipulate the fluid reservoir, or any combination thereof. The mechanism is configured to rotate, translate, or both rotate and translate the fluid reservoir while the fetus is maintained in the fluid reservoir so that the position of the fetus is varied while the fetus is maintained in the fluid reservoir. According to one embodiment, the mechanism includes a pair of supports spaced apart from one another and each connected with the fluid reservoir. The mechanism may include a drive mechanism configured to displace the first support relative to the second support, thereby altering the orientation of the fluid reservoir. Additionally or alternatively, the mechanism may include a drive mechanism configured to rotate the fluid reservoir, for example about an axis.

According to another aspect of the disclosure, an extracorporeal system configured to support a mammal, such as a premature fetus, is provided. The system includes a fluid reservoir configured to enclose a premature fetus within a fluid liquid environment. The fluid reservoir includes an expandable volume, a sealable opening, or both. The system includes a fluid supply line configured to supply a volume of fluid into the fluid reservoir, and a fluid discharge line configured to discharge fluid from the fluid reservoir. The system includes an oxygenation circuit configured to exchange oxygen and carbon dioxide in the blood of the premature fetus while the premature fetus is maintained within the fluid reservoir. The oxygenation circuit includes a first fluid path from the fetus to an oxygenator and second fluid path from the oxygenator back to the fetus. The oxygenation circuit may include a by-pass line for re-circulating a portion of blood through the oxygenator. A pump may be provided along the by-pass line for pumping the portion of blood through the by-pass line. The pump may increase the flow rate of the fluid through the by-pass line relative to the flow rate of the fluid through the first and/or second fluid path.

BRIEF DESCRIPTION OF THE DRAWINGS

The foregoing summary and the following detailed description of the preferred embodiments of the present invention will be best understood when read in conjunction with the appended drawings, in which:

FIG. 4 is an isometric view of a portion of the extracorporeal support system illustrated in FIG. 1;

FIG. 5 is another isometric view of the portion of the extracorporeal support system illustrated in FIG. 4, shown from alternate viewing angle;

FIG. 24 is an isometric view of the fetal chamber of the extracorporeal support system illustrated in FIG. 23, in an open configuration;

FIG. 25 is an isometric view of a fetal chamber and a mechanism configured to manipulate the fetal chamber of the extracorporeal support system illustrated in FIG. 1, according to one embodiment;

FIG. 26 is an isometric view of a fetal chamber and a heating element configured to change the temperature within the fetal chamber of the extracorporeal support system illustrated in FIG. 1, according to one embodiment;

FIG. 29 is an isometric view of the fetal chamber illustrated in FIG. 27, and a mechanism configured to manipulate the fetal chamber, both the fetal chamber and the mechanism in a closed configuration;

FIG. 30 is an isometric view of the fetal chamber and mechanism illustrated in FIG. 29, both the fetal chamber and the mechanism in an open configuration;

FIG. 38 is an isometric view of a portion of the extracorporeal support system illustrated in FIG. 1, according to one embodiment;

FIG. 50 is first table illustrating experimental results;

FIG. 55 is a second table illustrating experimental results;

FIG. 60 is a fourth table illustrating experimental results;

FIG. 61 is a fifteenth graph illustrating experimental results;

FIG. 62 is a sixteenth graph illustrating experimental results;

DETAILED DESCRIPTION OF ILLUSTRATIVE EMBODIMENTS

Figure 1:
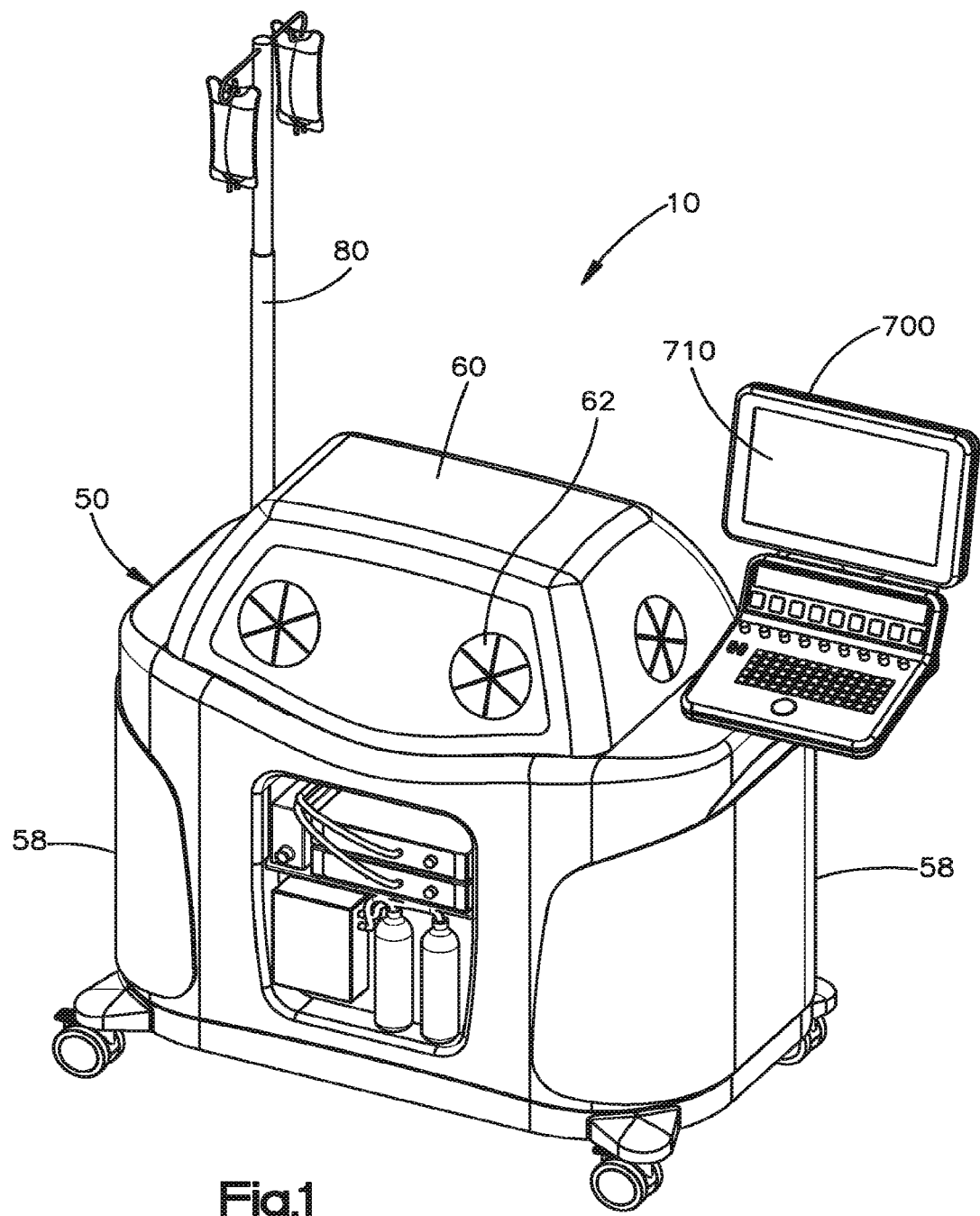
FIG. 1 is an isometric view of an extracorporeal support system in a first configuration, according to one embodiment.

Aspects of the disclosure will now be described in detail with reference to the drawings, wherein like reference numbers refer to like elements throughout, unless specified otherwise. Referring to FIGS. 1 to 5 an extracorporeal support system 10 may be configured to treat premature fetuses (referred to herein as "fetuses"). The system 10 includes a fetal chamber 100 configured to house a fetus 5, an amniotic fluid circuit 200 configured to provide a flow of amniotic fluid to the fetal chamber 100, and an oxygenation circuit 400 configured to remove carbon dioxide from the fetus's blood and supply oxygen to the fetus's blood. The system 10 is configured to maintain the fetus 5 in the fetal chamber 100 immersed in amniotic fluid that is part of the amniotic fluid circuit 200. The system 10 is further configured such that the oxygenation circuit 400 provides adequate gas exchange for the fetus 5 to sustain life. In this way, the system 10 provides an environment similar to an intrauterine environment to facilitate continued growth and development of the fetus 5. The system 10 may include a cart 50 that facilitates monitoring, caring for, and transporting the fetus 5 within a medical facility. According to one embodiment, a central controller 700, such as a microprocessor may be provided to receive signals from various elements of the system 10 and control operation of various subassemblies of the system 10. The details of each of the subsystems will be described in greater detail below.

The fetal chamber 100 includes an enclosed fluid chamber configured to house the fetus 5 in a sterile liquid environment. The fetal chamber 100 is configured to provide a fluid environment that allows fetal breathing and swallowing to support normal lung and gastrointestinal development, as well as providing fluid and electrolyte balance.

Figure 31:
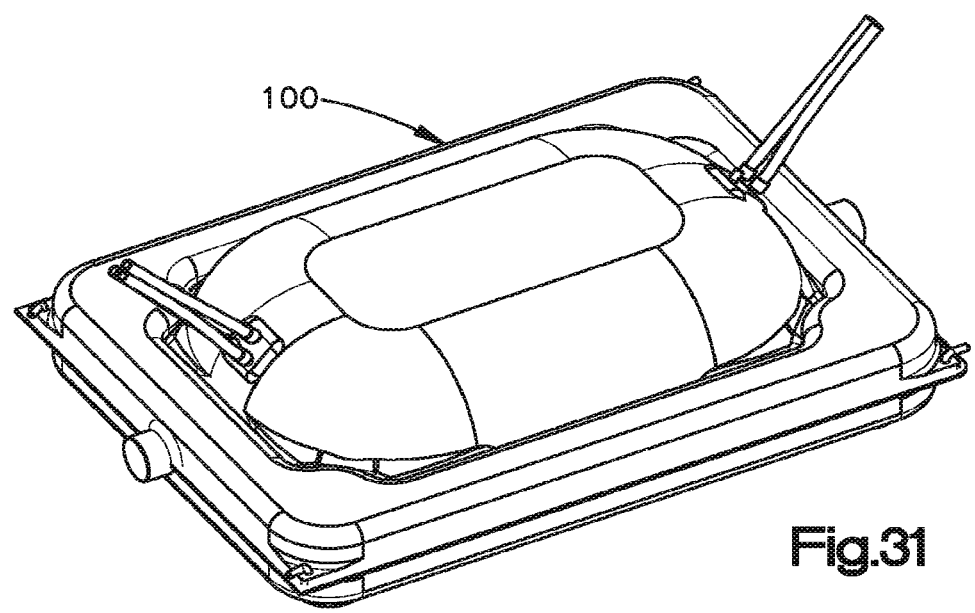
FIG. 31 is an isometric view of a fetal chamber of the of the extracorporeal support system illustrated in FIG. 1, according to another embodiment, the fetal chamber in a closed configuration.

According to one aspect of the disclosure, the fetal chamber 100 is configured to generally conform to the shape of the fetus 5, and to minimize areas of stagnation that could promote bacterial growth that could lead to infection. As shown in the illustrated embodiment the fetal chamber 100 may be configured to generally conform to the shape of a human fetus 5. According to another embodiment, for example as shown in FIG. 31, the fetal chamber 100 may be configured to generally conform to the shape of a non-human fetus, such as a lamb fetus.

Referring to FIGS. 7 to 11, according to one aspect of the disclosure, the fetal chamber 100 includes rigid walls to provide a rigid chamber. According to another aspect of the disclosure, as shown in the illustrated embodiments, the fetal chamber 100 includes one or more flexible walls 120. As shown in the illustrated embodiment, the fetal chamber 100 may include a sac or bag formed of flexible material, such as a plastic film, for example a flexible polyethylene film. The film may incorporate an antimicrobial element to control the growth and spread of microbes in the fetal chamber 100. The antimicrobial element may be organic or inorganic. According to one aspect of the disclosure the antimicrobial element includes an inorganic element such as silver. According to one example, the one or more flexible walls 120 of the fetal chamber 100 are made of a material including metallocene polyethylene film, for example about 80 micrometer thick and containing 2% silver cation as an antimicrobial element.

Referring to FIGS. 7 to 11, the fetal chamber 100 may include a generally rigid frame 110 that supports one or more flexible walls 120. The rigid frame 110 may be formed of a variety of materials, including, but not limited to plastic or metal. The flexible walls 120 are fixedly connected with the rigid frame 110, for example by welding or an adhesive. The flexible walls 120 allow a volume defined by the fetal chamber 100 to expand and contract. According to one aspect of the disclosure, the fetal chamber 100 is configured to expand as the fetus 5 enclosed within the fetal chamber 100 grows, allowing the volume of the chamber to be increased without opening or changing the fetal chamber 100 of the system 10. According to one aspect of the disclosure the fetal chamber 100 may include a single flexible wall 120. According to another aspect of the disclosure, the fetal chamber 100 may include a plurality of flexible walls 120, for example upper and lower flexible walls 120 fixedly connected with the rigid frame 110.

Figure 7:
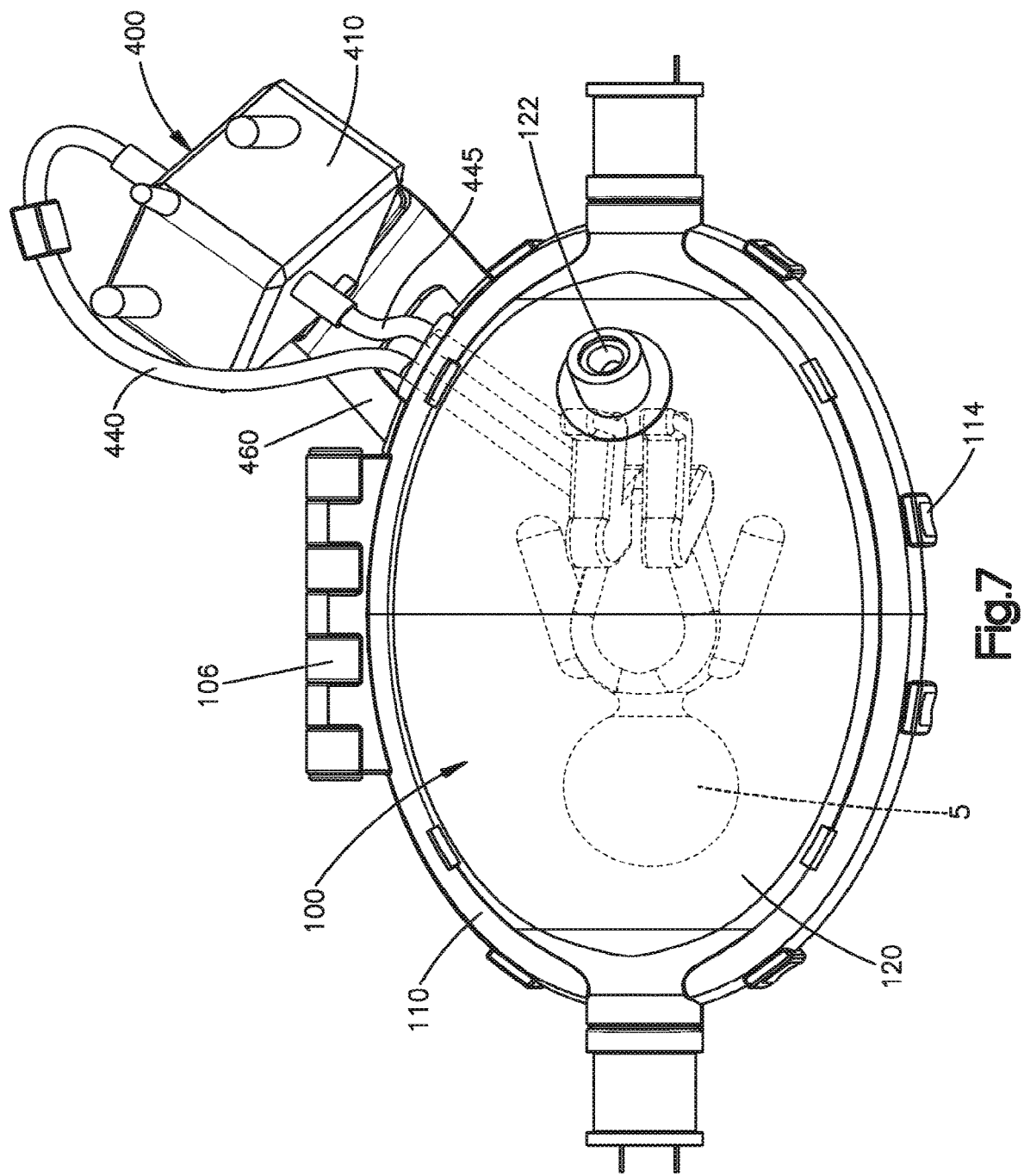
FIG. 7 is a top plan view of a fetal chamber of the extracorporeal support system illustrated in FIG. 1, according to one embodiment, the fetal chamber in a closed configuration.
Figure 8:
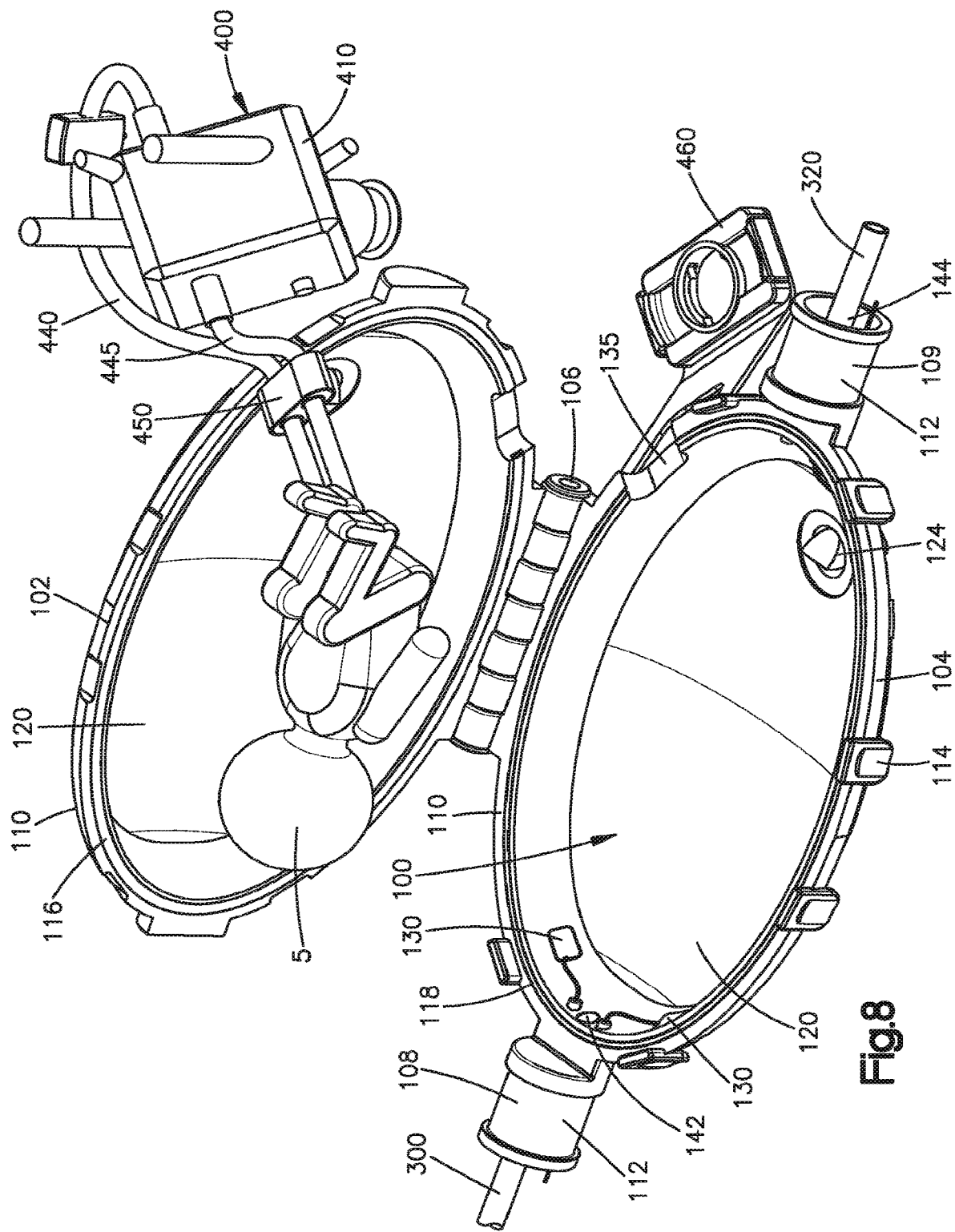
FIG. 8 is an isometric view of the fetal chamber shown in FIG. 7, in an open configuration.
Figure 9:
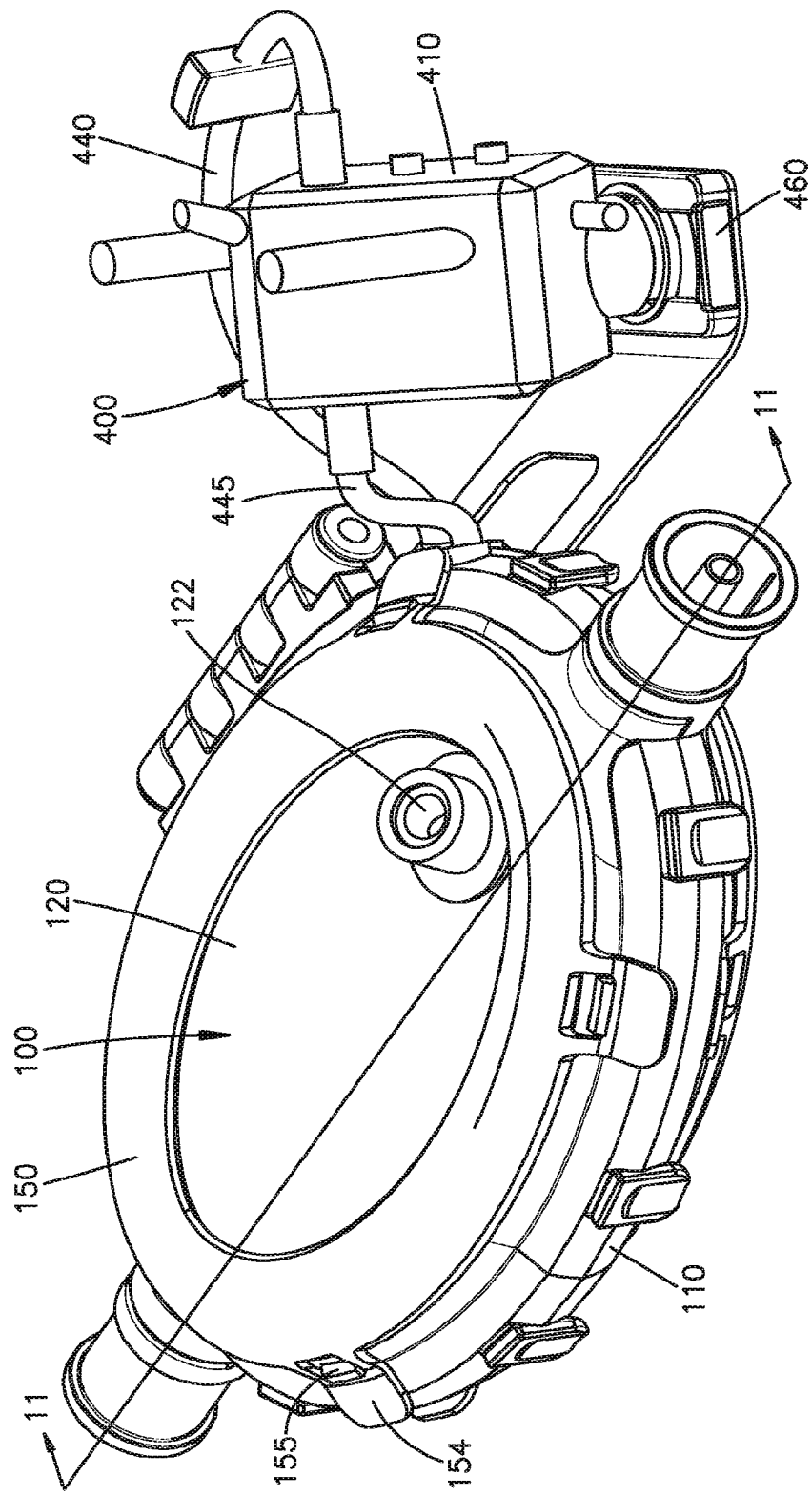
FIG. 9 is an alternate isometric view of the fetal chamber shown in FIG. 7, including an attached restriction ring.
Figure 10:
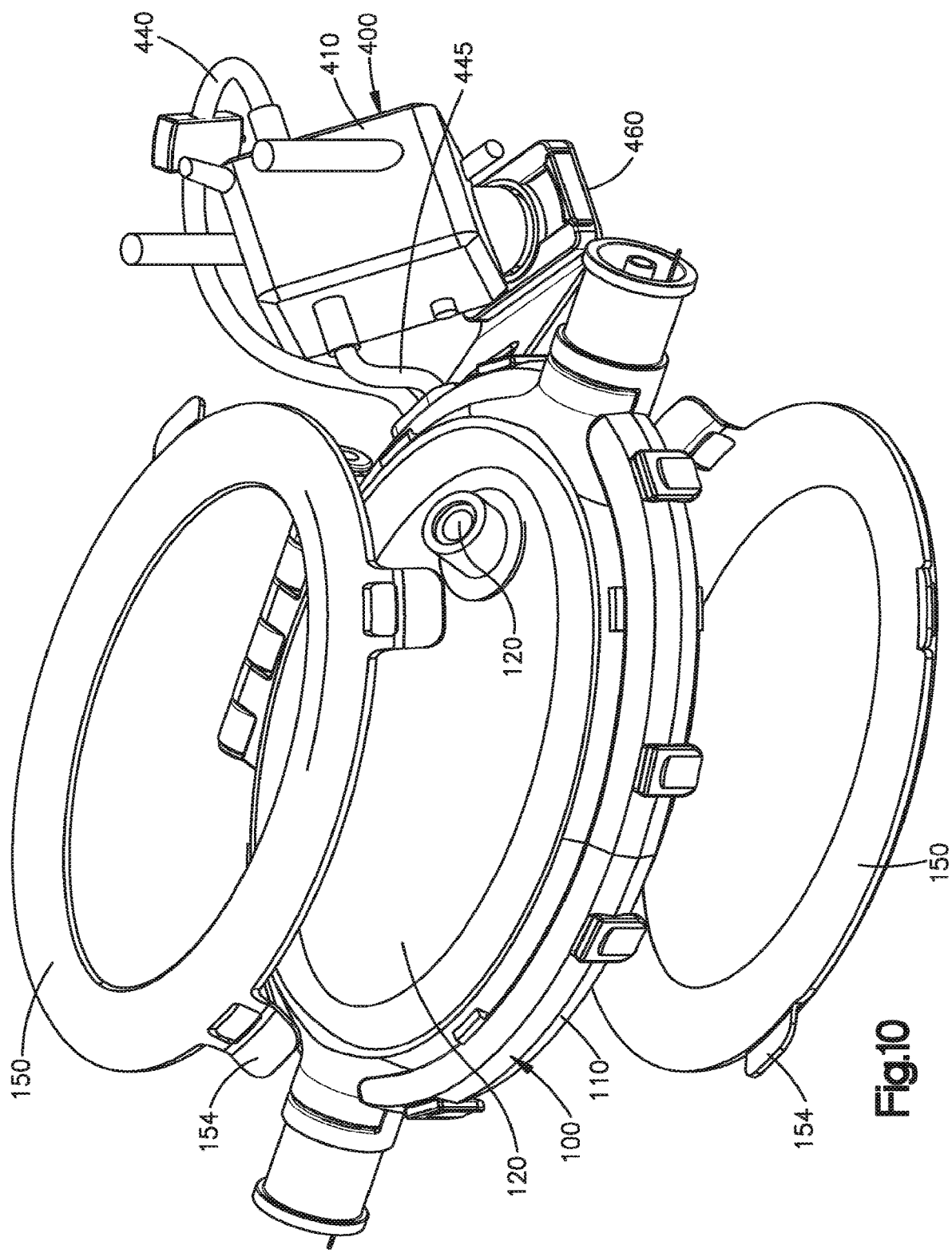
FIG. 10 is a partially exploded isometric view of the fetal chamber illustrated in FIG. 9.
Figure 11:
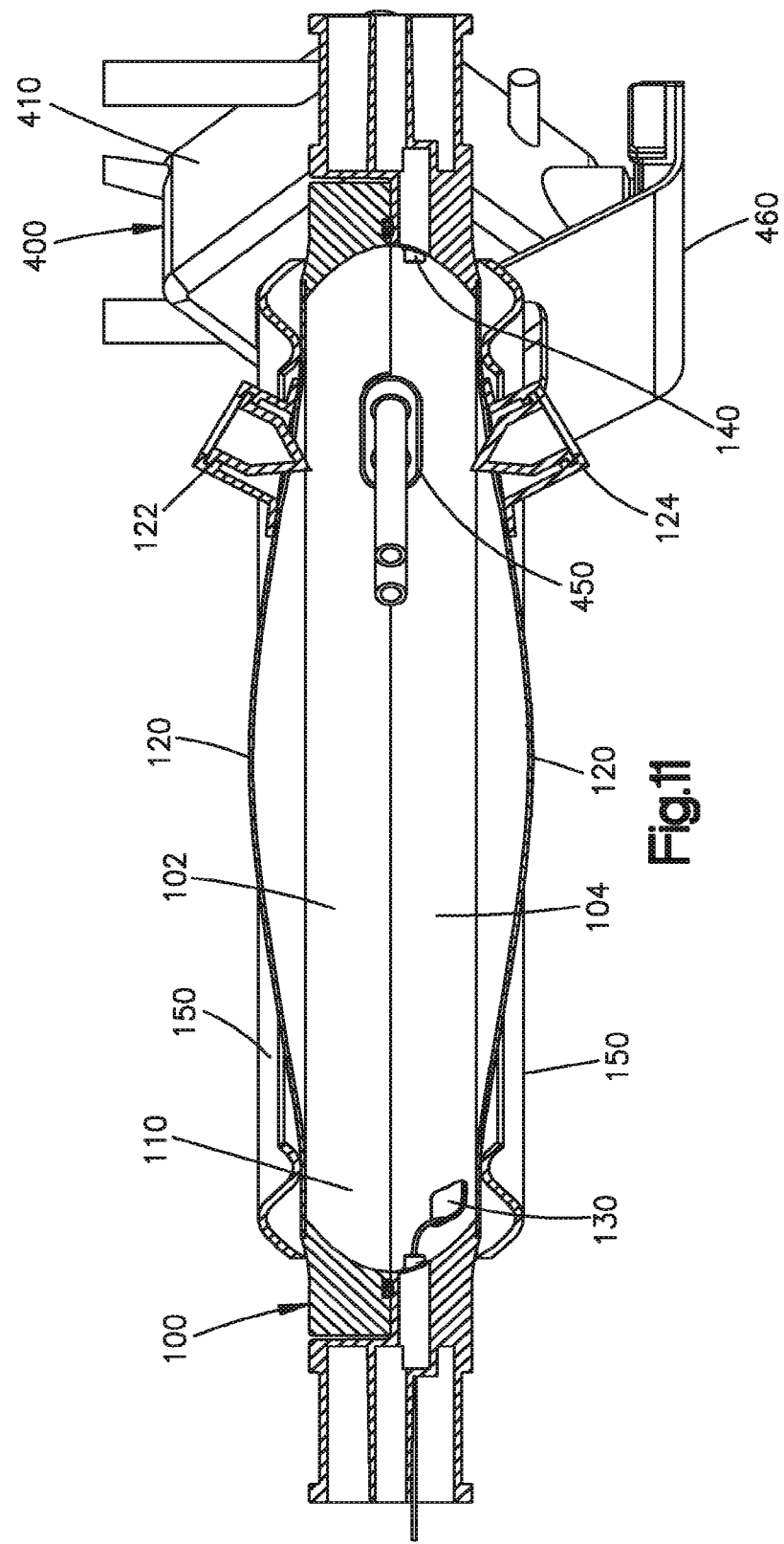
FIG. 11 is a cross-sectional view of the fetal chamber illustrated in FIG. 9, along line 11-11.

As shown in the illustrated embodiment, the fetal chamber 100 includes a sealable opening configured to allow the fetus 5 to be placed into the fetal chamber 100 in an open configuration (as shown in FIG. 8) and then sealed once the fetus 5 is inside the fetal chamber 100 in a closed configuration (as shown in FIG. 7). According to one aspect of the disclosure, the fetal chamber 100 may have a clamshell design in which the fetal chamber 100 includes an upper half 102 and a lower half 104 connected by at least one hinge 106 so that the upper half 102 is pivotable relative to the lower half 104. As shown in the illustrated embodiment, the fetal chamber 100 may include a seal 116, such as an elastomeric material (for example resilient plastic, urethane or rubber) extends around at least a portion, for example an entirety, of the periphery of the upper half 102, the lower half 104, or both. The fetal chamber 100 may further include a lip 118 on either the upper half, the lower half, or both, the seal configured to cooperate with the seal 116 on the opposite (upper or lower) half of the fetal chamber 100 to form a fluid-tight seal when the fetal chamber 100 is in the closed configuration. The fetal chamber 100 preferably includes a mechanism 114 configured to retain the fetal chamber 100 in the closed configuration. For instance, the fetal chamber 100 may include one or more latches configured to releasably lock the upper half 102 of the fetal chamber 100 to the lower half 104 of the fetal chamber 100 to maintain the fetal chamber 100 in the closed, fluid-tight configuration.

A first orifice at a first end 108 of the fetal chamber 100 forms an inlet 142 configured to receive amniotic fluid into the fetal chamber 100. A second orifice at a second end 109 of the fetal chamber 100 forms an outlet 144 configured to discharge amniotic fluid from the fetal chamber 100. In the embodiment shown in FIG. 7, the fetal chamber 100 is elongated to accommodate a human fetus 5. As shown in the illustrated embodiment, a length of the fetal chamber 100, measured for example from the inlet 142 to the outlet 144, may be greater than a width of the fetal chamber 100, measured in a direction perpendicular to the length. The first end 108 and the second end 109 may taper inwardly to minimize locations within the fetal chamber 100 where amniotic fluid may stagnate. As shown in the illustrated embodiment, the fetal chamber 100 is an ovate or elliptical shape having a major axis along the length of the fetal chamber 100 and the minor axis along the width of the fetal chamber 100.

According to one aspect of the disclosure, the fetal chamber 100 is configured to receive the fetus 5 such that a head of the fetus 5 is adjacent the inlet 142. Positioning the fetus 5 within the fetal chamber 100 such that the head of the fetus 5 is adjacent the inlet 142 may allow more efficient removal of waste generated by the fetus 5 from the fetal chamber 100.

The fetal chamber 100 may include a plurality of sensors configured to monitor conditions within the fetal chamber 100. For instance, the fetal chamber 100 may include one or more temperature sensor configured to detect fluid temperature within the fetal chamber 100. In the present embodiment, the fetal chamber 120 includes at least one, for example a pair of, thermocouples 130 configured to monitor fluid temperature within the fetal chamber 100. Additionally, one or more fluid pressure sensors 140 may be positioned within the fetal chamber 100. For example, as shown in the illustrated embodiment, a fluid pressure sensor 140 may be positioned within the fetal chamber 100 adjacent the outlet 144, the fluid pressure sensor configured to monitor fluid pressure within the fetal chamber 100. Alternatively, the fluid pressure sensor 140 may be mounted within the outlet 144 such that the fluid pressure sensor is configured to monitor fluid pressure of fluid discharging from the fetal chamber 100.

The fetal chamber 100 may also include one or more sealed openings configured to provide access an interior of the fetal chamber 100. According to one aspect of the disclosure, the one or more sealed openings may include an upper port 122, formed in the upper half 102 of the fetal chamber 100 for example, and a lower port 124, formed in the lower half 104 of the fetal chamber 100. As shown in the illustrated embodiment, at least one of the upper port 122 and the lower port 124 are sealed by a valve that provides one way flow. For example the valve may be configured to permit access into the fetal chamber 100 while impeding fluid flow out of the fetal chamber 100. The valves may be any of a variety of valves configured to control flow of fluid. According to one example, the valves may be duck bill valves. The upper port 122 and the lower port 124 are each configured to allow insertion of a suction device into the fetal chamber 100, for example to evacuate air bubbles, stool contamination, and other contaminants from the fetal chamber 100.

The fetal chamber 100 may further include an orifice 135 configured to provide access for conduits or other portions of the oxygenation circuit 400 described further below. The fetal chamber may include a seal configured to seal the orifice 135 when the fetal chamber is in the closed configuration.

The fetal chamber 100 may be formed with a predetermined fixed volume that is sufficiently large to accommodate the fetus 5 after it has grown for several weeks or months. In this way, the fetal chamber 100 is configured to maintain the fetus 5 within the fetal chamber 100 during the entire period of development without the fetus 5 growing too large for the fetal chamber 100. Alternatively, the fetal chamber 100 may include a variable volume chamber so that the fetal chamber volume can be sized to the minimum volume necessary to support the fetus 5 when the fetus 5 is initially enclosed within the fetal chamber 100. As the fetus 5 grows, the fetal chamber 100 is configured to be expanded without opening the fetal chamber 100.

The system 10 may include one or more mechanisms configured to vary the volume of the fetal chamber 100. According to one aspect of the disclosure, the system 10 includes one or more restriction rings 150 configured to constrain the flexible walls 120 of the fetal chamber 100, thereby reducing the volume of the fetal chamber 100. The restriction ring 150 may be configured to releasably attach to the frame 110 of the fetal chamber 100 so that the restriction ring 150 can be attached and detached from the fetal chamber 100.

As shown in the illustrated embodiment, the restriction ring 150 may be shaped generally similarly to the shape of the flexible wall 120. The restriction ring may include an inner protrusion 152 extending around at least a portion of an interior edge of the restriction ring 150. When attached to the frame 110, the inner protrusion 152 of the restriction ring 150 is spaced inwardly from an outer edge of the flexible wall 120. The inner protrusion 152 of the restriction ring 150 applies inward pressure against the flexible wall 120 thereby restricting outward displacement of the flexible wall 120. As a result, the restriction ring 150 restricts the internal volume of the fetal chamber 100.

The restriction ring 150 may include a plurality of latches or clips 154, for example formed around a periphery of the restriction ring 150 configured to releasably connect the restriction ring 150 to the chamber frame 110. As shown in the illustrated embodiment, the clips 154 are configured to snap over tabs 155 formed on the chamber frame 110 to retain the restriction rings 150 against the outward force of fluid pressure within the fetal chamber 100 pushing the flexible wall 120 outwardly. According to one embodiment, the system 10 is devoid of a restriction ring 150. According to another embodiment, the system 10 includes a single restriction ring 150. According to another embodiment, the system 10 may include a plurality of restriction rings 150, for example a first restriction ring 150 configured to be attached to the upper half 102 of the fetal chamber 100 to restrict the upper flexible wall 120 and a second restriction ring 150 is configured to be attached to the lower half 104 of the fetal chamber 100 to restrict the lower flexible wall 120. As the fetus 5 grows, the restriction ring(s) 150 can be detached from the fetal chamber 100 to allow the flexible walls 120 to expand outwardly, thereby increasing the internal volume of the fetal chamber 100. Additionally, the system 10 may include a plurality of different sized restriction rings 150, with each ring allowing the flexible walls 120 to expand to a different extent. In this way, as the fetus 5 grows, the volume of the fetal chamber 100 can be increased incrementally over time.

Figure 6:
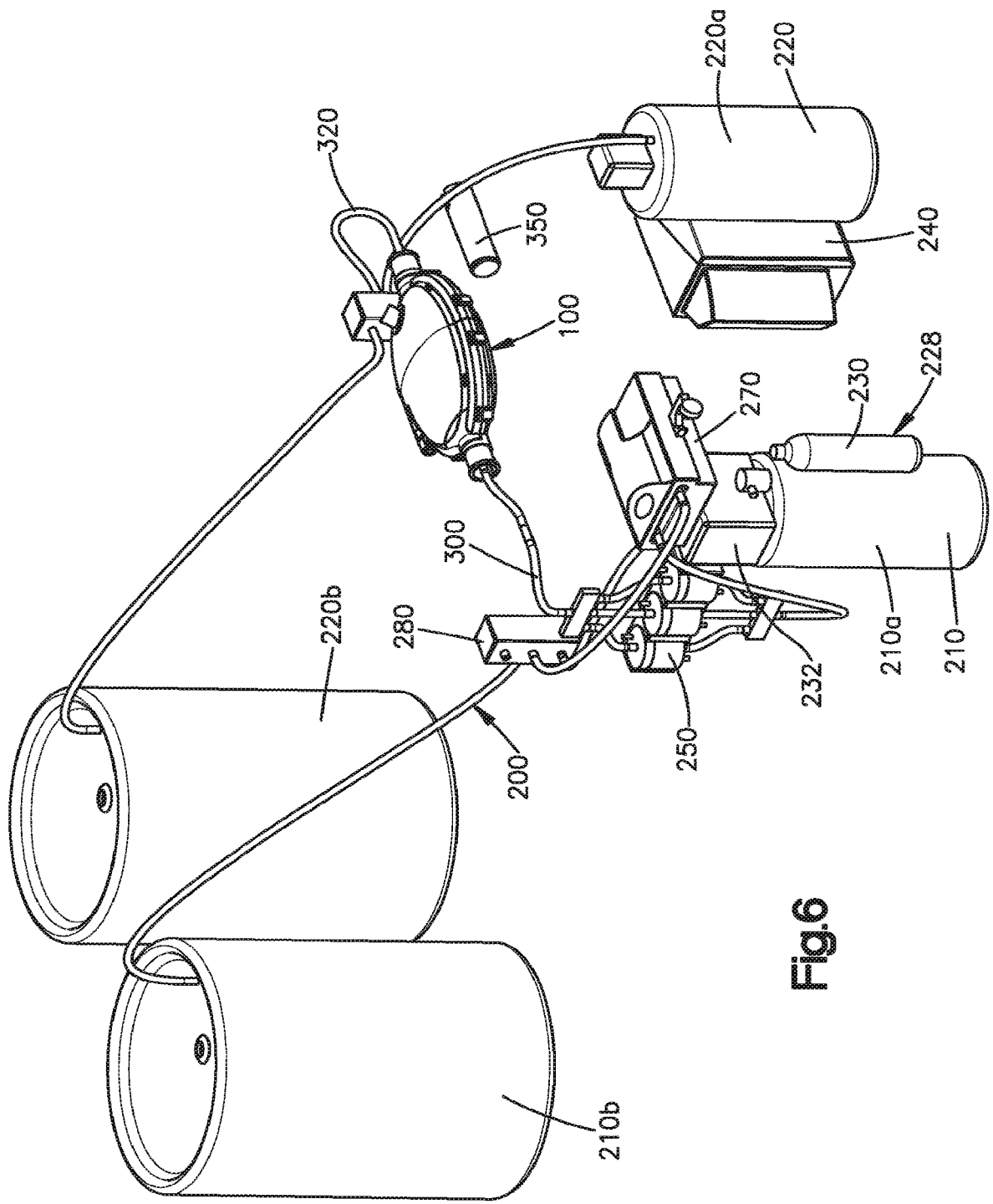
FIG. 6 is an isometric view of an amniotic fluid circuit of the extracorporeal support system illustrated in FIG. 1, according to one embodiment.

Referring to FIGS. 4 to 6, the amniotic circuit 200 of the system 10 is configured to provide a fluid, for example a sterile fluid, to the fetal chamber 100 and is further configured to discharge the fluid from the fetal chamber 100. According to one aspect of the disclosure, the amniotic circuit 200 is configured to control flow of the fluid entering the fetal chamber 100 and being discharged from the fetal chamber 100 to maintain fluid pressure in the fetal chamber 100 within a pre-determined range. The amniotic circuit 200 may be a closed circuit in which the fluid discharges from the fetal chamber 100, is processed by filtration and sterilization prior to being recycled back into the fetal chamber 100. However, as shown in the illustrated embodiment, the amniotic circuit 200 may be an open circuit in which the fluid flows from a supply tank 210 which houses a reservoir of fresh amniotic fluid into the fetal chamber 100 and the fluid exits the fetal chamber 100 and is discharged into a waste tank 220. The amniotic circuit 200 also may include one or more elements configured to process the fluid prior to injecting the fluid into the fetal chamber 100 as discussed further below.

It should be understood that the terms "fluid" and "amniotic fluid" is used to refer to the fluid that is used to fill the fetal chamber 100. The composition of the fluid may vary depending on a variety of factors. For instance, the amniotic fluid may include primarily water, such as distilled water, and may be mixed with a variety of elements, such as electrolytes (for example, but not limited to, sodium chloride, sodium bicarbonate, potassium chloride, calcium chloride, or any combination thereof) dissolved in solution to mimic the ionic concentration of naturally occurring amniotic fluid for a fetus in utero. Additionally, glucose, amino acids, lipids, essential vitamins, minerals, trace elements, or any combination thereof may be added to the amniotic fluid. Accordingly, the term amniotic fluid in this specification does not refer to a solution having a particular composition, but instead refers to the fluid used to fill the fetal chamber 100.

The amniotic circuit 200 includes the supply tank 210 configured to store a reservoir of unused amniotic fluid. The supply tank 210 may include a portable tank 210a configured to be transported on the cart 50, a larger tank 210b configured to remain in a particular area and having a substantially larger volume configured to provide a supply of amniotic fluid for a longer period of time than the portable tank 210a, or both. The amniotic circuit 200 includes the waste tank 220 configured to collect amniotic fluid discharged from the fetal chamber 100. The waste tank 220 may include a portable tank 220a configured to be transported on the cart 50, a larger tank 220b configured to remain in a particular area and having a substantially larger volume configured to receive used amniotic fluid over a longer period of time than the portable tank 220a. For instance, the larger tanks 210b and 220b may have volumes that are at least one order of magnitude larger than the portable tanks 210a and 220a.

Referring to FIGS. 4 to 8 and 12, fluid flows from the supply tank 210 to the fetal chamber 100 through a supply line 300. The supply line forms a fluid-tight connection with the inlet 142 of the fetal chamber. A discharge line 320 forms a fluid-tight seal with the outlet 144 of the fetal chamber 100 and thereby provides a fluid path for fluid discharging from the fetal chamber 100. The system 10 may include a heater 270 configured to provide heat to the amniotic fluid and thereby maintain the amniotic fluid at a selected temperature, for example a temperature corresponding to the temperature of amniotic fluid in utero. The heater 270 may be part of the amniotic circuit 200, for example the heater 270 may be provided in the supply tank 210 so that the reservoir of amniotic fluid is maintained at the selected temperature. As shown in the illustrated embodiment, the heater 270 is positioned inline between the supply tanks 210 and the fetal chamber 100.

According to one aspect of the disclosure, the heater may 270 be an electric heater having a control configured to vary the heat output of the heater to heat the fluid to the selected temperature as the amniotic fluid flows through the heater 270. It may be desirable to prevent direct contact between the fluid heater 270 and the supply tank 210. Accordingly, the heater 270 may be configured to receive a disposable fluid pathway, such as a cartridge, that allows heat exchange between the heater 270 and the fluid without the heater 270 coming in contact with the fluid. In this way, the cartridge can be replaced each time the system 10 is used to prevent cross-contamination of the heater 270 from the fluid used for one fetus 5 with the fluid used for a subsequent fetus 5.

The amniotic circuit 200 may also include one or more filters 250 configured to filter the amniotic fluid prior to entering the fetal chamber 100. As shown in the illustrated embodiment, a plurality of the filters 250, for example three micropore filters, may be included, arranged in parallel, and positioned in-line between the supply tank 210 and the fetal chamber 100, for example between the heater 270 and the fetal chamber 100. Other numbers, arrangements, and positions of the filters 250 are also considered part of the present disclosure.

According to one aspect of the disclosure, the system 10 may include a fluid control system 228 configured to control flow of the fluid to and from the fetal chamber 100. The fluid control system 228 may be designed to provide a constant flow of fluid to the fetal chamber 100 while maintaining a generally constant fluid pressure within the fetal chamber 100. In particular, the fluid pressure is maintained within a predetermined range depending on various characteristics, such as the type and/or size of the fetus 5 in the fetal chamber 100.

In the present instance, the supply tank(s) 210 are maintained under pressure by a pressurized gas. For instance, the large tank may be connected with a source of pressurized air such as a central medical air supply commonly used in medical facilities. Additionally, a local supply of pressurized gas may be provided. For instance, a portable tank 230 of pressurized gas may be provided to pressurize the fluid in portable tank 210 to drive the amniotic fluid toward the fetal chamber 100. It may be desirable to provide a pressure regulator 232, such as an electronic pressure regulator to regulate the gar pressure of the gas pressure being supplied to the supply tanks 210a and 210b. In the present instance, a first pressure regulator 232a is provided inline between the portable gas tank 230 and the portable supply tank 210a and a second pressure regulator 232b is provided inline between the central air supply and the large tank 210b.

According to one aspect of the disclosure, the system 10 may include a fluid controller configured to control flow of pressurized fluid to the fetal chamber 100. As shown in the illustrated embodiment, the amniotic circuit 200 may include a control valve 242 inline between the supply tank(s) 210 and the fetal chamber 100. Additionally a fluid flow meter 244 may be provided inline upstream from the fetal chamber 100 to sense the flow rate of the amniotic fluid to the fetal chamber 100. The fluid flow meter 244 may be configured to provide signals to the central controller 700, which in turn controls the control valve 242 to regulate flow of the amniotic fluid to the fetal chamber 100 in response to signals from the fluid flow meter 244.

The system 10 may include a manifold 280 configured to control whether the amniotic fluid is supplied from the portable tank 210a or the large tank 210b. According to one aspect of the disclosure the manifold 280 may include a control valve configured to control flow of the fluid from the supply tank(s) 210. The control valve may be manual or it may be electronically controlled. In a first position, the valve disconnects fluid flow from the portable tank 210a and connects fluid flow from the large tank 210b. In a second position, the valve disconnects fluid flow from the large tank 210b and connects fluid flow from the portable tank 210a. In a third position, the valve disconnects both the portable tank 210a and the large tank 210b to prevent flow of the amniotic fluid from either tank so that the amniotic circuit 200 can be purged.

In the foregoing description, the amniotic fluid is driven toward the fetal chamber 100 using pressurized gas to create a pressure differential that urges the amniotic fluid toward the fetal chamber 100. It should be understood however, that alternate elements can be used to drive the amniotic fluid toward the fetal chamber 100. For instance, a pump may be provided that pumps the amniotic fluid from the tank(s) 210 to the fetal chamber 100. The pump may be a pump that does not directly contact the fluid, such as a peristaltic pump. Additionally, the pump may be controlled by the central controller 700 to automatically control the pressure and flow rate of the fluid flowing into the fetal chamber 100.

Figure 12:
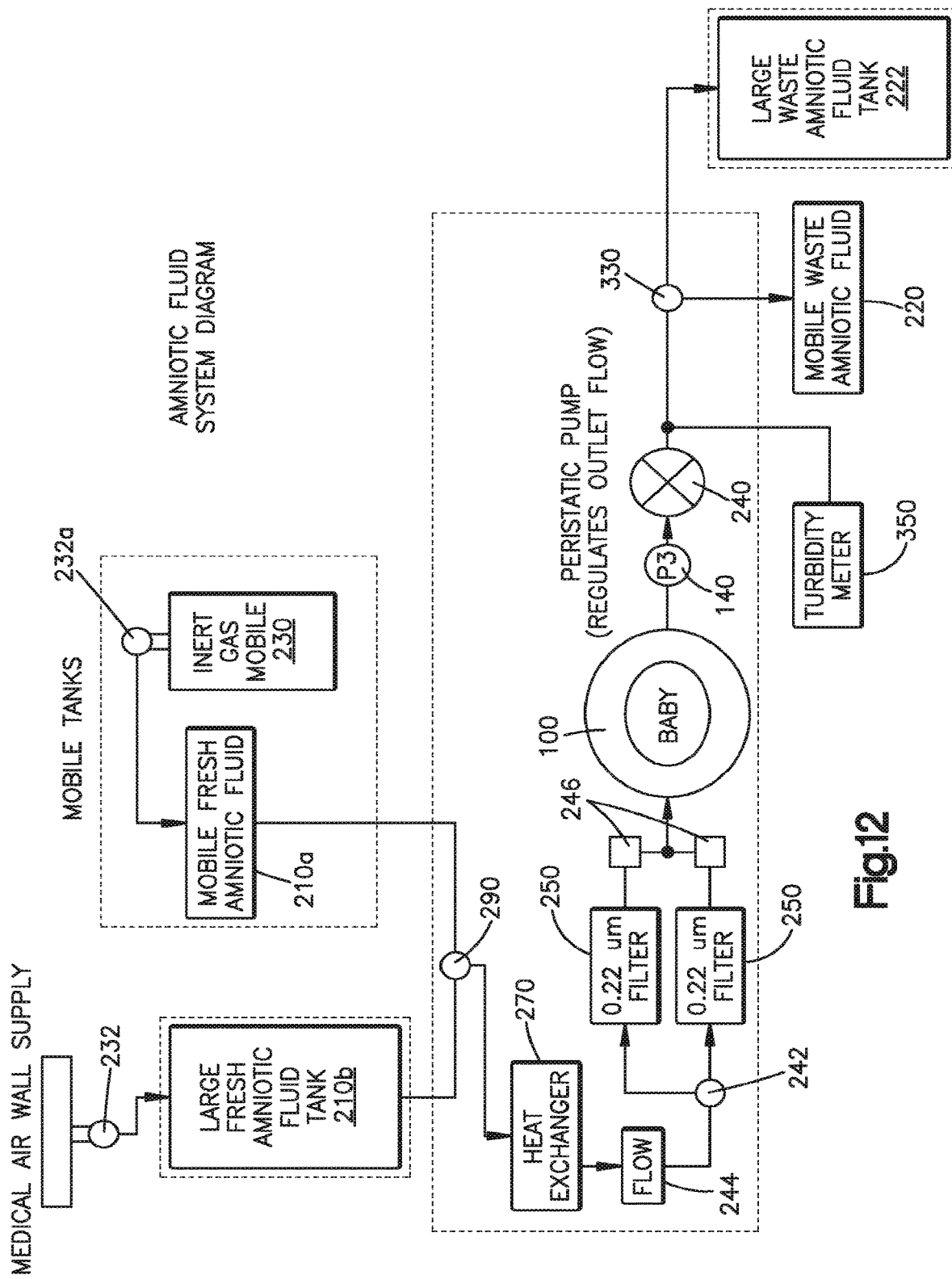
FIG. 12 is a diagrammatic view of an amniotic fluid circuit of the extracorporeal support system illustrated in FIG. 1, according to one embodiment.

As shown in FIG. 12, the amniotic circuit 200 may also include one or more valves in-line with the supply line 300 to prevent back flow of the fluid from the fetal chamber 100 back toward the supply tanks 210a and 210b. For instance, the amniotic circuit 200 may include one or more check valves 246 to prevent the back flow of fluid from the fetal chamber toward the supply tanks.

The discharge of the fluid from the fetal chamber 100 may be controlled by flow of the fluid entering the fetal chamber 100 from the supply tank 210 so that discharge of the fluid is dependent on fluid pressure in the fetal chamber 100 and flow rate of the fluid into the fetal chamber 100. According to another embodiment, discharge of the fluid from the fetal chamber 100 is controlled independently from the infusion of the fluid into the fetal chamber 100. For example the system 10 may include a discharge pump 240 configured to control flow of the fluid out of the fetal chamber 100. Operation of the discharge pump 240 may be controlled by the central controller 700 based on signals received from various elements of the system 10.

For example, a pressure sensor may sense fluid pressure in the fetal chamber 100 and the discharge pump 240 may operate to withdraw an amount of the fluid from the fetal chamber 100 to maintain a constant fluid pressure within a desired pressure range in the fetal chamber 100. Additionally, the system 10 may include one or more turbidity sensors 350 (also referred to as a turbidity meter) configured to detect turbidity of the fluid in the fetal chamber 100 and/or the discharge line 320. In response to turbidity sensed by the sensor 350, the discharge pump 240 may adjust the flow rate of the fluid discharged from the fetal chamber 100. For instance, an increase in turbidity in the fluid may be indicative of contaminants in the fetal chamber 100, such as microbes or stool from the fetus 5. To flush the contaminants from the fetal chamber 100, the discharge pump 240 may increase the rate of fluid flow out of the fetal chamber 100. In response, the flow rate of the fluid being supplied to the fetal chamber from the supply tank 210 is increased to maintain a constant fluid level within the fetal chamber 100.

Referring now to FIGS. 7 to 11 and 14, the system 10 includes an oxygenation circuit 400 configured to provide gas transfer between the fetus's blood and an oxygenator 410 to provide oxygen to and remove carbon dioxide from the fetus's blood. The oxygenation circuit 400 can be connected with the fetus 5 in a venous/venous arrangement. Alternatively, the oxygenation circuit 400 may be connected with the fetus 5 in an arterial/venous arrangement. In the present instance, cannulae are placed in the great neck vessels (e.g., carotid) of the fetus 5 to connect the circulatory system of the fetus 5 to the oxygenator 410. The placement in the great neck vessels may avoid issues of vasospasm and cannula instability in umbilical vessels. An external portion of the cannulas may be fitted with a sleeve (e.g., to permit increased tension of the stabilizing sutures). The sleeve may be made of silicone and may be, for example, about 1-10 cm in length, particularly about 3-5 cm in length. The cannulae may be sutured to the fetus 5 (for example via the fitted sleeve) to secure the cannulae to the neck of the fetus 5.

The oxygenator 410 is connected with the fetus 5 via two fluid lines: a drain line 440 and an infusion line 445. Blood flows from the fetus 5 though the drain line 440 to the oxygenator 410. The blood then flows through the oxygenator 410 and returns to the fetus 5 via the infusion line 445. The drain line 440 and infusion line 445 pass through the oxygenator orifice 135 in the fetal chamber 100. According to one aspect of the disclosure the drain line 440 and the infusion line 445 pass through apertures in a mounting block 450 and the mounting block 450 is configured to be retained in the orifice 135 of the fetal chamber 100. According to one aspect of the disclosure, the mounting block 450 is formed of a resilient material that forms a seal with the frame 110 when the upper half 102 and the lower half 104 of the fetal chamber 100 abut such that the fetal chamber 100 is in the closed configuration. In this way, the mounting block 450 provides a fluid-tight seal to impede leakage of the amniotic fluid from the fetal chamber 100.

As shown in the illustrated embodiment, the oxygenator 410 may be mounted onto a platform 460 adjacent the fetal chamber 100 so that the length of the drain line 440 and the infusion line 445, to and from the oxygenator 410 respectively, is minimized. For instance, in accordance with one aspect of the disclosure, the drain line 440 and the infusion line 445 are less than 18 inches long combined, and preferably are not greater than 12 inches long combined. By minimizing the length of the drain line 440 and the infusion line 445, the volume of blood required to prime the oxygenation circuit 400 is minimized. It may be desirable to line the drain line 440 the infusion line 445, or both with anti-clotting measures/compounds (for example, but not limited to, immobilized polypeptide, heparin, or both). The oxygenation circuit 400 may be primed with, for example, maternal blood, blood of the fetus 5, or both. Priming of the oxygenation circuit 400 with hemoglobin from the fetus 5 may result in optimal oxygen exchange in the oxygenation circuit 400. Because the fetal oxygen dissociation curve is shifted to the left compared to the adult oxygen dissociation curve, fetal arterial oxygen pressures are lower than adult arterial oxygen pressures. In a particular embodiment, the blood in the oxygenation circuit 400 includes heparin.

The platform 460 is configured to support the oxygenator 410. According to one example, the platform 460 includes a boss onto which the oxygenator 410 is configured to snap to retain the oxygenator 410 in position. The platform 460 may be connected with the frame 110 of the fetal chamber 100, for example the platform 460 may be integrally molded with the frame 110.

Figure 14:
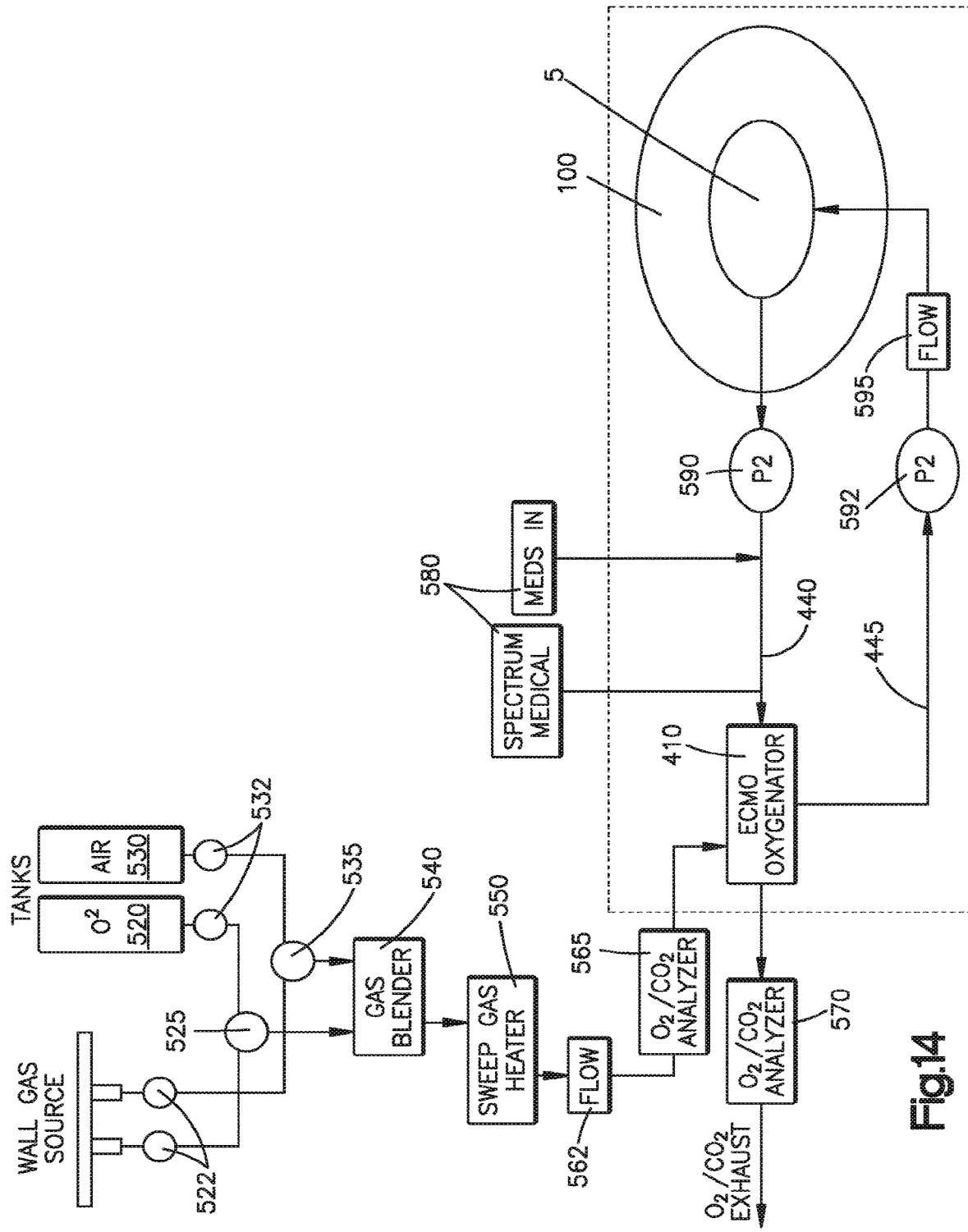
FIG. 14 is a diagrammatic view of an oxygenation circuit of the extracorporeal support system illustrated in FIG. 1, according to one embodiment.
Figure 21:
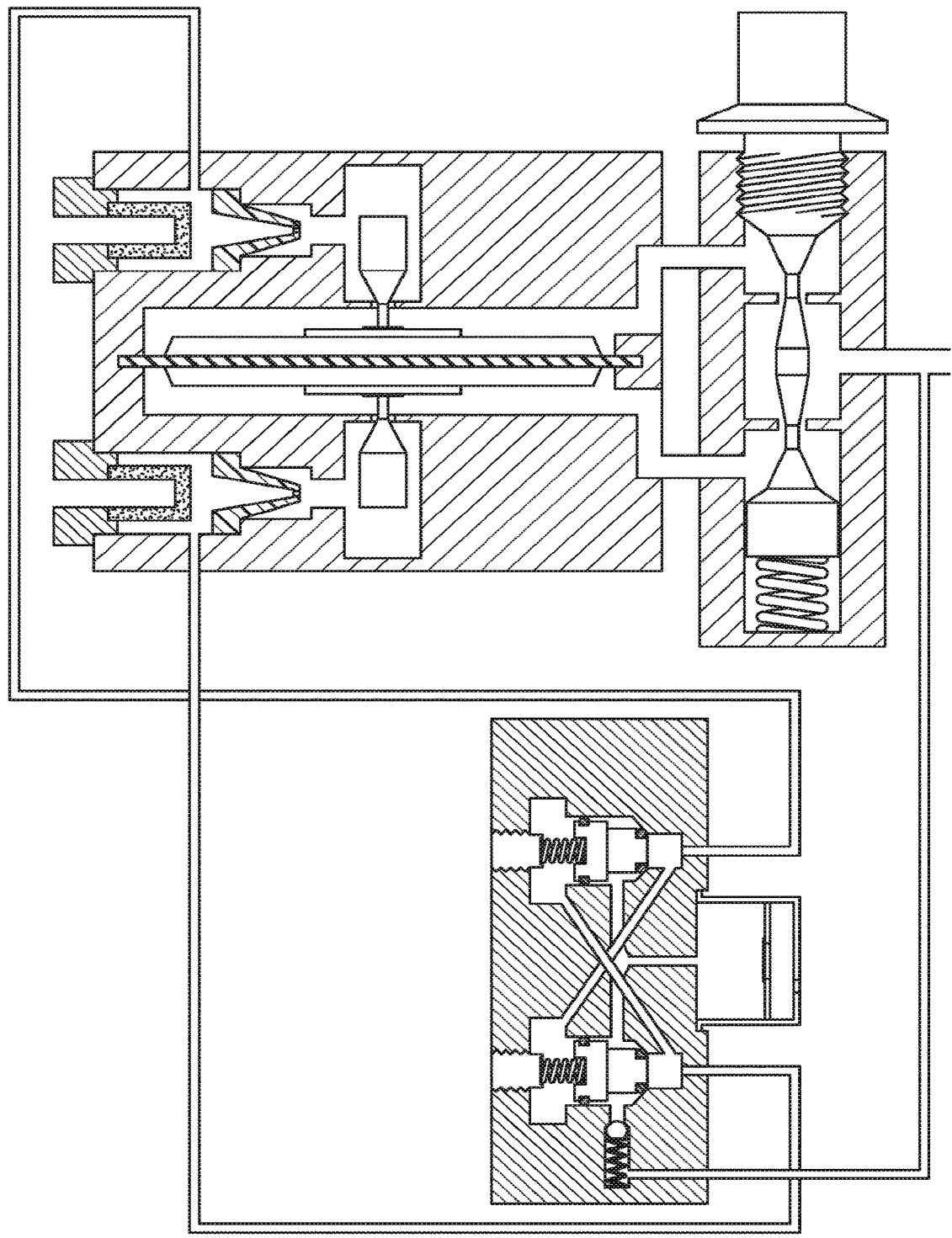
FIG. 21 is a cross-sectional view of a gas blender of the extracorporeal support system illustrated in FIG. 1, according to one embodiment.
Figure 22:
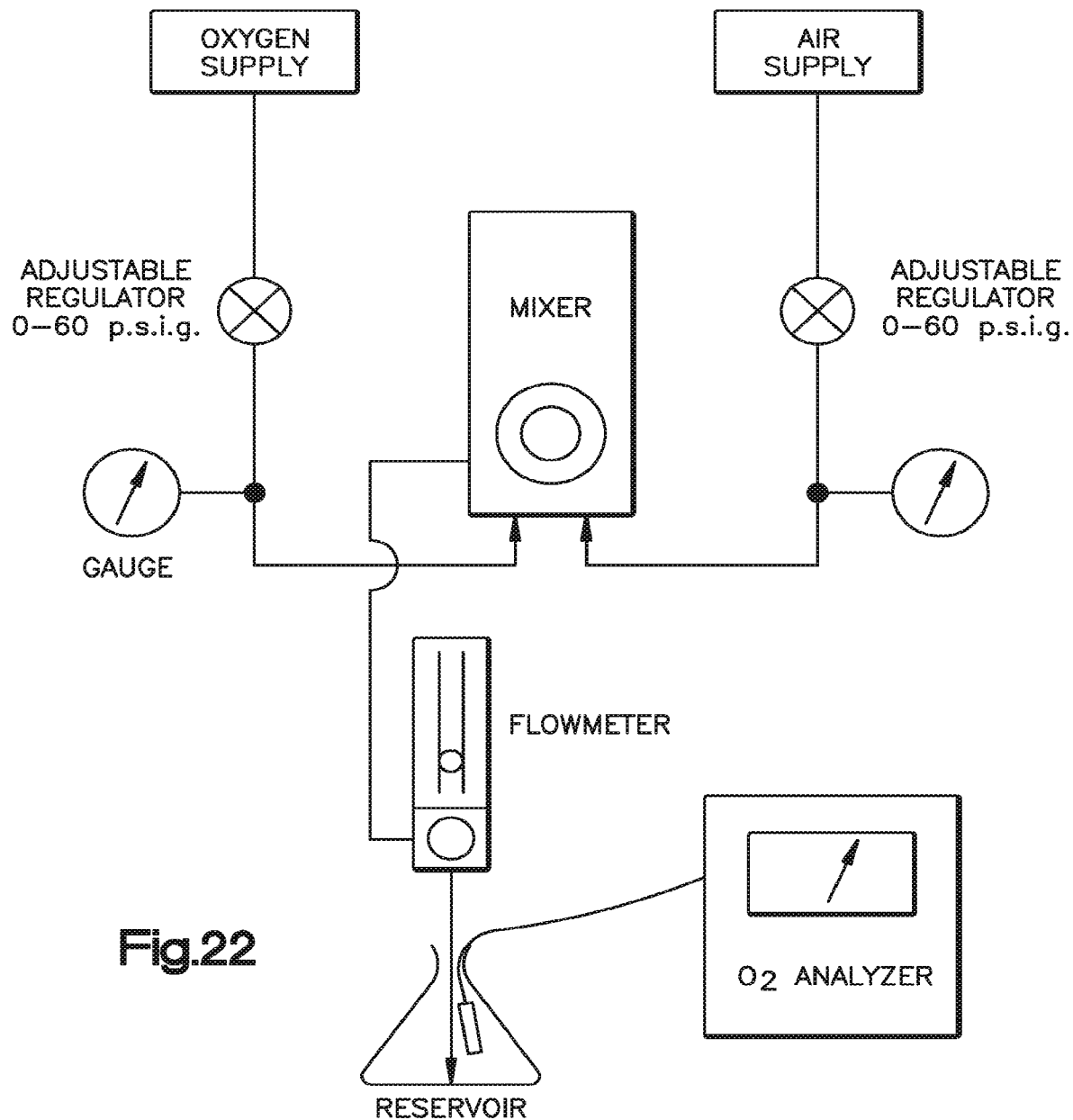
FIG. 22 is a diagrammatic view of a portion of an oxygenation circuit of the extracorporeal support system illustrated in FIG. 1, according to one embodiment.
Figure 23:
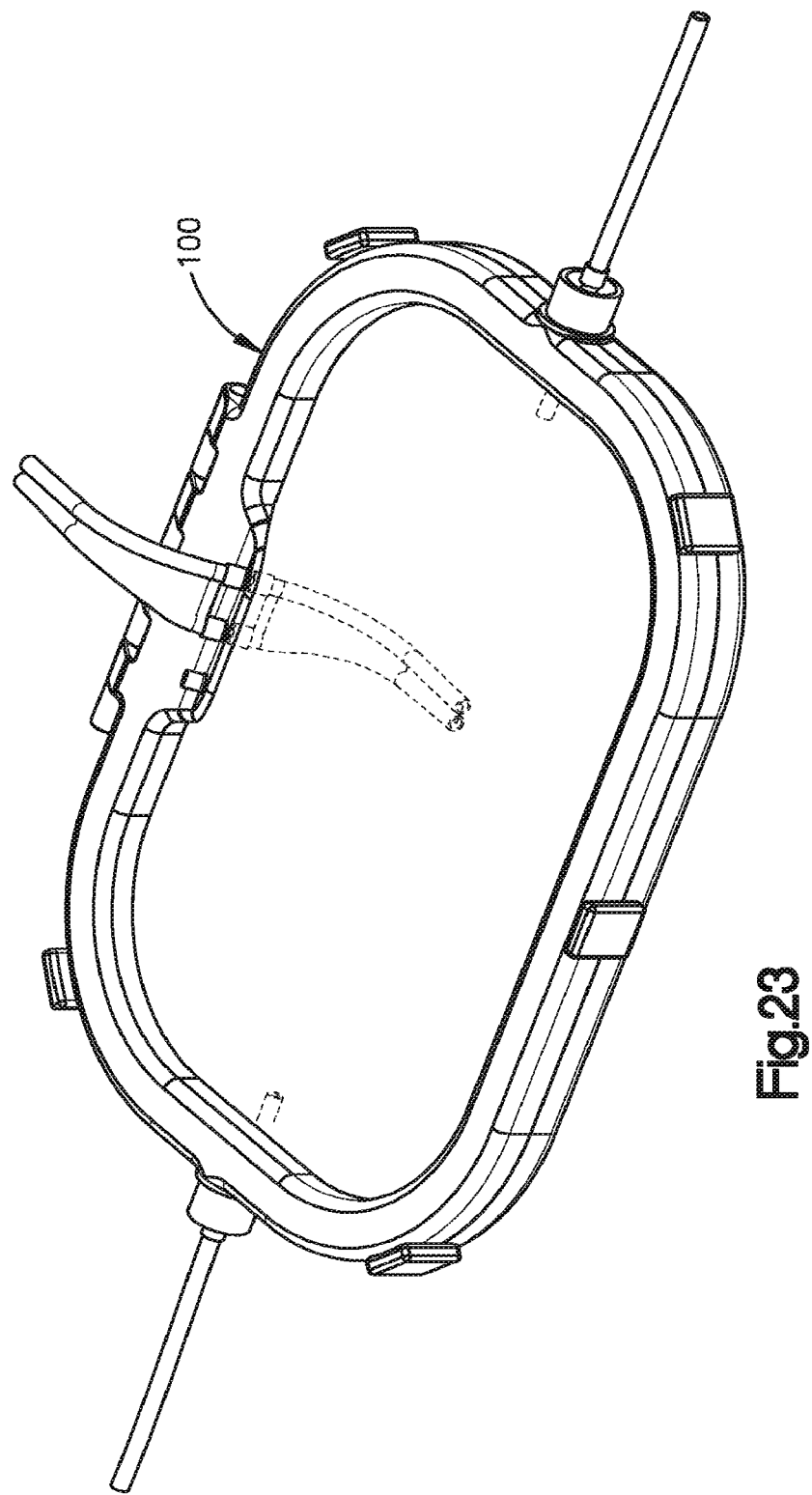
FIG. 23 is an isometric view of a fetal chamber of the extracorporeal support system illustrated in FIG. 1, according to another embodiment, the fetal chamber in a closed configuration.
Figure 28:
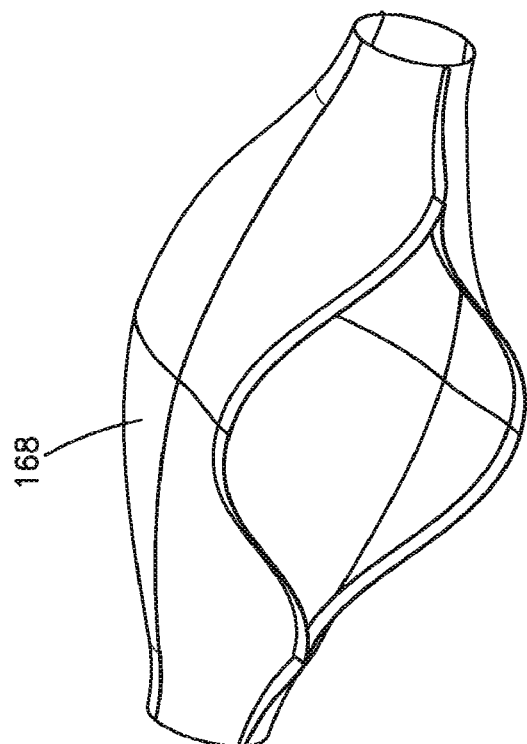
FIG. 28 is an isometric view of a portion of the fetal chamber illustrated in FIG. 27.
Figure 27:
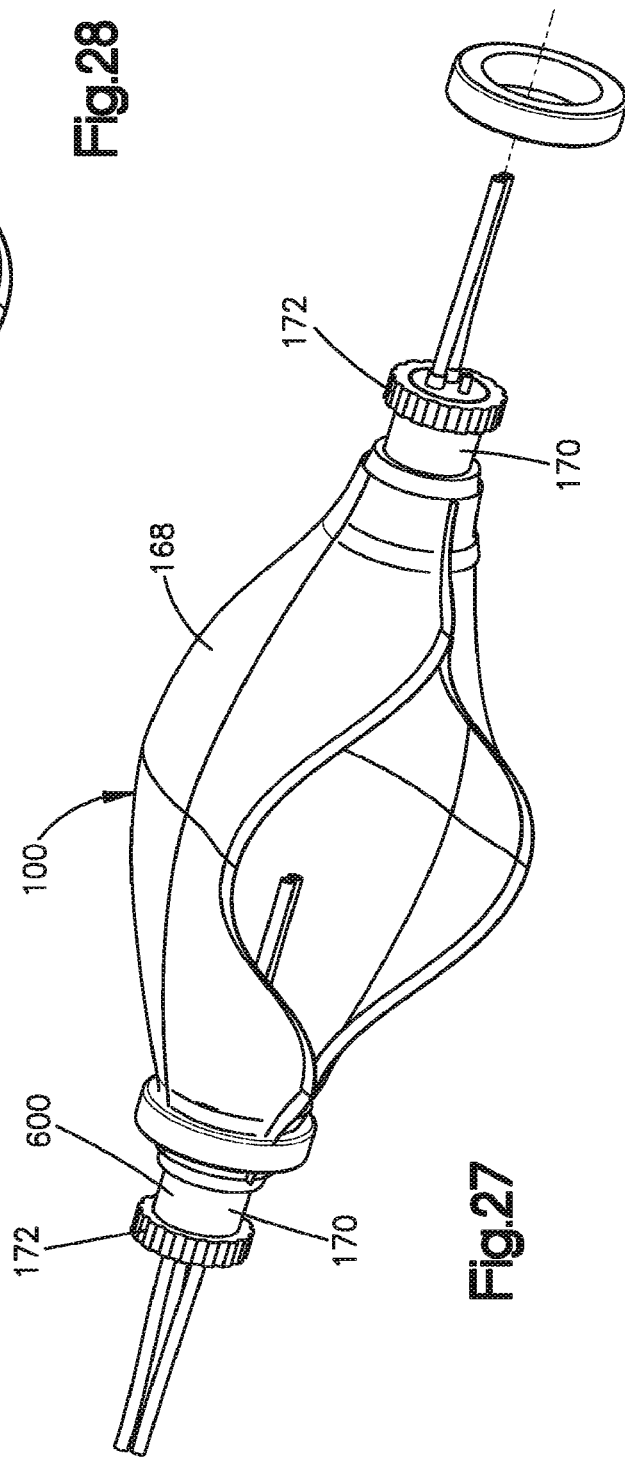
FIG. 27 is an isometric view of a fetal chamber of the of the extracorporeal support system illustrated in FIG. 1, according to another embodiment.

According to one aspect of the disclosure, the oxygenation circuit 400 includes a sweep gas connected with the oxygenator 410, the sweep gas configured to facilitate gas transfer between the oxygenator 410 and the blood of the fetus 5. The gas transfer is affected by the composition of the sweep gas and the flow rate of the sweep gas through the oxygenator 410. As shown in FIG. 14, two gases, for example an oxygen source 520 and an air source 530, are blended together in a gas blender 540 that blends the oxygen and the air to form the sweep gas. The details of the gas blender are illustrated in FIG. 21. The two gases may be supplied by a high volume gas reservoir, such as wall lines connected with a central gas supply configured to provide gas to the reservoir. Alternatively, the two gases maybe supplied from smaller gas reservoirs, such as a portable oxygen tank 520 and a portable air tank 530 that are mounted on the cart 50 so that the system 10 can provide sweep gas to the oxygenator 410 while the system 10 is conveyed from one area of a medical facility to another area of the medical facility.

The oxygenation circuit 400 may include a first control valve 525 configured to control whether the wall source oxygen supply or the portable oxygen tank 520 is connected with the gas blender 540. The oxygenation circuit 400 may include a second control valve 535 configured to control whether the wall source air or the portable air tank 530 is connected with the gas blender 540. The oxygenation circuit 400 may include one or more pressure sensors 522 positioned inline with the oxygen supplies and one or more pressure sensors 532 are position inline with the air supplies so that the pressure sensors 522 and 532 sense the gas pressure of the gases being fed to the gas blender 540.

The oxygenation circuit 400 may include a heater 550 positioned inline between the gas blender 540 and the oxygenator 410, the heater 550 configure to heat the sweep gas so that the temperature of the sweep gas is maintained within a predetermined range. The oxygenation circuit 400 may include a fluid flow meter 562 configured to monitor the flow rate of the sweep gas exiting the heater 550 and a sweep gas analyzer 565 configured to analyze one or more characteristics of the gas entering the oxygenator 410. The oxygenation circuit 400 may include an exhaust gas analyzer 570 configured to analyze one or more characteristics of the gas discharged by the oxygenator 410. For instance, the gas analyzers 565 and 570 may be configured to measure the oxygen content of the sweep gas and the exhaust gas, respectively.

The oxygenation circuit 400 further includes a pair of fluid pressure sensors configured to detect the fluid pressure of the blood entering the oxygenator 410 and the fluid pressure of the blood exiting the oxygenator 410. Specifically, a first pressure sensor 590 may be positioned in-line with the drain line 440 and a second pressure sensor 592 may be positioned in-line with the infusion line 445. In this way, the fluid pressure drop over the oxygenator 410 can be continuously monitored. Additionally, a fluid flow meter 595 may be positioned in-line with the infusion line 445 to monitor the flow rate of the blood returning to the fetus 5 from the oxygenator 410.

The oxygenation circuit 400 may include one or more ports 580, which may be utilized to withdraw blood samples for analysis or the ports 580 may be used to inject or infuse medicine or nutrition directly into the blood. For instance, one of the ports 580 may be configured to facilitate injection of medication such as antibiotics or sedatives into the blood. Similarly, another of the ports 580 may be configured to facilitate injection of nutrition such as total parental nutrition (TPN) into the blood.

In accordance with one aspect of the disclosure, the fetus's heart is used to drive blood flow through the oxygenation circuit 400, so a pump is not used to drive the blood through the oxygenation circuit 400. In other words, according to one aspect of the disclosure, the oxygenation circuit 400 is a pumpless circuit. The use of a pumpless system avoids exposure of the fetus's heart to excess preload encountered in non-pulsatile pump-assisted circuits. The pumpless system also permits intrinsic fetal circulatory regulation of flow dynamics. The oxygenator 410 preferably has very low resistance, low priming volume, low transmembrane pressure drops, and provides efficient gas exchange. In a particular embodiment, the oxygenator 410 has a pressure drop of less than about 50 mmHg or about 40 mmHg at 1.5 l/min of blood flow. In a particular embodiment, the priming volume of the oxygenator 410 is less than about 100 ml and in particular is less than about 85 ml. In a particular embodiment, the oxygenator 410 has a blood flow range up to about 2.0 l/min, about 2.5 l/min, about 2.8 l/min, or greater. In a particular embodiment, the oxygenator 410 has a gas transfer rate of about 150 ml/min, about 160 ml/min, about 180 ml/min, or greater for O2. In a particular embodiment, the oxygenator 410 is a hollow fiber membrane oxygenator (for example, but not limited to, a polymethyl pentene hollow fiber membrane oxygenator). The oxygenator 410 may be lined with anti-clotting measures/compounds such as immobilized polypeptide and/or heparin). An exemplary oxygenator is the Quadrox-iD™ pediatric oxygenator (Maquet; Wayne, N.J.).

The system 10 may be configured for use with fetuses, including term and preterm fetuses. The preterm fetus may be a premature fetus (for example, less than 37 weeks estimated gestational age, particularly 28 to 32 weeks estimated gestational age), extreme premature fetuses (24 to 28 weeks estimated gestational age), or pre-viable fetuses (20 to 24 weeks estimated gestational age). The gestation periods are provided for humans, though corresponding preterm fetuses of other animals may be used. In a particular embodiment, the preterm fetus has no underlying congenital disease. In a particular embodiment, the term or preterm fetus has limited capacity for pulmonary gas exchange, for example, due to pulmonary hypoplasia or a congenital anomaly affecting lung development, such as congenital diaphragmatic hernia. In a particular embodiment, the subject is a preterm or term neonate awaiting lung transplantation, for example, due to congenital pulmonary disease (e.g., bronchoalveolar dysplasia, surfactant protein B deficiency, and the like). Such transplantation surgeries are currently rarely performed in the United States. However, the number of transplantation surgeries may be increased with the more stable method for pulmonary support provided by the instant invention. The fetus 5 may also be a candidate for ex utero intrapartum treatment (EXIT) delivery, including patients with severe airway lesions and a long expected course before definitive resection. The fetus 5 may also be a fetal surgical or fetoscopic procedure patient, particularly with preterm labor precipitating early delivery. According to one aspect of the disclosure the system 10 is configured such that the fetus 5 may be maintained in the system 10 for as long as needed (for example, for days, weeks or months, until the fetus 5 is capable of life without the system 10).

Referring to FIGS. 8, 24, 25, 27, 29, 30, and 38, according to one aspect of the disclosure, the system 10 may be configured to displace the fetal chamber 100 so that the fetus 5 is not continuously maintained in the same orientation, for example with respect to the ground. Specifically, the system 10 may include a chamber displacement system 600 configured to displace the fetal chamber 100. The chamber displacement system 600 may be operable to tilt and/or rotate the fetal chamber 100 to alter the orientation of the fetus 5 and the fetal chamber 100 with respect to other portions of the system 10, for example the cart 50.

According to one embodiment, the displacement system 600 may be configured to raise, lower, or both, one or both ends 108, 109 of the fetal chamber 100 to tilt the fetal chamber 100 relative to a horizontal orientation, for example parallel to the ground. Specifically, each end 108, 109 of the fetal chamber 100 may be supported by an arm of the displacement system 600. Each of the arms can be independently extended or retracted to raise or lower each end of the fetal chamber 100. In this way, the fetal chamber can be tilted.

Alternatively, for example as illustrated in FIGS. 8, 25 and 38, the chamber displacement system 600 includes a cradle 610 having first and second supports 620, 625 that support the first and second ends 108, 109 of the fetal chamber 100. More specifically, the chamber frame 110 may include a first cradle mount 112 at the inlet 142 and a second cradle mount 112 at the outlet 144. The cradle mounts 112 mate with the arms of the cradle 610 to permit rotation of the fetal chamber about an axis 604 that extends through the cradle mounts 112. Additionally, the cradle 610 may be pivotable so that a first end of the cradle 610 may be pivoted upwardly relative to a second end of the cradle 610 to tilt the fetal chamber 100 relative the horizon.

The system 10 may be configured such that chamber displacement system 600 may be manually or automatically actuated. For instance, in a manual configuration the fetal chamber 100 is configured to be manually rotated about the axis 604, for example a horizontal axis by an operator. Similarly, the cradle 610 may be displaced vertically by pivoting one end of the cradle 610 upwardly as shown in FIG. 38. Alternatively, the chamber displacement system 600 may include a drive motor configured to drive rotation of the fetal chamber 100 about the axis 604, for example a horizontal axis. Similarly, the drive motor may drive the cradle 610 to tilt the cradle 610 vertically.

Figure 2:
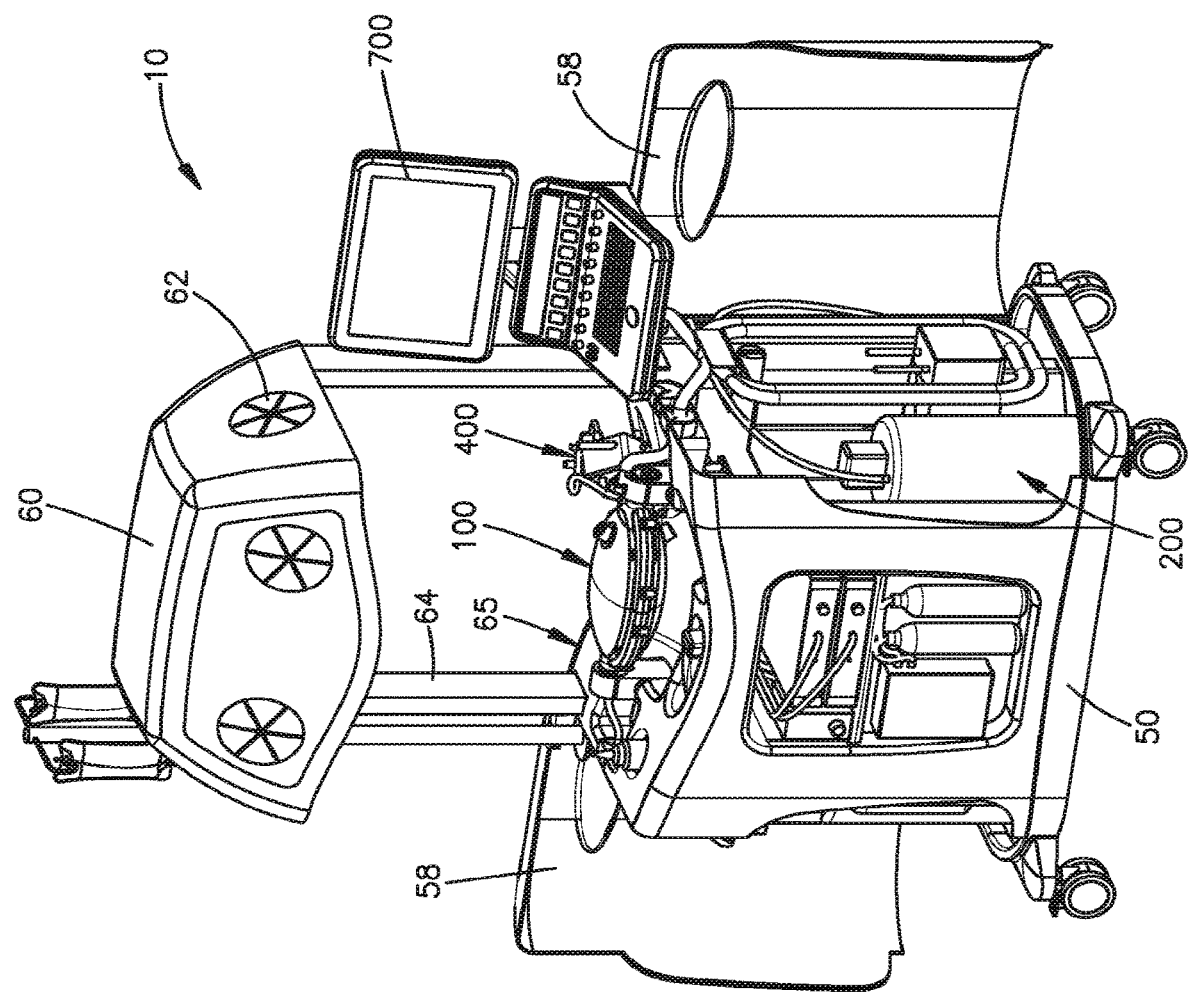
FIG. 2 is an isometric view of the extracorporeal support system illustrated in FIG. 1, in a second configuration.
Figure 3:
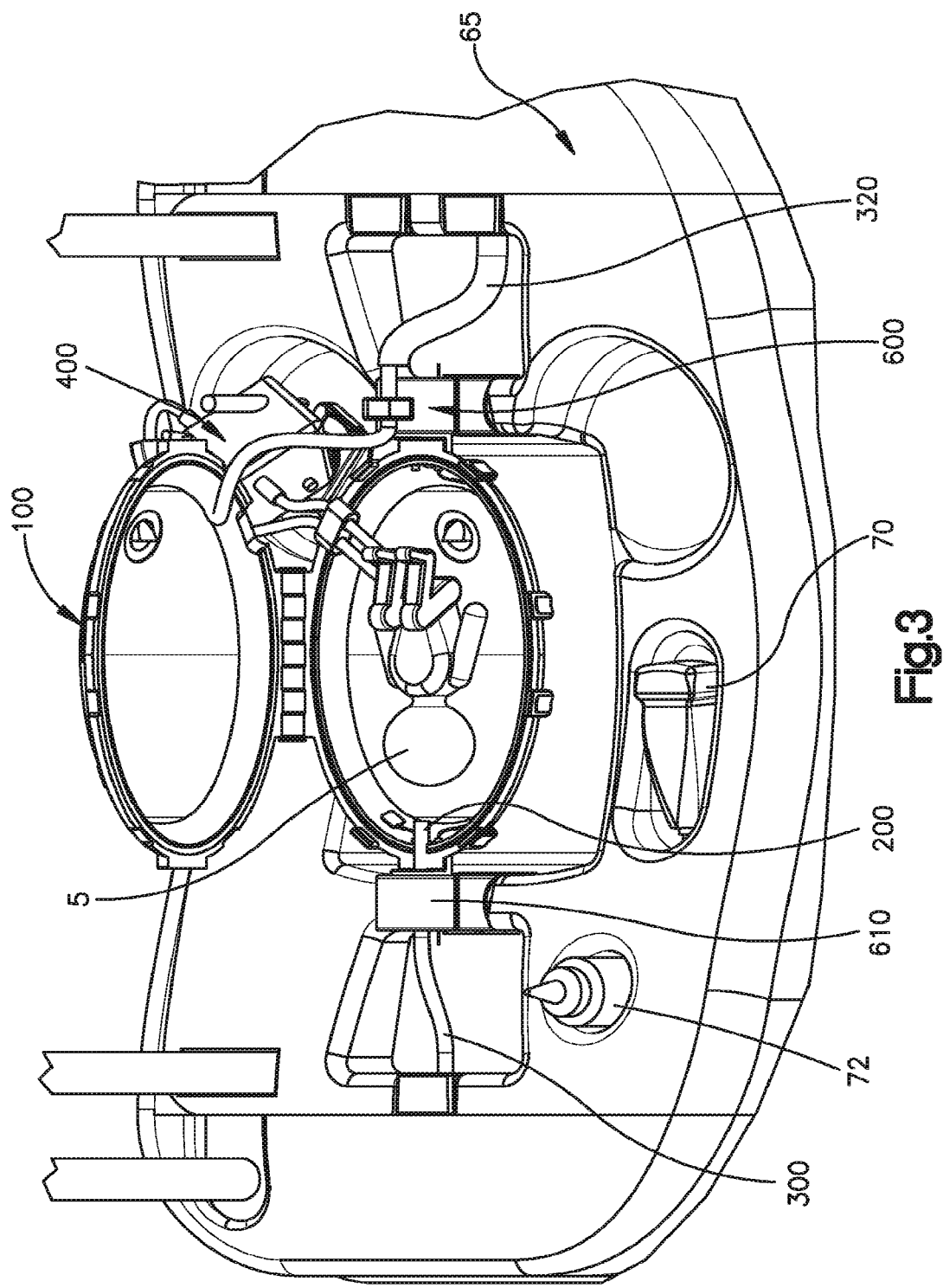
FIG. 3 is an isometric view of a portion of the extracorporeal support system illustrated in FIG. 1.

Referring to FIGS. 1 to 3, the system 10 may include a cart 50 such that the system 10 is transportable from one area in a medical facility, such as an operating room, to another area in the medical facility, such as a neonatal care center, without needing to remove the fetus 5 from the fetal chamber 100.

The cart 50 may incorporate any of a plurality of elements of the system 10. For instance, the cart 50 may include a hood 60 configured to enclose and/or cover the fetal chamber 100 to limit access to the fetal chamber 100. The hood 60 may be pivotable or the hood 60 may be translatable, for example by lifting one or more support arms 64 to provide access to an interior of the hood 60 as necessary.

The hood 60 may form an enclosure with a tray 65 below the fetal chamber 100 to provide a sealed enclosure thereby isolating the fetal chamber 100 from external disturbances such as light, sound or other elements that could excite or otherwise disturb the fetus 5, which can be detrimental to the growth of the fetus 5. The hood 60 may include sealable access ports 62 sized to allow medical professionals to access the fetal chamber 100 without lifting the hood 60.

The cart 50 may also include a plurality of therapeutic or diagnostic elements to facilitate treatment of the fetus 5 while the fetus 5 is within the fetal chamber 100. For instance, the cart 50 may include an IV pole 80 configured to support an IV bag containing medication nutrition or other therapeutic solutions to be infused into the fetal chamber 100, amniotic circuit 200 or oxygenation circuit 400.

The tray 65 may include areas configured to organize diagnostic items, such as an ultrasound probe 70 that is connected with an ultrasound computer configured to process the ultrasound image data acquired by the ultrasound probe 70. Similarly a bin is provided for a container of ultrasound gel 72, the ultrasound gel configured to facilitate use of the ultrasound probe 70 to scan the fetus 5 to monitor the development of the fetus 5.

The cart 50 may also include one or more access doors 58 to facilitate access to the various components of the system 10, for example the amniotic fluid circuit 200 and the oxygenation circuit 400 when necessary while limiting access to the components of the system 10 at other times.

The cart 50 further includes a mount for supporting the central controller 700 for the apparatus, which in the present instance is a computer having a display 710 configured to display operating parameters and alerts and an input/output mechanism to allow the operator to input data or control aspects of the process. The input/output mechanism may include one or more input devices, including but not limited to a keyboard, mouse and track pad.

Figure 15:
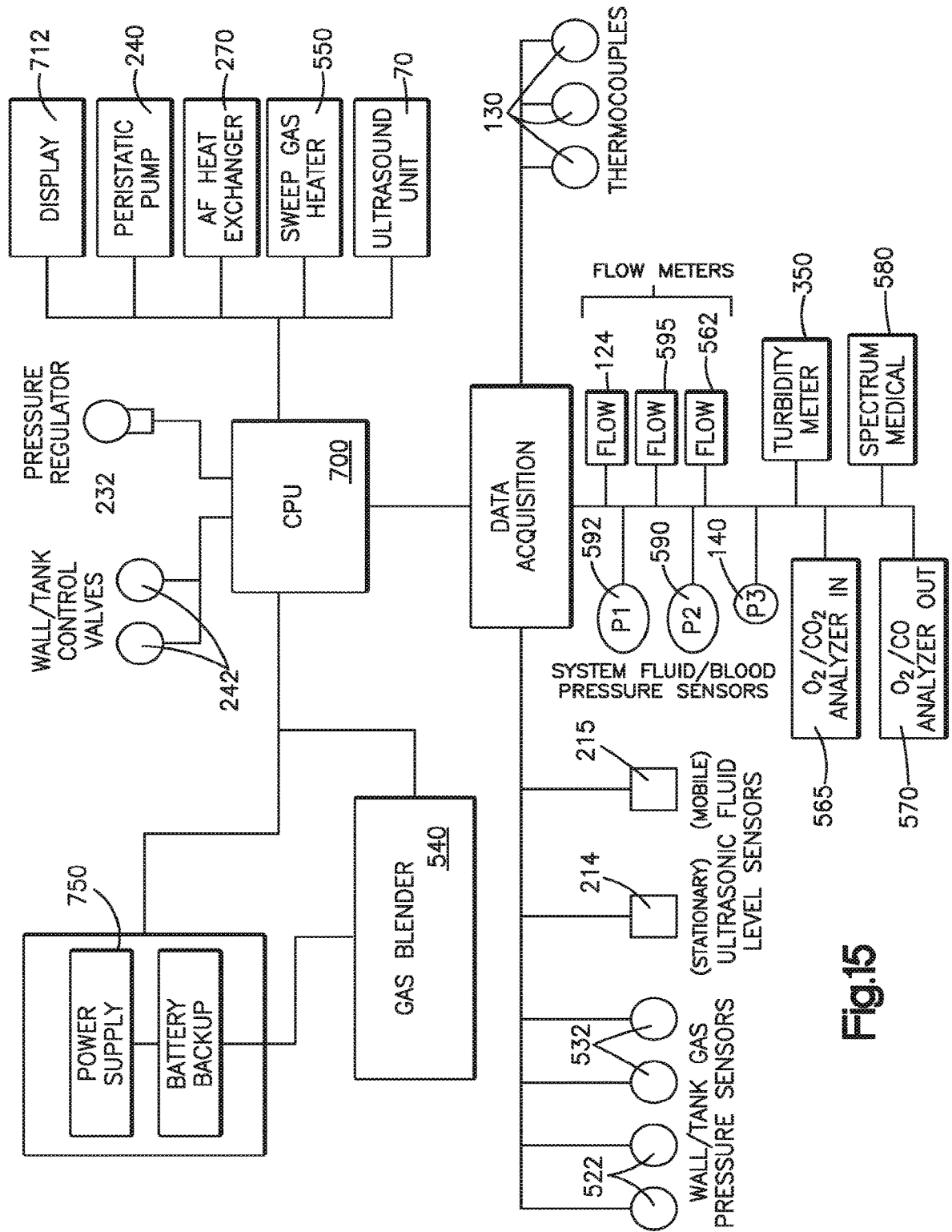
FIG. 15 is a diagrammatic view illustrating the interconnection between a central controller and a plurality of sensors and controls of the extracorporeal support system illustrated in FIG. 1, according to one embodiment.

Referring to FIG. 15, the central controller 700 receives signals from various sensors and elements of the system 10 and provides control signals to various components to control the operation of the system 10. Specifically, the central controller 700 may receive signals from sensors such as the gas pressure sensors 522, 532 and in response to those signals the central controller 700 may control the gas blender 540 accordingly. Similarly, the central controller 700 may receive signals from the turbidity meter 350 and control the operation of pump 240.

Figure 13:
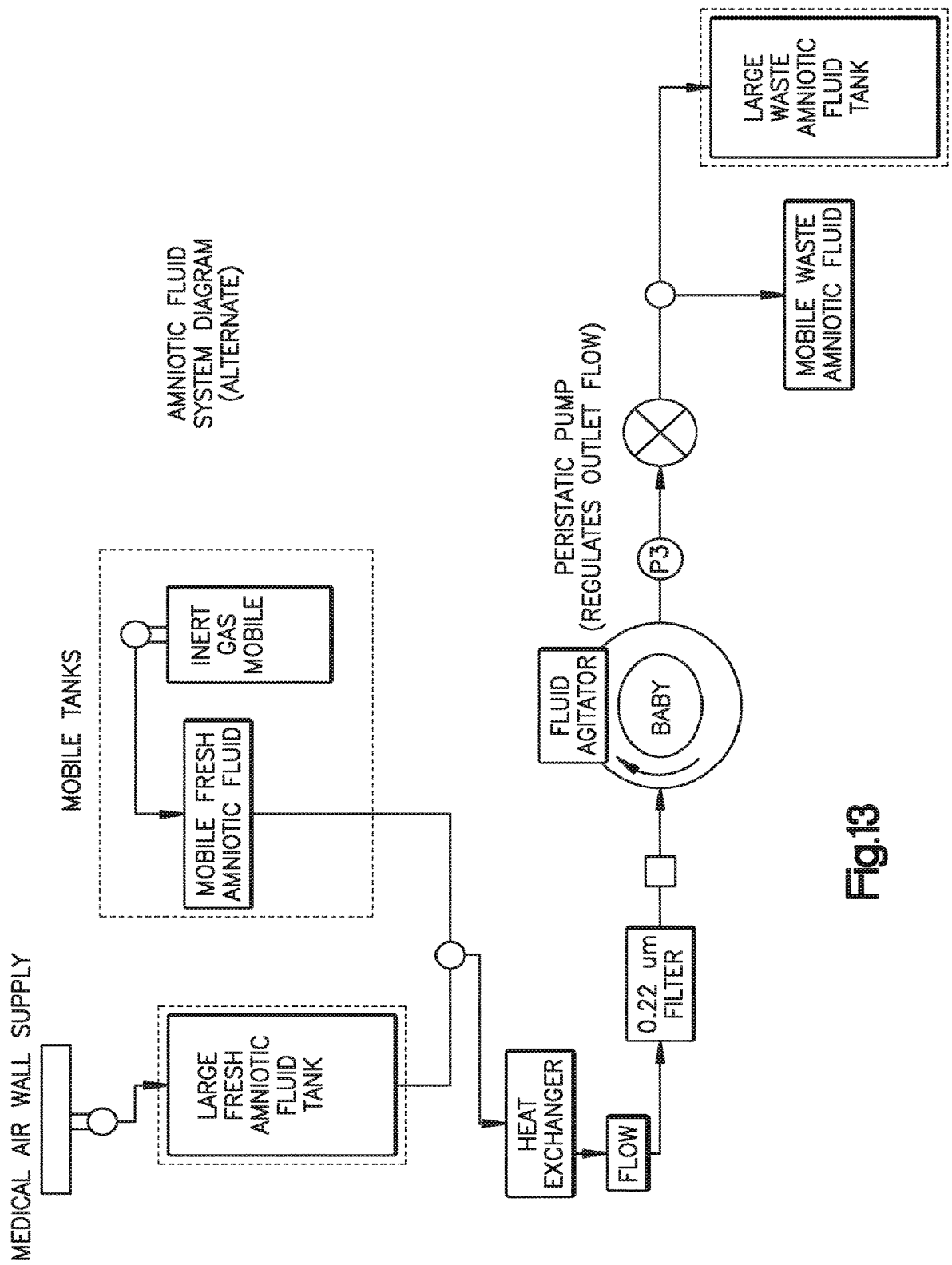
FIG. 13 is a diagrammatic view of an amniotic fluid circuit of the extracorporeal support system illustrated in FIG. 1, according to another embodiment.
Figure 16:
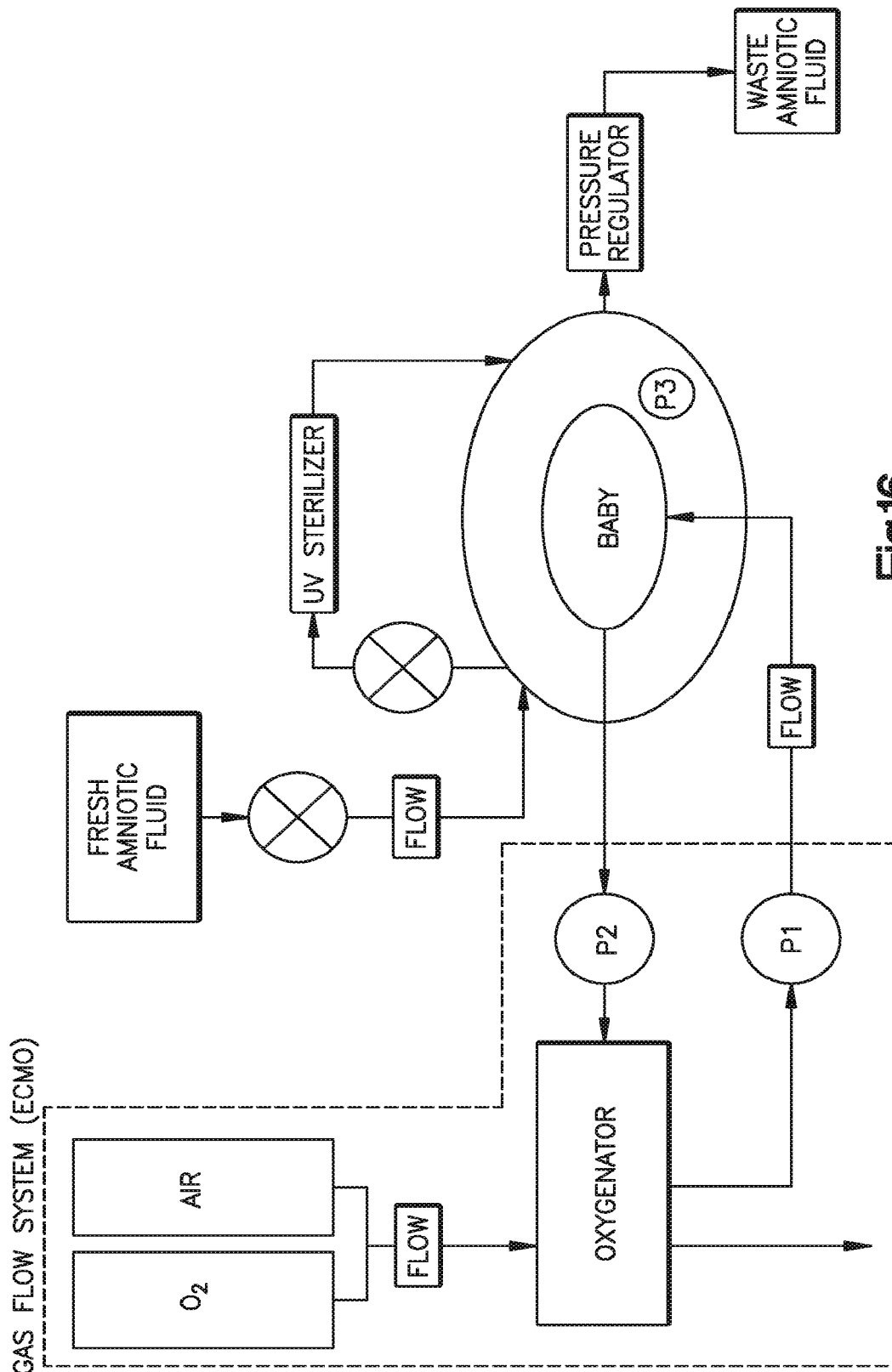
FIG. 16 is a diagrammatic view of an amniotic circuit and an oxygenation circuit of the extracorporeal support system illustrated in FIG. 1, according to one embodiment.
Figure 18:
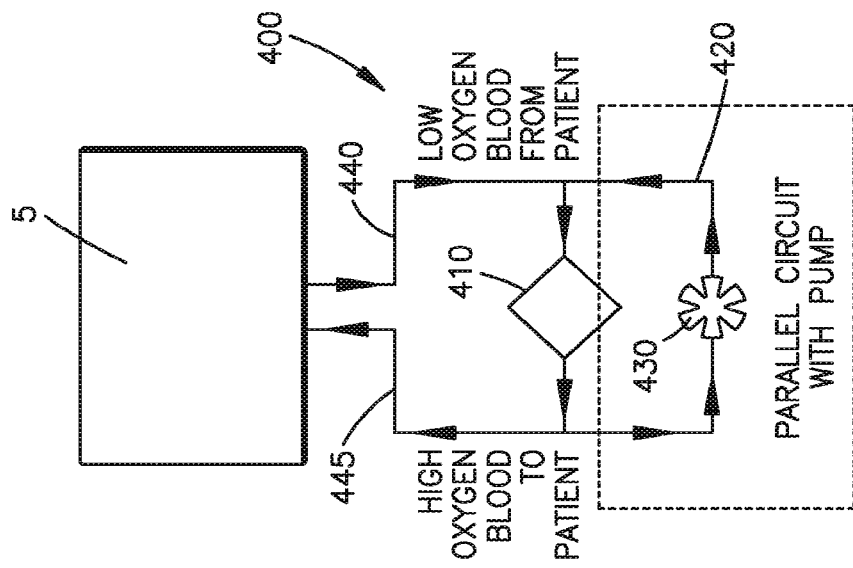
FIG. 18 is a diagrammatic view of the transfer of a fetus from in-utero to the extracorporeal support system illustrated in FIG. 1.

It will be recognized by those skilled in the art that changes or modifications may be made to the embodiments described above without departing from the broad inventive concepts of the disclosure. For instance, as shown in FIG. 13, the fetal chamber 100 may include a fluid agitator operable to agitate and/or circulate the amniotic fluid within the fetal chamber 100 to minimize stagnate areas in the fetal chamber 100. Additionally, as shown in FIG. 16, the amniotic fluid circuit 200 may incorporate a circulation loop that circulates amniotic fluid from the fetal chamber 100 to a sterilizing element, such as a UV sterilizer and then feeds the amniotic fluid back into the fetal chamber 100.

Figure 17:
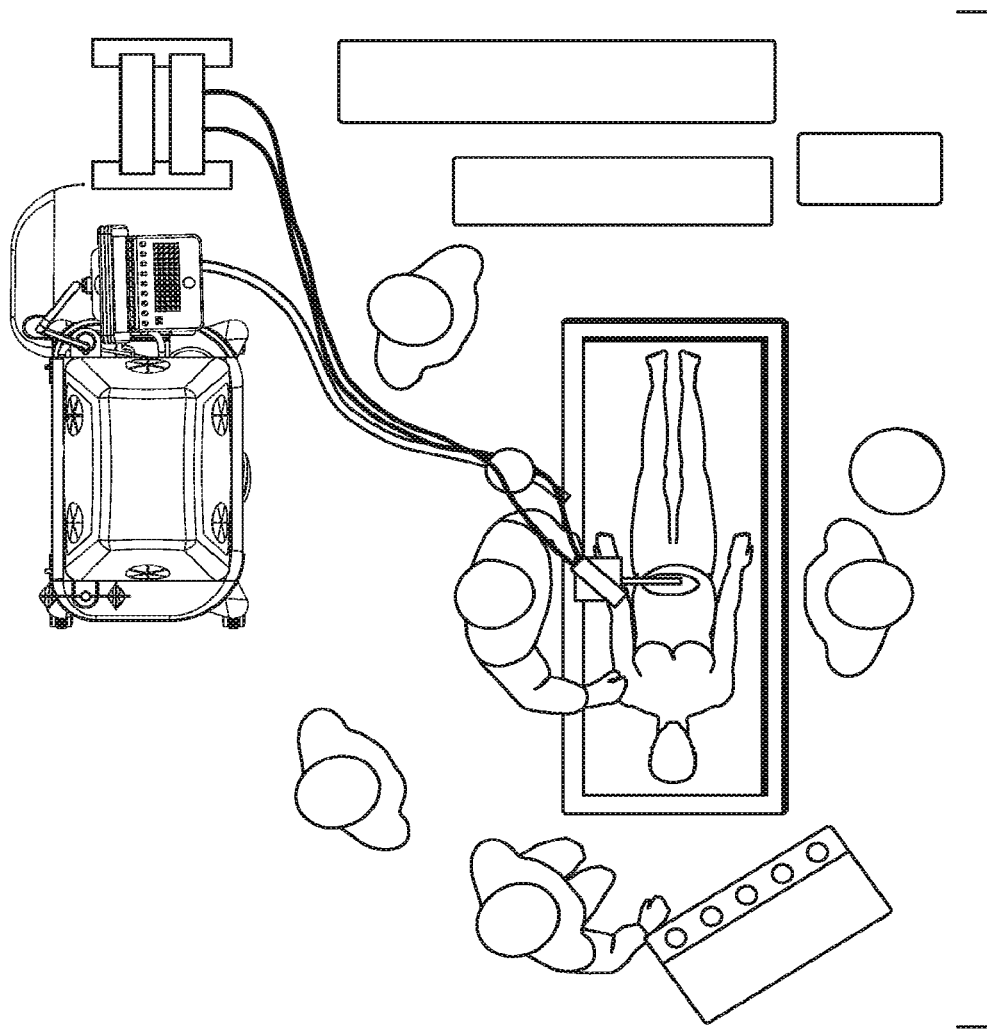
FIG. 17 is a diagrammatic view of an oxygenation circuit of the extracorporeal support system illustrated in FIG. 1, according to another embodiment.

Referring to FIG. 17, according to one aspect of the disclosure the oxygenation circuit 400 may include a recirculation path configured to provide an increased flow of blood through the oxygenator 410 to impede the formation of blood clotting in the oxygenator 410. As shown in the illustrated embodiment, the oxygenator 410 is connected with the fetus 5 and the oxygenation line, which includes two fluid lines: the drain line 440 and the infusion line 445. Blood flows from the fetus 5 though the drain line 440 to the oxygenator 410, then the blood flows through the oxygenator 410 and returns to the fetus 5 via the infusion line 445.

The volume of blood flowing through the oxygenation circuit 400 varies based on the size of the fetus 5. Smaller fetuses have lower blood flow than older/larger fetuses. When the fetus 5 is small, the lower flow of blood through the oxygenation circuit 400 may increase areas of stagnation or low flow in the oxygenation circuit 400, which can lead to clot formation. It may be possible to ameliorate clot formation by using heparin. However, it may be desirable to avoid or limit the use of heparin.

To increase the flow of blood through the oxygenator 410, the oxygenation circuit 400 may include a recirculation loop 420. The recirculation loop 420 is a circulation loop that is parallel to the drain line 440 and the infusion line 445. The recirculation loop 420 may be connected with the oxygenator 410 in a variety of ways to allow a portion of the blood in the oxygenation circuit 400 to re-circulate rather than flowing directly to the fetus 5. For example, the oxygenator 410 may include a pair of inlet connections and a pair of outlet connections. The recirculation loop 420 may be connected directly to an inlet of the oxygenator 410 and an outlet of the oxygenator 410, while the drain line 440 is connected to another of the inlet connectors and the infusion line 445 is connected with another of the outlet connectors of the oxygenator 410. Alternatively, the recirculation loop 420 may be connected with the drain line 440 so that the two lines merge to flow into the oxygenator 410.

Similarly, the recirculation loop 420 may be connected with the infusion line 445 so that the flow of blood exiting the oxygenator splits, with part of the blood flow flowing to the fetus 5 via the infusion line 445 and part of the blood flow recirculating to the oxygenator 410 via the recirculation loop 420. In either configuration, the flow of blood from the outlet of the oxygenator 410 is split so that a portion of the blood flows to the fetus 5 via the infusion line 445, while a portion of the blood flows through the recirculation loop 420 and then flows back into the inlet of the oxygenator 410.

To increase the blood flow through the oxygenator 410, the recirculation loop 420 may include a fluid pump 430. The fluid pump 430 may be any of a variety of pumps configured to pump fluid, including but not limited to centrifugal pumps and positive displacement pumps, such as peristaltic pumps. The fluid pump 430 provides the recirculation loop 420 within an increased flow of fluid relative to the fluid flow through the drain line 440 and the infusion line 445. More specifically, the fluid flow through the recirculation loop 420 may be at least twice the flow rate as the flow through the drain line 440 and the infusion line 445. For instance, the pump may provide a flow rate of 400 mL/min through the recirculation loop 420, while the flow rate through the drain line 440 and the infusion line 445 may be approximately 100 mL/min. In this way, the flow from the recirculation loop 420 and the drain line 420 combine to provide and increased flow of blood through the oxygenator 410. As a result, the increased fluid flow through the oxygenator 410 reduces pooling and stagnant areas within the oxygenator 410, thereby limiting the formation of blood clots within the oxygenator circuit 400.

Although the flow of blood through the oxygenator 410 is increased, the oxygenation circuit 400 is configured so that the flow rate of blood returning to the patient is not increased by the presence of the recirculation loop 420. In other words, the flow of fluid from the fetus 5 and returning to the fetus 5 is substantially unaffected by the recirculation loop 420. The fluid pump 430 provides a steady flow of fluid into the oxygenator 410 and diverts a substantially equal flow of fluid from the outlet of the oxygenator 410. Therefore, the fluid flow to the infusion line 445 that returns to the fetus 5 is substantially similar to the fluid flow from the drain line 445. In this way, the fluid pump 430 is not in line with the fluid flow from the fetus 5 to the oxygenator 410 so that the fetus's heart primarily controls the flow of blood flowing from the fetus 5 to the oxygenator 410 and returning to the fetus 5.

By incorporating a recirculation loop 420 to increase the flow of fluid through the oxygenator 410, the infusion of heparin into the fetus 5 to prevent blood clots in the oxygenation circuit 400 may be reduced or eliminated. However, for the internal surfaces of the oxygenation circuit 400 that come into contact with the fetus's blood, it may be desirable to coat such surfaces with a biologically-active compound that prevents clot formation.

Figure 19:
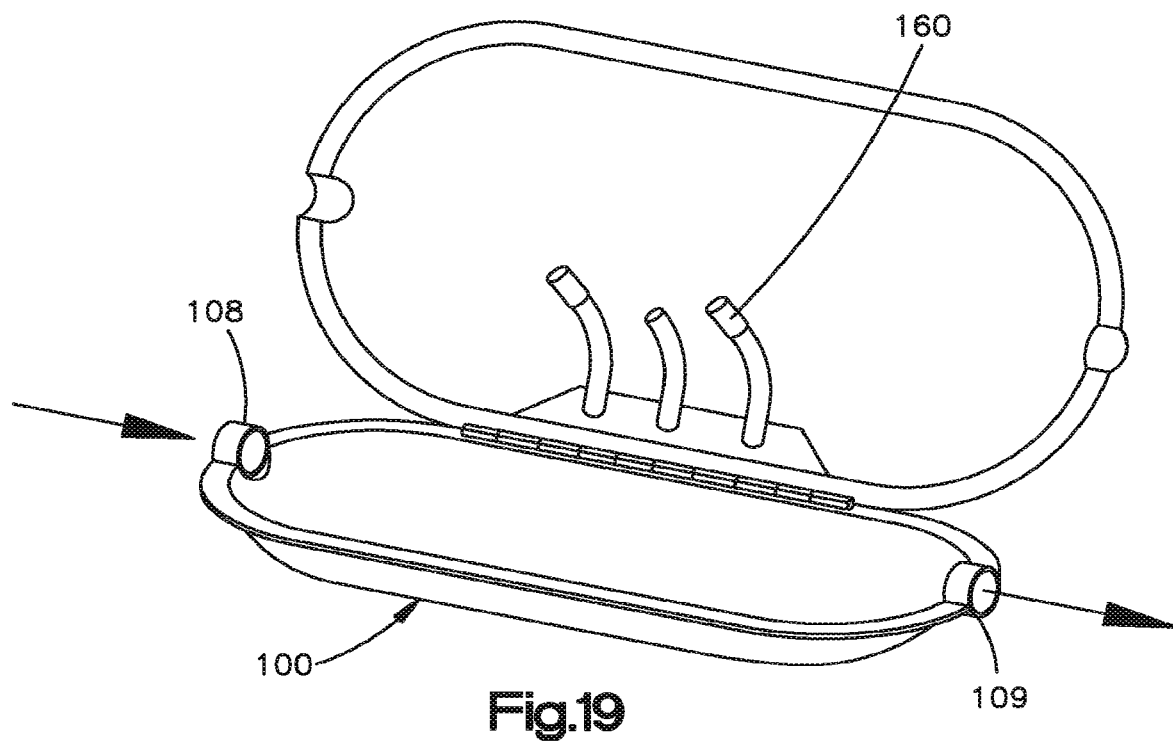
FIG. 19 is an isometric view of a fetal chamber of the extracorporeal support system illustrated in FIG. 1, according to another embodiment, the fetal chamber in an open configuration.
Figure 20:
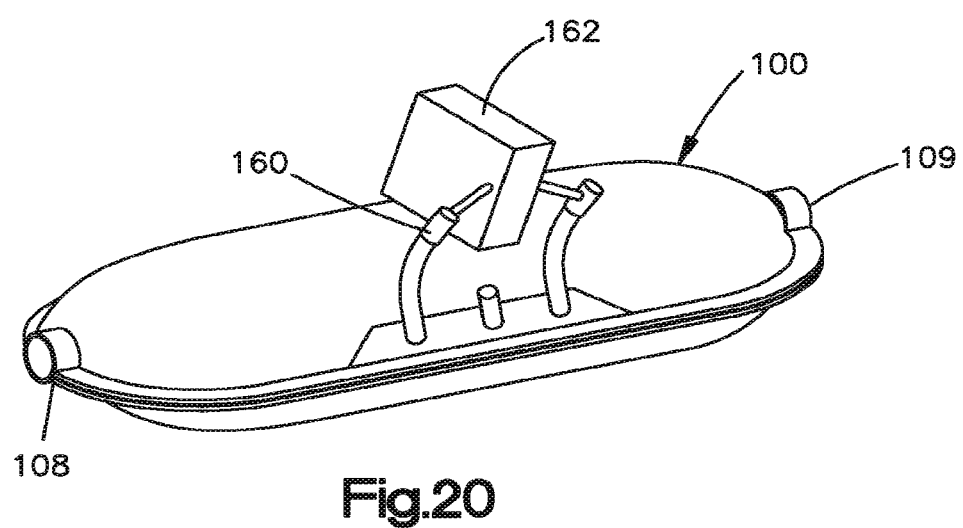
FIG. 20 is an isometric view of the fetal chamber illustrated in FIG. 19, in a closed configuration.

Referring to FIGS. 19, 20, 23, and 23-38 the system 10 may include one or more of the fetal chambers 100 in various configurations. For example, FIGS. 19 and 20 illustrate an embodiment of the fetal chamber 100 having less of a taper at the ends 108 and 109 incorporating further connectors in the fetal chamber 100, such as a connector 160 configured to connect to an ultraviolet sterilization unit 162.

Referring to FIGS. 23 to 26, the fetal chamber 100 of the system 10 may include a supplemental heating element 164 within the fetal chamber 100 configured to heat the amniotic fluid within the fetal chamber 100 to help maintain the fluid temperature within a predetermined range. As illustrated in FIG. 25, the fetal chamber 100 may include a plurality of rollers 166 that can be driven in a first direction to tilt the cradle 610 in a first direction or driven in a reverse direction to tilt the cradle 610 in a second direction.

Referring to FIGS. 27 to 30 the system 10 may include a fetal chamber 100 devoid of the rigid frame 110. Instead, the fetal camber 100 is a generally tubular film 168 having an access opening along one side to facilitate entry of the fetus 5 into the fetal chamber 100. The access opening includes a closure such as a slide lock mechanism to provide a fluid-tight seal. As shown, the ends 108, 109 of the fetal chamber 100 may be supported by hubs 170 that seal off the open ends of the tubular film 168 and that also provide access ports for the amniotic fluid inlet 142, the amniotic fluid discharge 144, the drain line 440, and the infusion line 445. The hubs 170 may further include cogs 172 configured to facilitate rotation of the fetal chamber 100 by corresponding gears.

Figure 32:
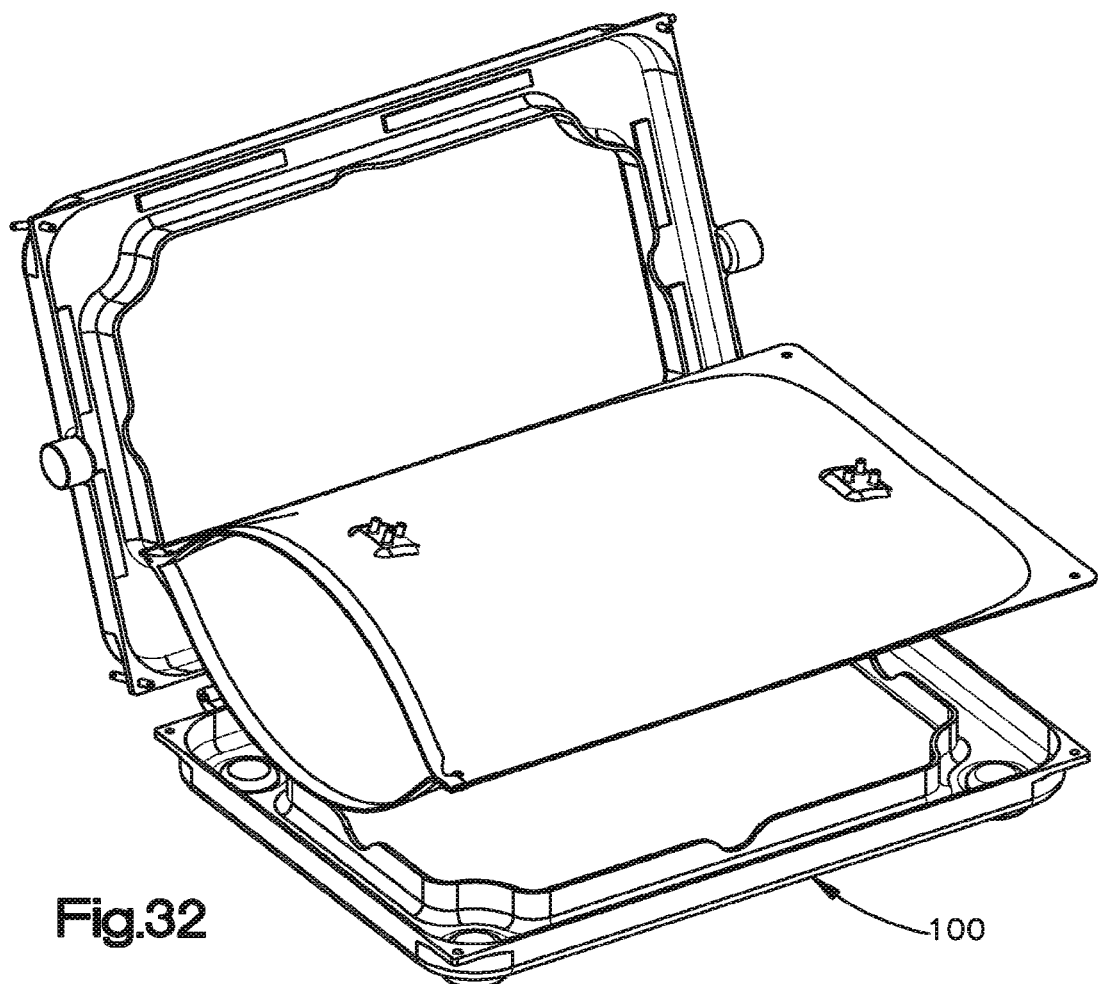
FIG. 32 is an isometric view of the fetal chamber illustrated in FIG. 31, the fetal chamber in a closed configuration.
Figure 33:
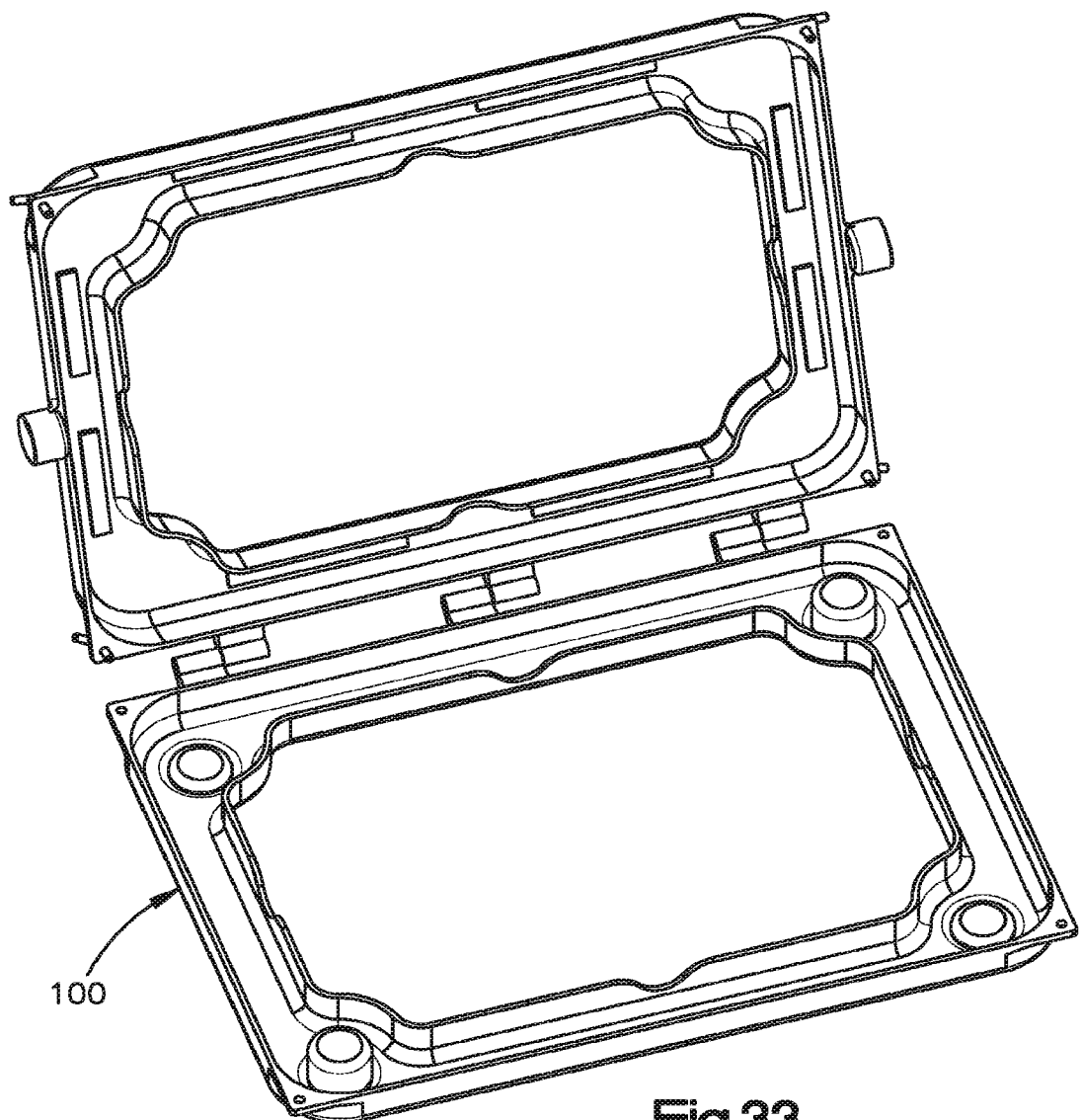
FIG. 33 is an isometric view of a portion of the fetal chamber illustrated in FIG. 31.
Figure 34:
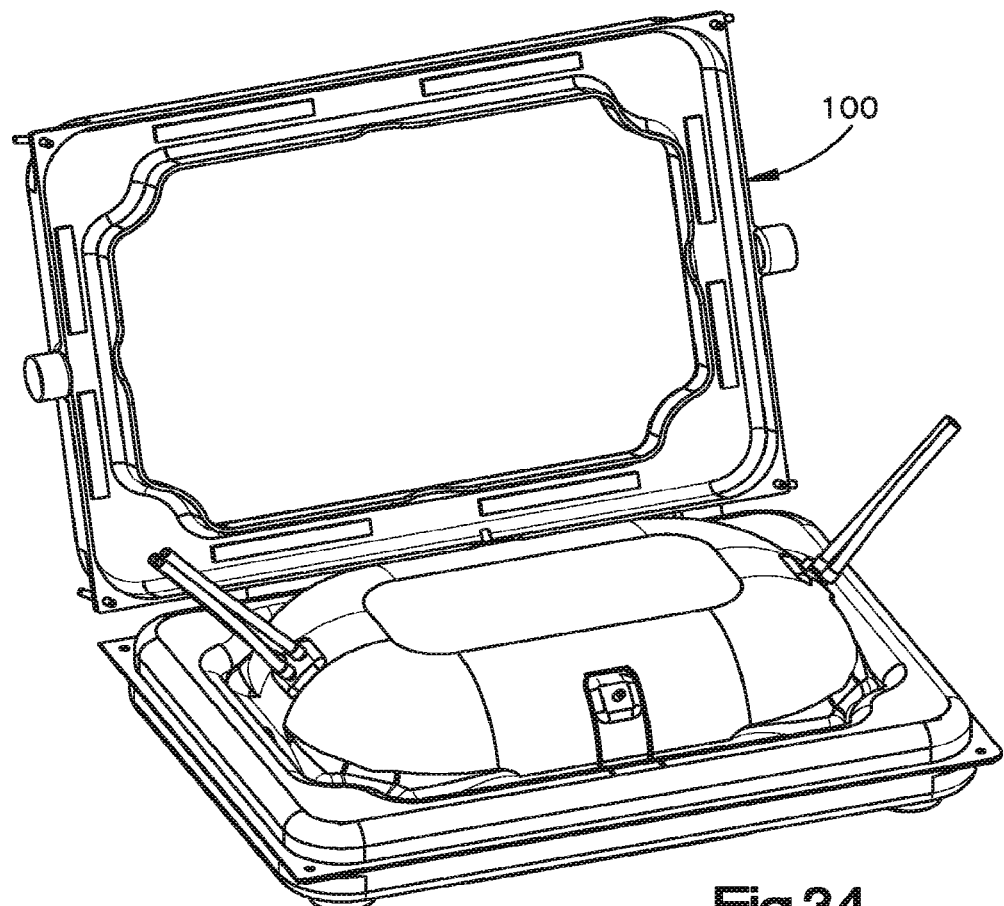
FIG. 34 is an isometric view of the fetal chamber illustrated in FIG. 31, according to another embodiment.
Figure 35:
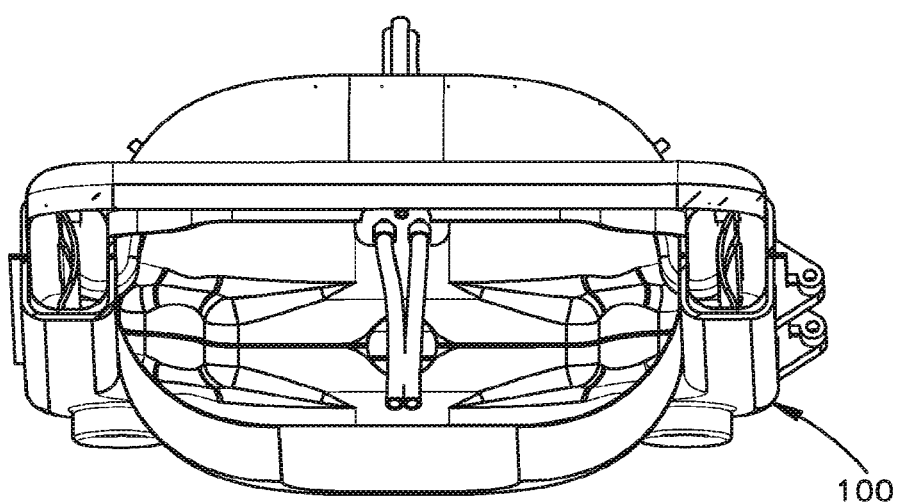
FIG. 35 is another isometric view of the fetal chamber illustrated in FIG. 34.
Figure 36:
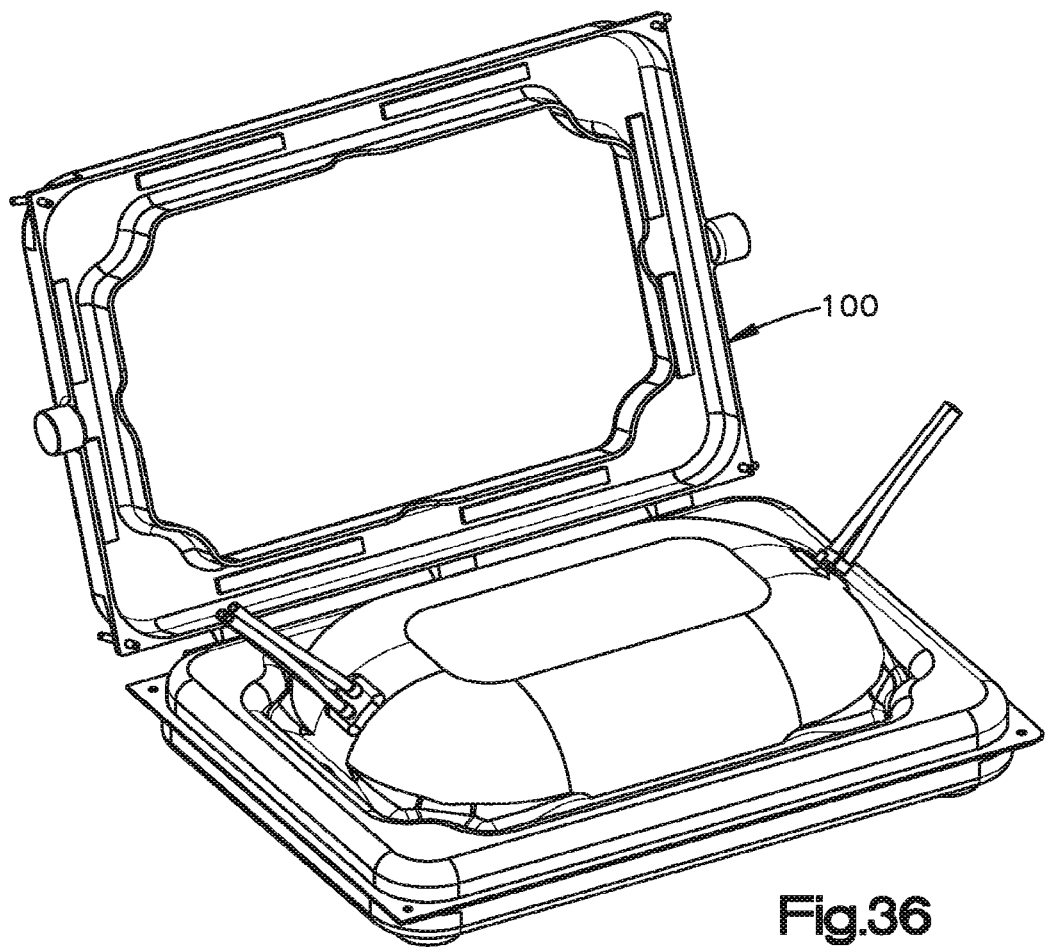
FIG. 36 is an isometric view of the fetal chamber illustrated in FIG. 31, according to another embodiment.
Figure 37:
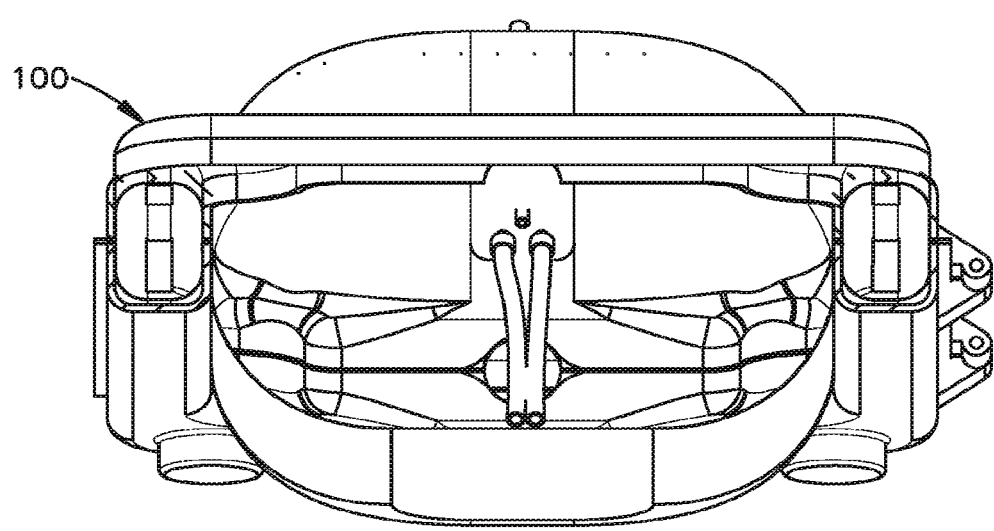
FIG. 37 is another isometric view of the fetal chamber illustrated in FIG. 36.

Referring to FIGS. 31 to 33, the fetal chamber 100 of the system 10 may include a hinged frame and a flexible bag having an access opening to facilitate entry of the fetus 5 into the fetal chamber 100. A slide lock maybe provided to seal the access opening and the edges of the bag are configured to be clamped between the upper and lower hales of the frame to provide a secondary seal. Displaceable elements, such as solenoid actuator, may be disposed in the corners of the frame. The actuators raise and lower the corners of the frame to agitate the fluid within the fetal chamber 100, thereby minimizing stagnant areas in the fetal chamber 100. Referring to FIGS. 34 to 37, the system 10 may include separate fluid chambers that can be inflated and deflated to agitate the fluid in the fetal chamber 100.

Figure 40:
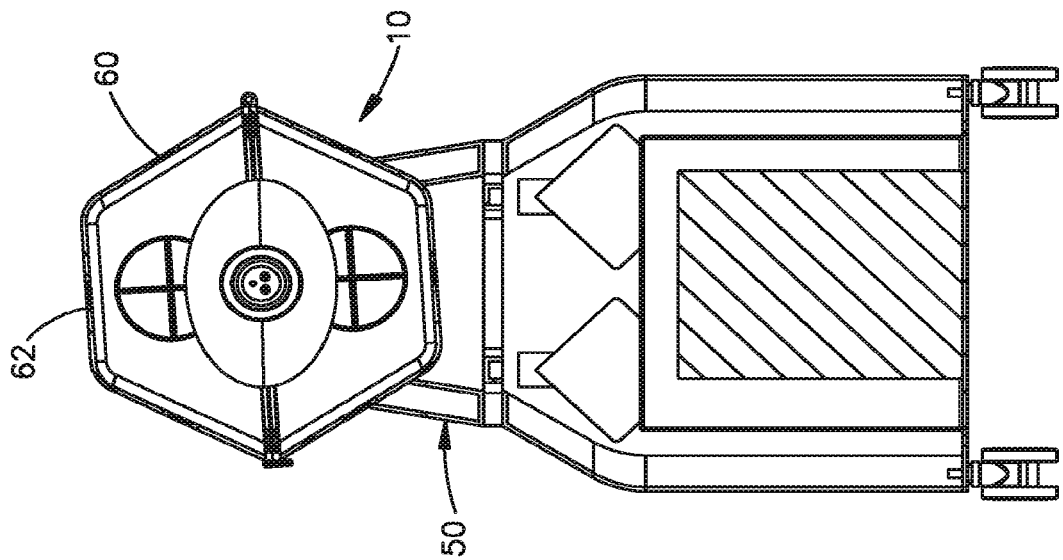
FIG. 40 is a side elevation view of the extracorporeal support system illustrated in FIG. 39.
Figure 39:
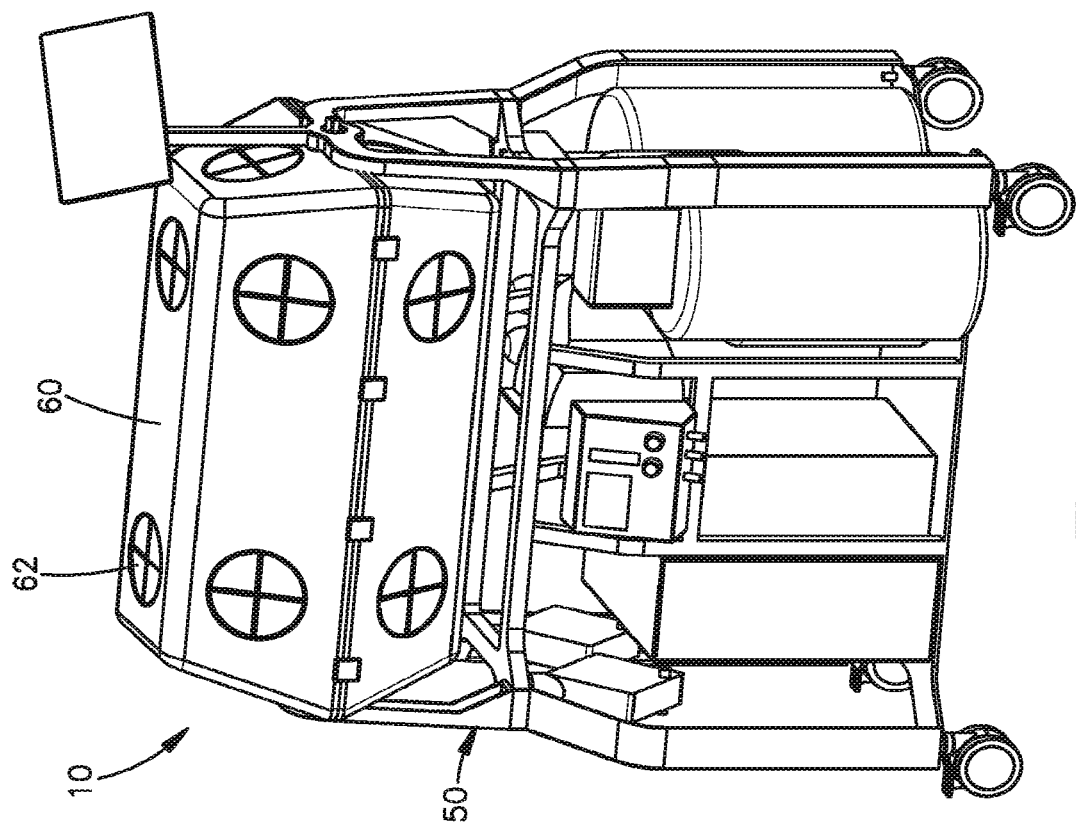
FIG. 39 is an isometric view of an extracorporeal support system in a first configuration, according to another embodiment, the extracorporeal support system in a closed configuration.
Figure 41:
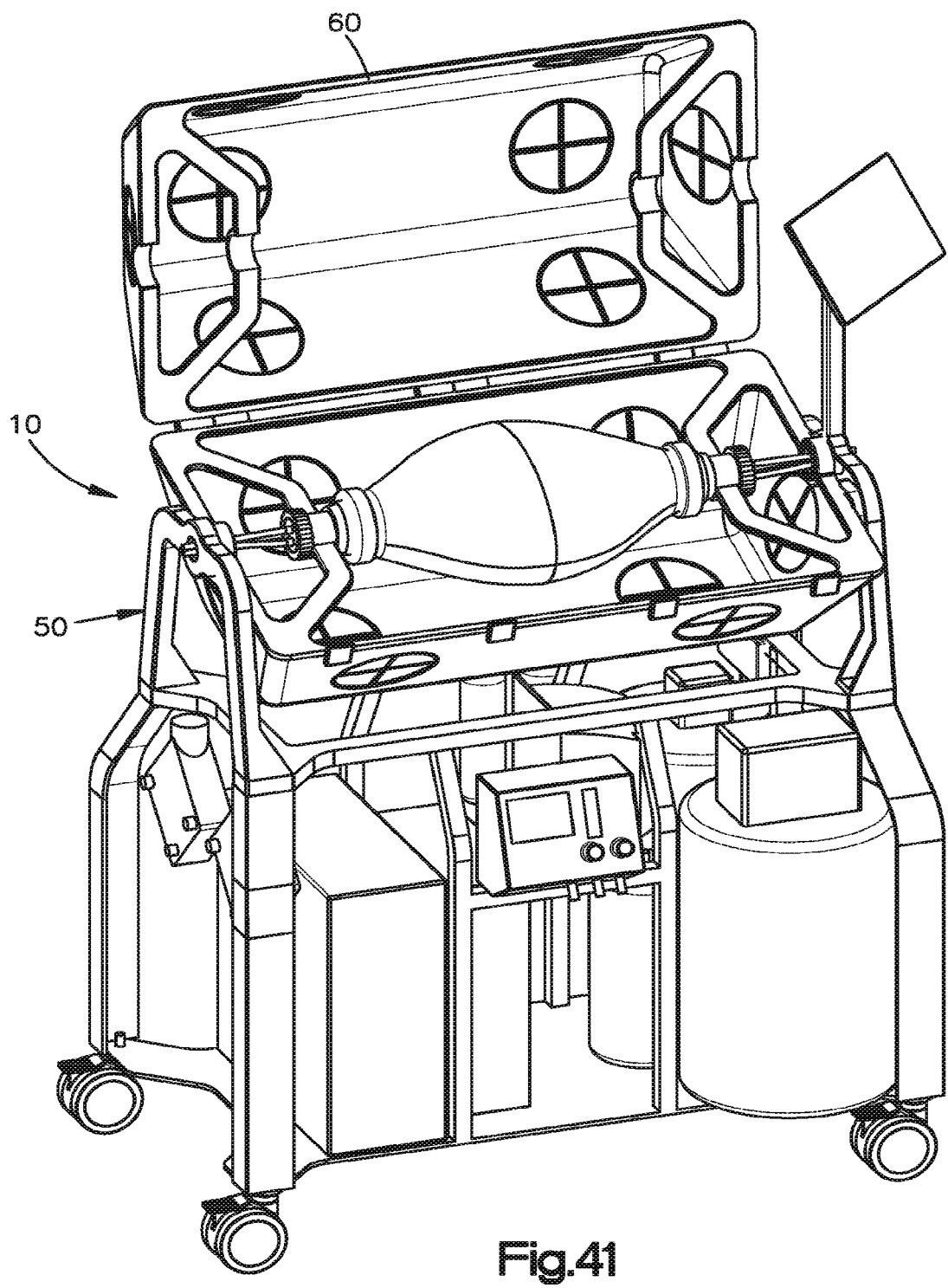
FIG. 41 is an isometric view of the extracorporeal support system illustrated in FIG. 39, in an open configuration.

Referring to FIGS. 39 to 41, the cart 50 of the system 10 may be configured as shown in the illustrated embodiments. According to one aspect of the disclosure, the cart 50 includes a rotatable hood 60 that encloses the fetal chamber 100. The entire hood 60 may be configured to rotate as the fetal chamber 100 is rotated. To facilitate access into the hood 60, access ports 62 are spaced around each side of the hood 60.

Additionally, as described above the fetal chamber 100 may be configured to have a variable volume so that the volume can expand as the fetus 5 grows. One mechanism described above includes a series of restriction plates that limit the amount the fetal chamber 100 can expand. Alternatively, the fetal chamber 100 may comprise a reservoir having one or more dividers that segment the reservoir. The volume of the reservoir can be increased by manipulating or removing one or more of the dividers. In such an arrangement, the wall of the fetal chamber 100 may be generally rigid rather than having one or more flexible walls. Accordingly, it should be understood that a variety of variable volume fluid reservoirs can be used as the fetal chamber 100.

The singular forms "a," "an," and "the" include both single and plural referents unless the context clearly dictates otherwise. As used herein, the terms "host," "subject", "fetus", "infant" and "patient" refer to any animal, including mammals, for example but not limited to humans.

The following example is provided to illustrate various embodiments of the present disclosure. The example is illustrative and is not intended to limit the scope of the claims in any way.

An extracorporeal support system was provided using a pumpless circuit containing a near zero resistance oxygenator (MaquetQuadrox-ID Pediatric Oxygenator: Maquet Cardiopulmonary AG, Rastatt, Germany). The animals were maintained with both systemic antibiotics and antibiotics added to the fluid, parenteral nutrition modified to a formulation based on substrate requirements of premature lambs, sedation as required, and prostaglandin E2 (PGE2) infusions.

Fetal lambs were placed directly on the extracorporeal support system circuit after exposure by maternalhysterotomy and connection of the oxygenator in an antegrade orientation, with arterial inflow from a cannula placed in the right common carotid artery and venous return via a cannula in the right jugular vein inserted to the depth of the right atrium. Once full circuit flow was established, the fetal lamb was removed from the uterus and was immersed in an open incubator filled with fluid, with an electrolyte composition designed to mimic amniotic fluid. No vasopressors were utilized at any time during the runs once the lamb was stable on the circuit.

The early gestation fetal lambs were maintained in a fetal chamber formed of a flexible bag, referred to herein as a "Biobag". The Biobag is a single use, completely closed system having a variable volume that can be optimized for the size of the fetus. Additionally, the configuration and number of ports, and flow and volume of fluid exchange can be optimized for a particular fetus. The Biobag was formed out of silver impregnated metallocenepolyethylene film and incorporated a parallel circuit containing a UV light chamber for additional antibacterial effect. The Biobag has an open, sealable side to facilitate insertion of the fetus at the time of cannulation and has the beneficial properties of being translucent and sonolucent for monitoring and scanning the fetus. The Biobag was contained within a mobile support platform that incorporated temperature and pressure regulation, padding, and fluid reservoirs along with fluid exchange circuitry.

The Biobag was constructed of metallocene polyethylene film (about 80 micrometers thick) containing 2% silver cation; the later imparts antimicrobial properties to the film. Prior to heat-welding the bag to shape, several through-wall barbed disc-ports were heat welded to the film sheet. There are four barbed ¼" disc ports (Eldon James: PND4-E8402-QC), four threaded 1" disc ports (Eldon James: PD38-400-E8402-QC), one barbed ⅜" disc port (Eldon James: PND6-E8402-QC), and one barbed ⅝" disc port (Eldon James: PND10-E8402-QC).

Figure 42:
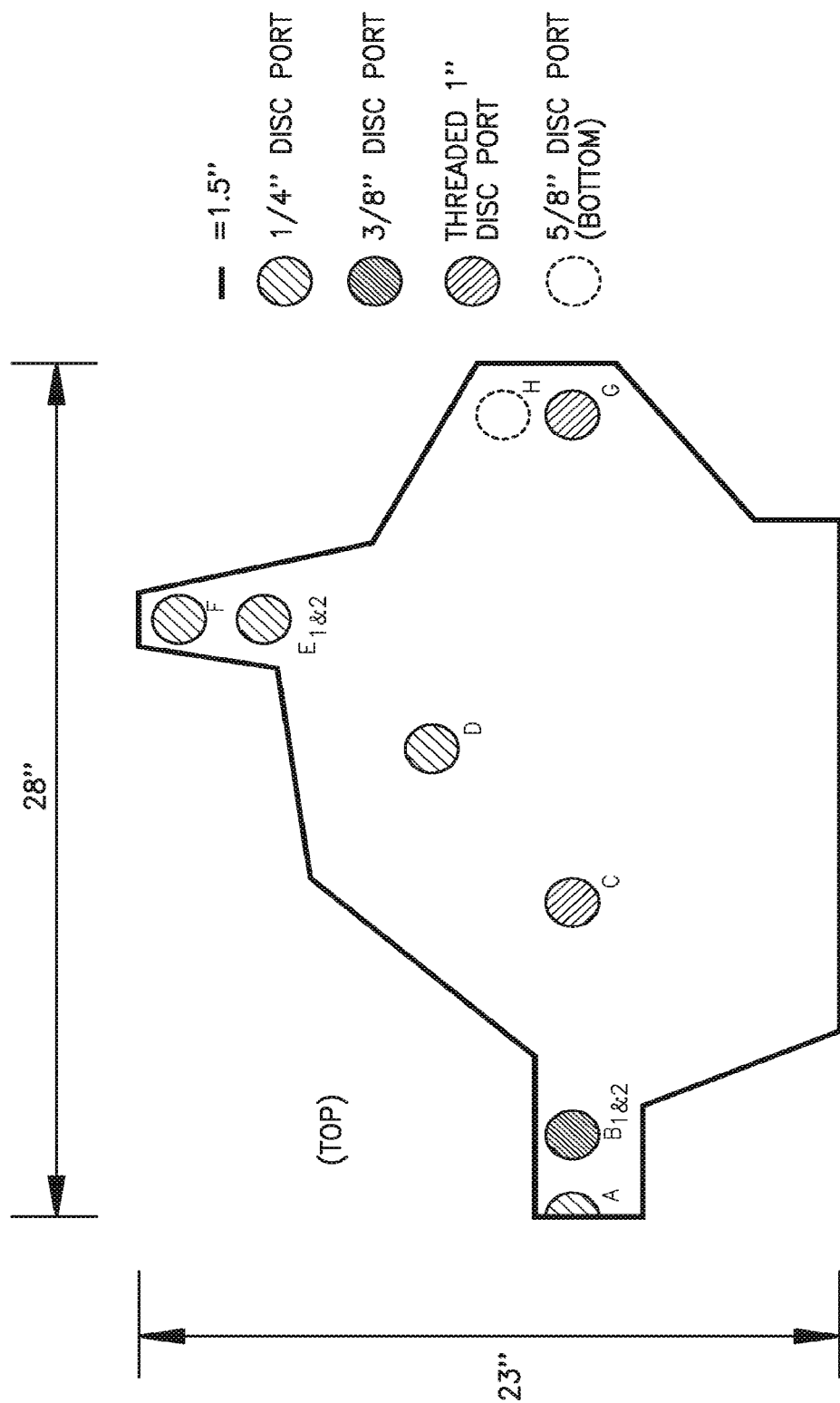
FIG. 42 is a diagrammatic view of a fetal chamber of the extracorporeal support system, according to one embodiment.
Figure 43:
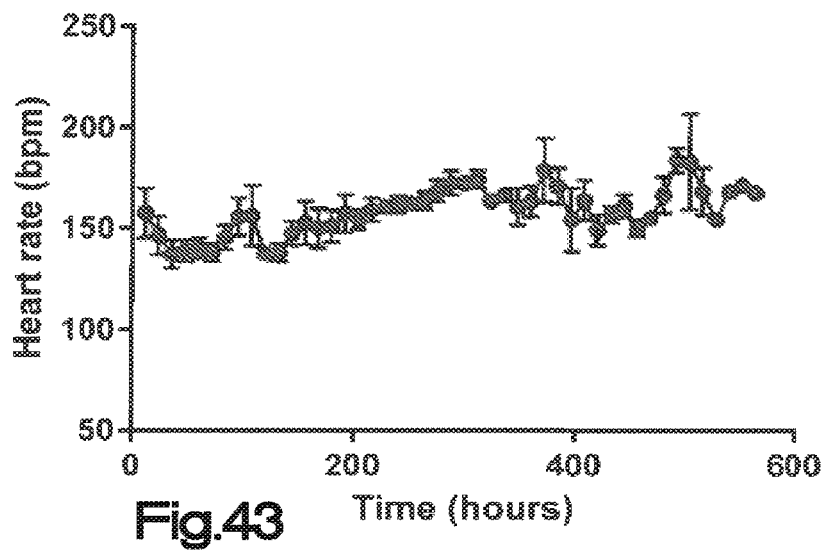
FIG. 43 is a first graph illustrating experimental results.
Figure 44:
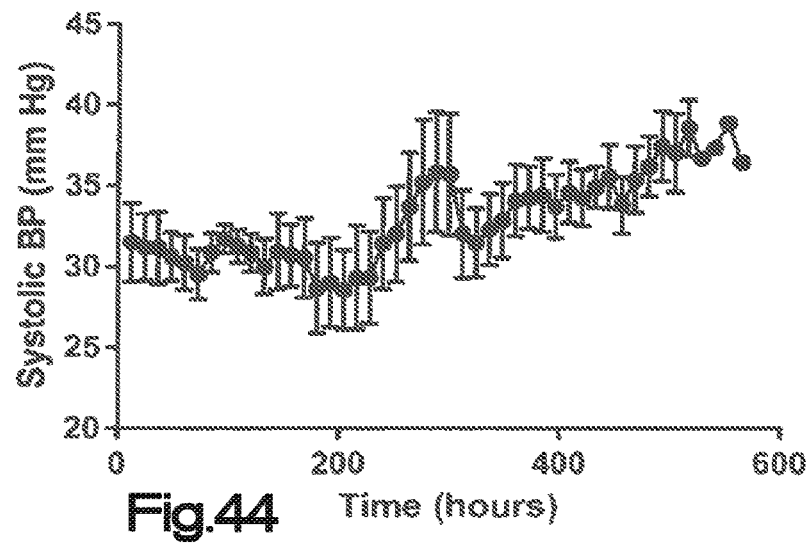
FIG. 44 is a second graph illustrating experimental results.
Figure 45:
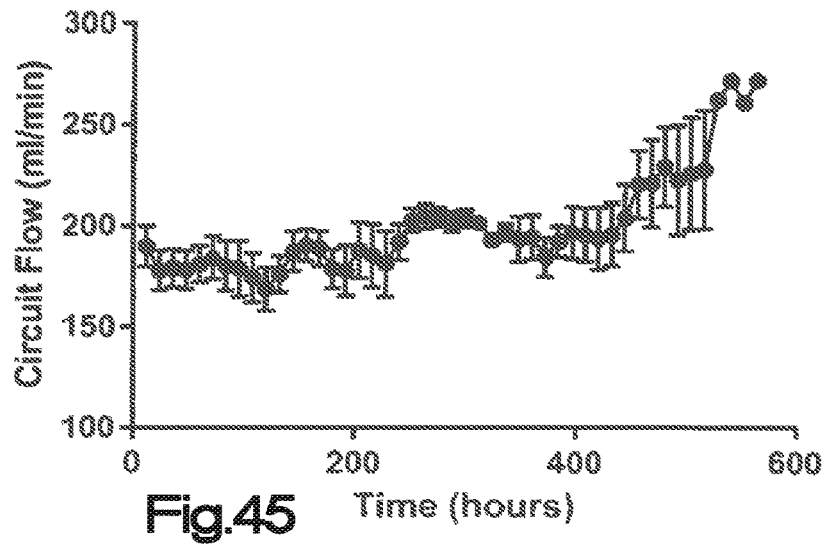
FIG. 45 is a third graph illustrating experimental results.
Figure 46:
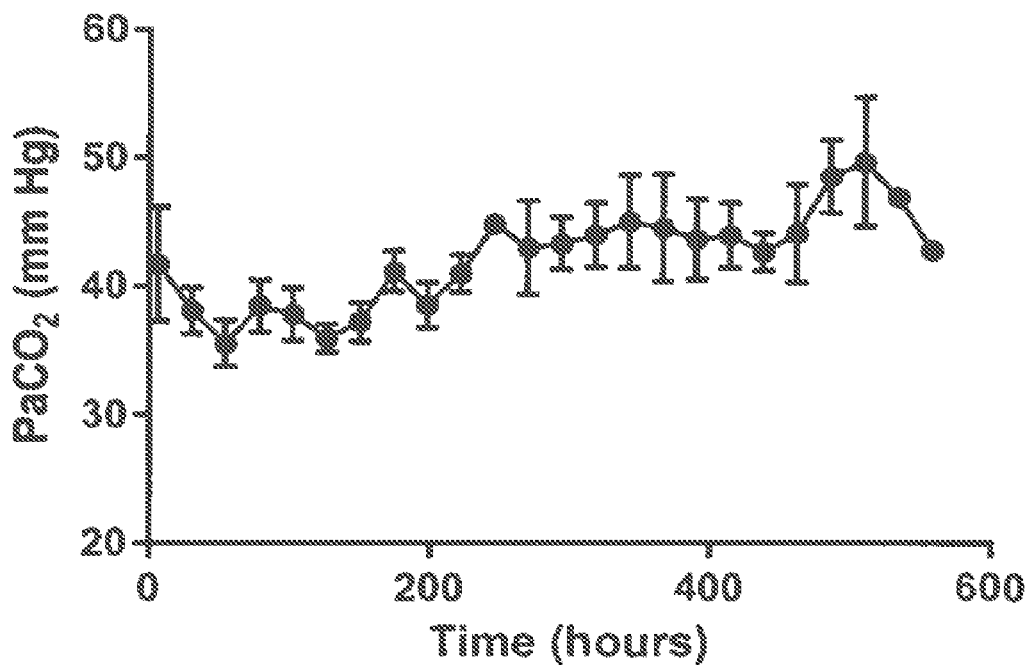
FIG. 46 is a fourth graph illustrating experimental results.
Figure 47:
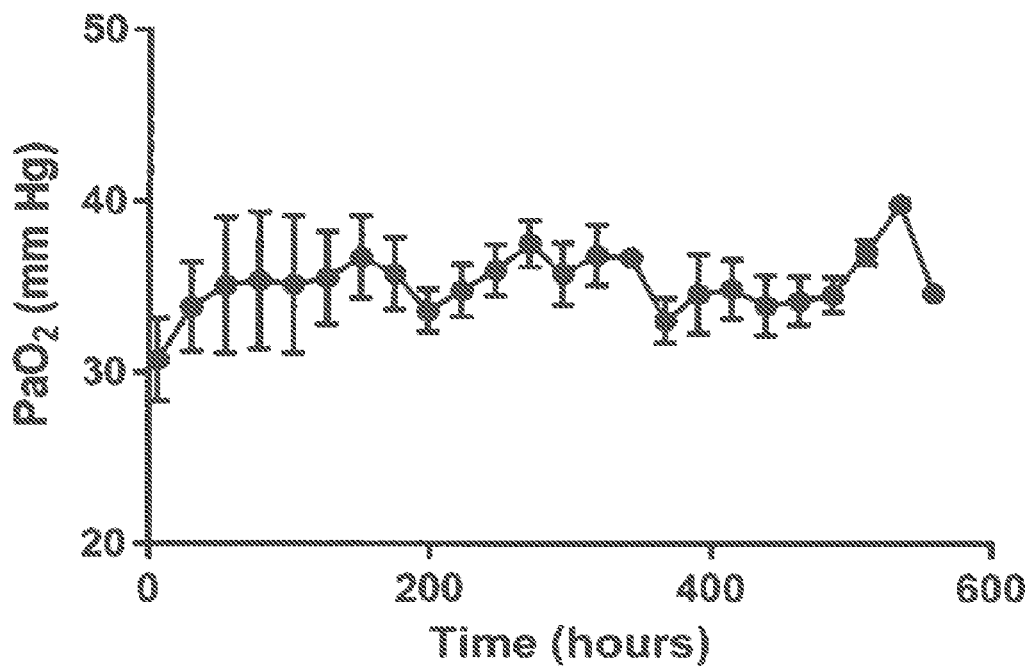
FIG. 47 is a fifth graph illustrating experimental results.
Figure 48:
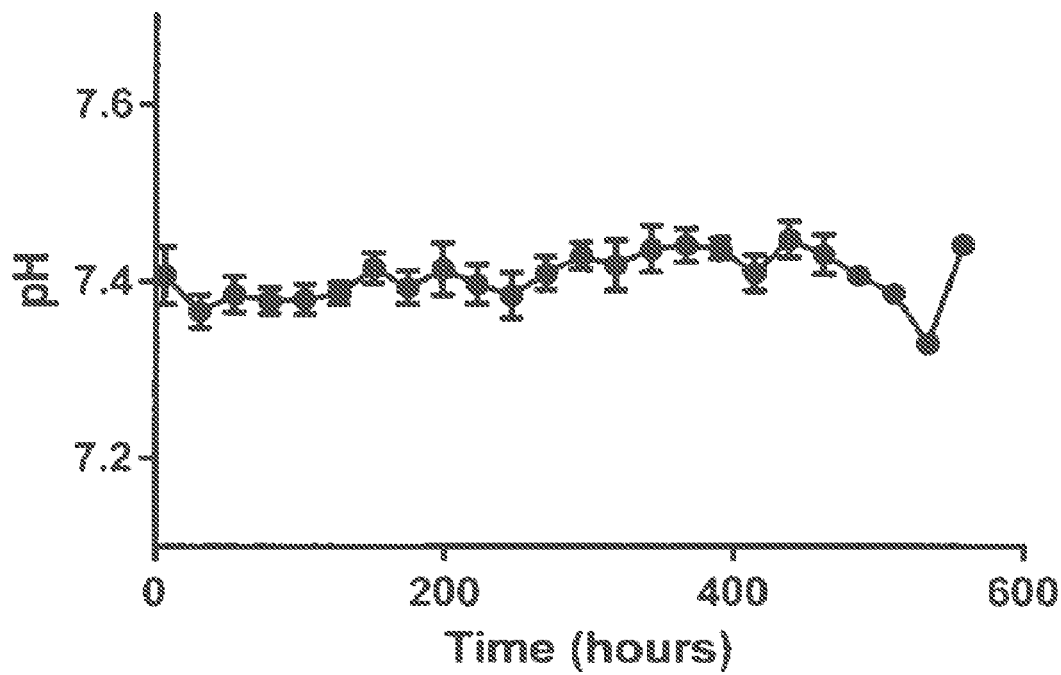
FIG. 48 is a sixth graph illustrating experimental results.
Figure 49:
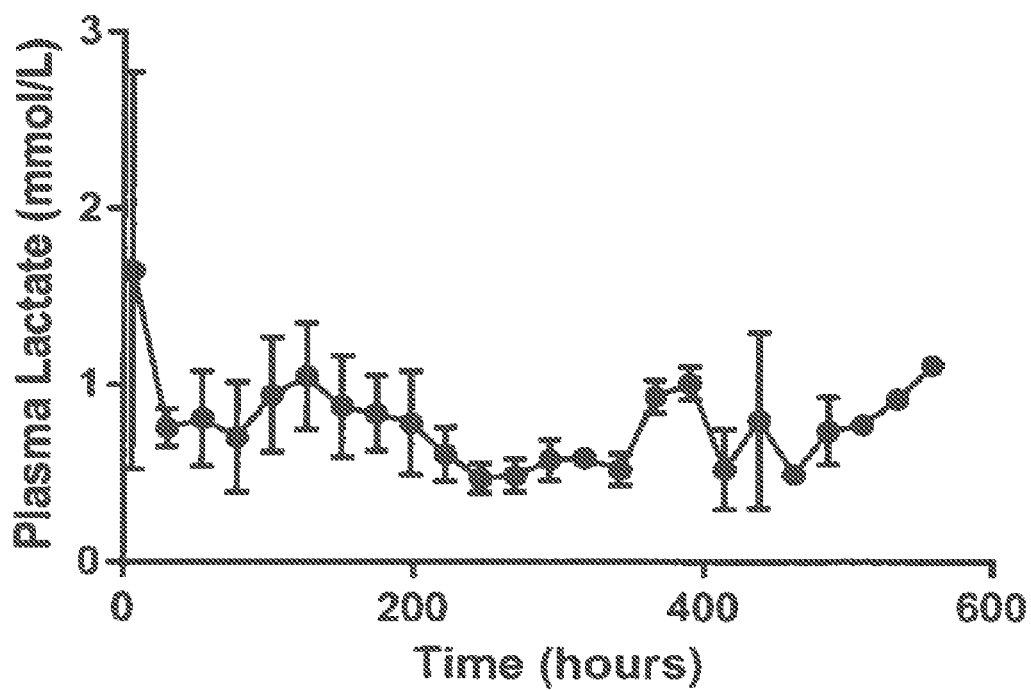
FIG. 49 is a seventh graph illustrating experimental results.
Figure 51:
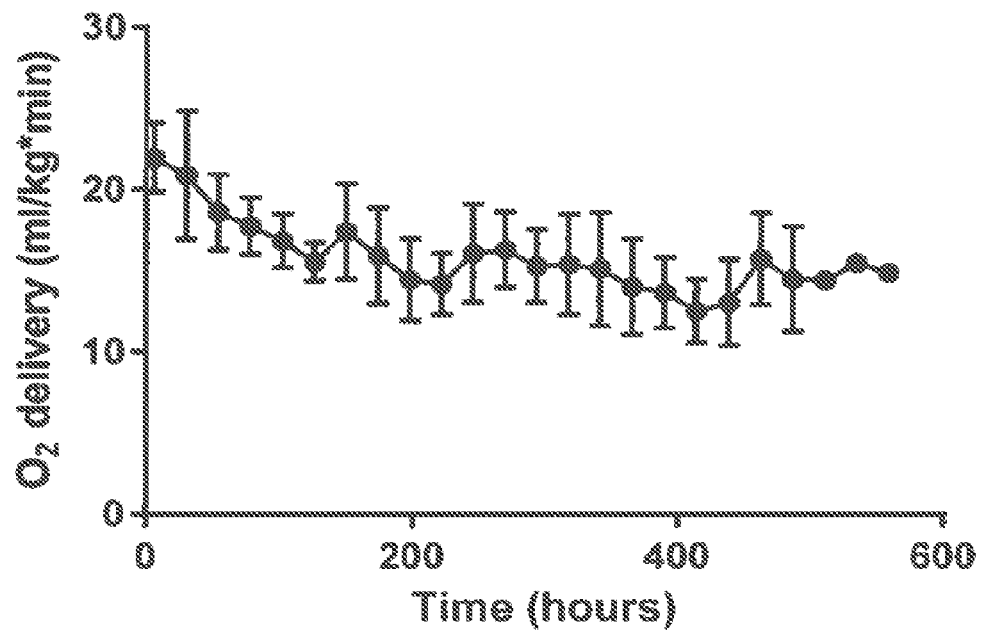
FIG. 51 is an eighth graph illustrating experimental results.
Figure 52:
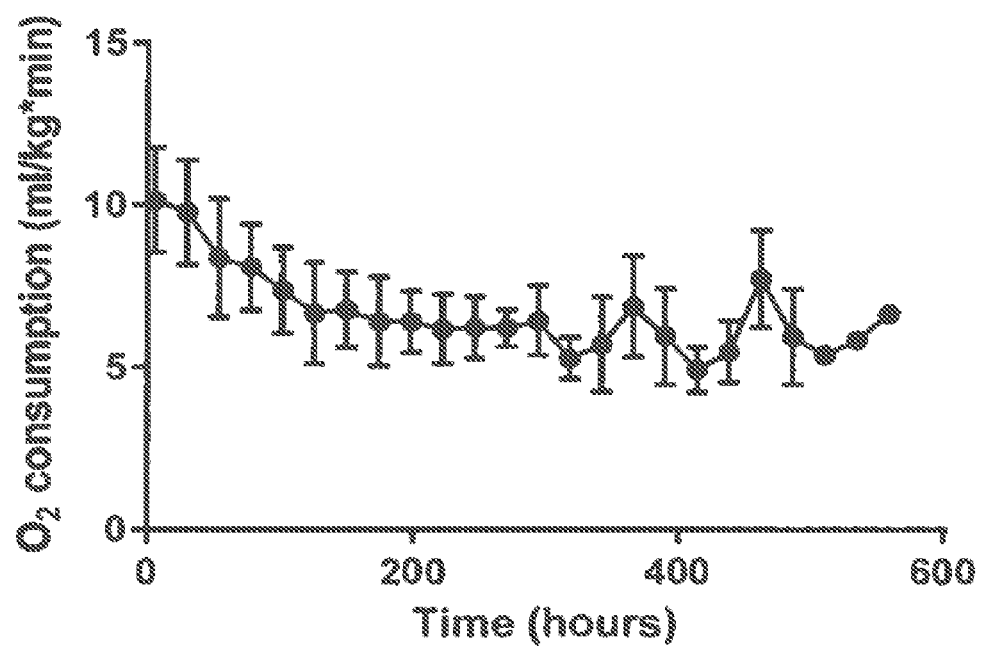
FIG. 52 is a ninth graph illustrating experimental results.
Figure 53:
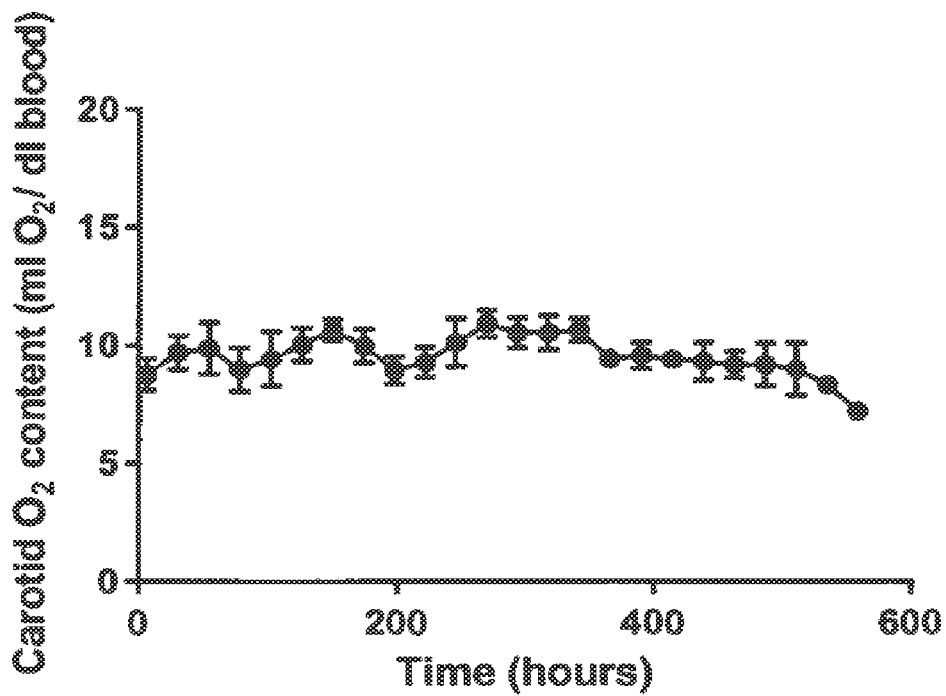
FIG. 53 is a tenth graph illustrating experimental results.
Figure 54:
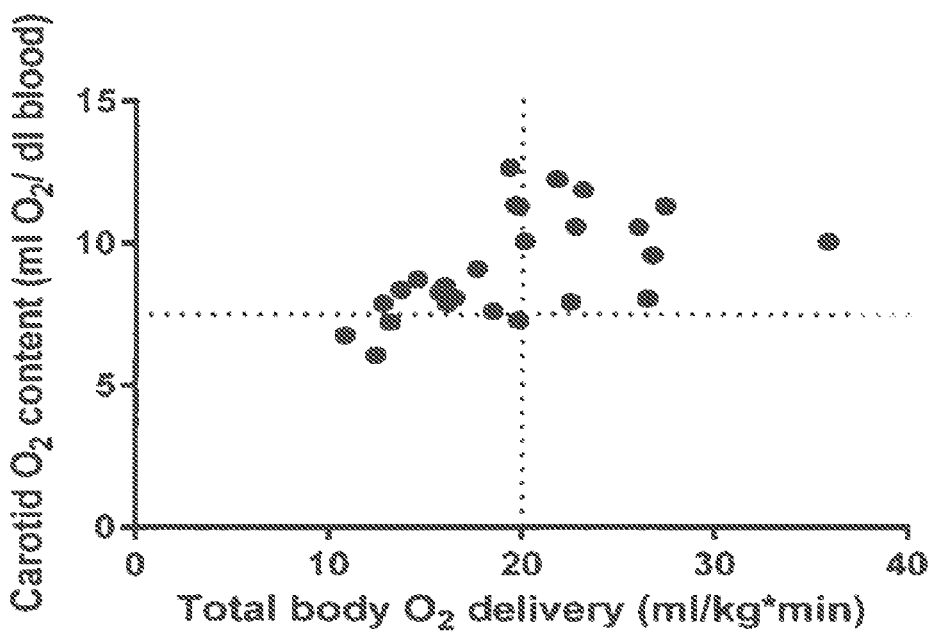
FIG. 54 is a eleventh graph illustrating experimental results.
Figures 56, 57:
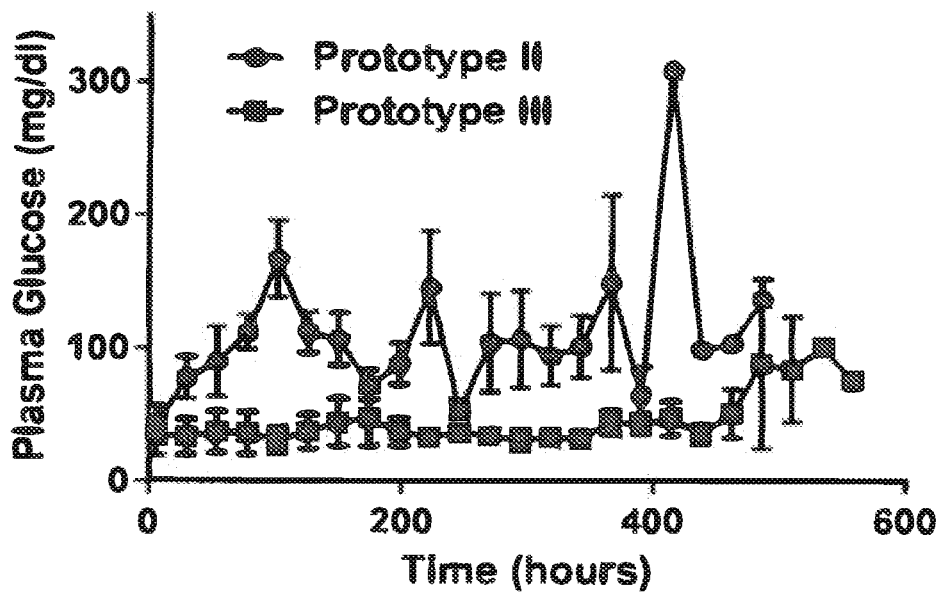
FIG. 56 is a third table illustrating experimental results.
FIG. 57 is a twelfth graph illustrating experimental results.
Figure 58:
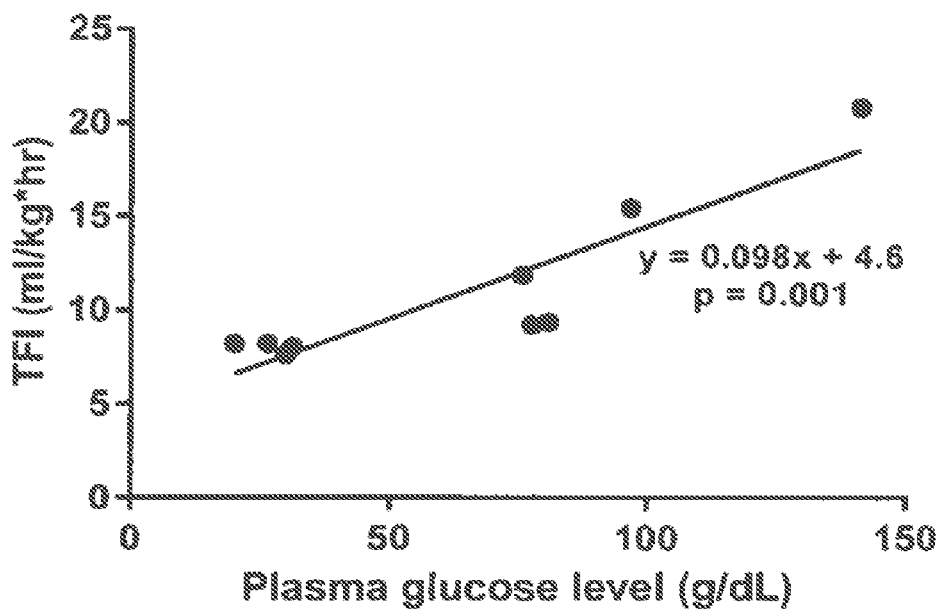
FIG. 58 is a thirteenth graph illustrating experimental results.
Figure 59:
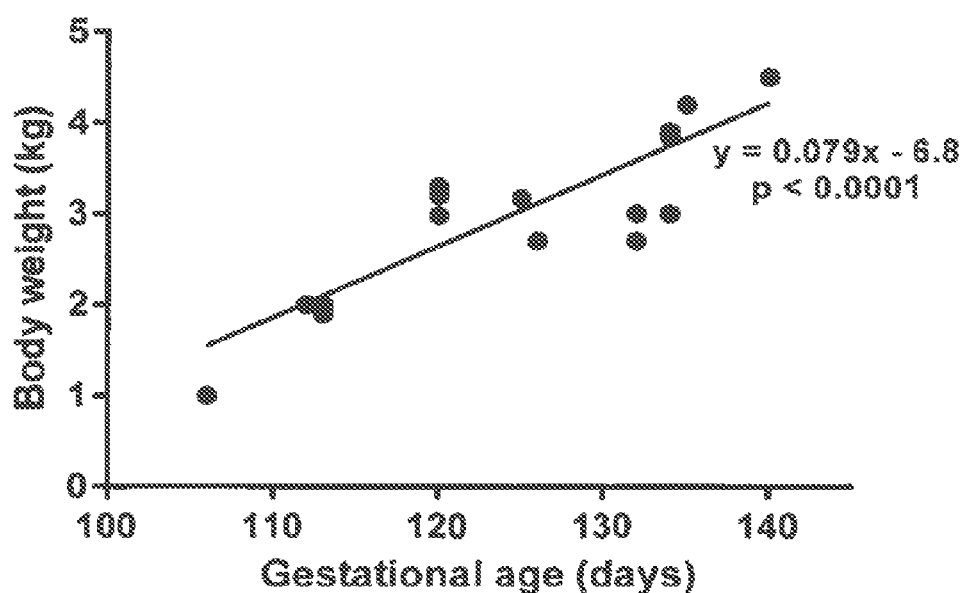
FIG. 59 is a fourteenth graph illustrating experimental results.
Figures 63, 64:
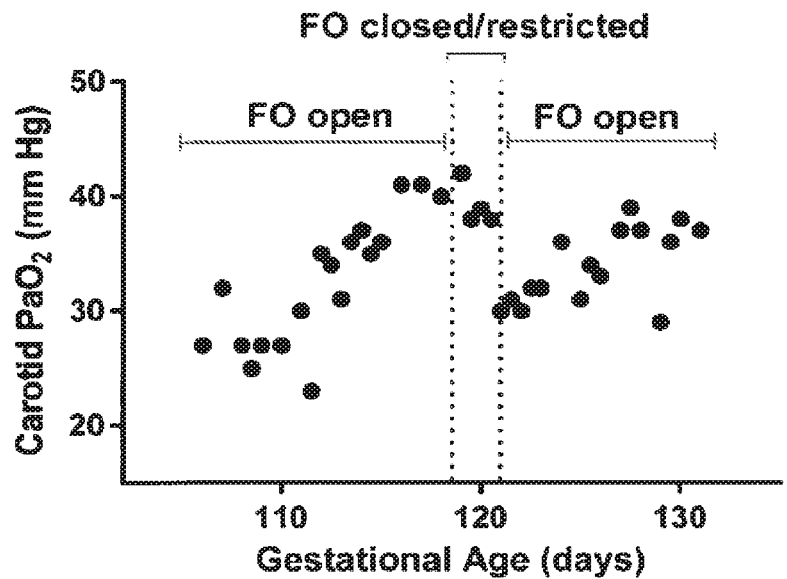
FIG. 63 is a seventeenth graph illustrating experimental results.
FIG. 64 is a fifth illustrating experimental results.

The ports were located as shown in FIG. 42. Port A is for inflow of amniotic fluid. Ports F and G are for an inline ultraviolet sterilization circuit (described below). Port C was used to detect fluid environment temperature and to remove trapped air from the lumen of the Biobag. Port H sits on the underside of the Biobag and allows amniotic fluid to drain out, along with meconium, urine, and other wastes. Port C has a 1-2" length of tubing attaching a Y-connector with a temperature probe and clave for air removal. Port D is used to detect bag pressure (described below). Ports B1, B2, E1, and E2 house the Bioline-coated Maquet ECMO tubing which traverses the wall of the Biobag while maintaining sterility. Only one of each of the B-type ports and E-types ports were used for a given patient. Within the bag the ECMO tubing was connected to the vascular cannulae (implanted into the carotid artery and umbilical vein), while outside of the bag the tubing was connected to the Maquet Quadrox oxygenator. The ECMO tubing was firmly secured to the Ports B and E using compression fittings secured to the threaded 1" port discs. Ports A, F, and G have a nylon quick-connect male fitting (http://www.mcmaster.com/#catalog/120/222/=tfgyvp) attached to the disc ports with a 1-2" length of tubing (http://www.coleparmer.com/Product/Masterflex PharMed BPT Tubing L S 15 25/EW-06508-15).

A high accuracy (+/−0.1 degree C.) thermistor probe (http://www.adinstruments.com/products/nasaltemperature-probes) was positioned within the bag and exits via port C. The thermistor connects to a temperature pod (http://www.adinstruments.com/products/temperature-pods) which itself was attached to an analog to digital converted (http://www.adinstruments.com/products/powerlab) connected to a windows 7 based PC running digital data logging software (LabChart, Version 7 or 8; http://www.adinstruments.com/products/labchart).

Amniotic Fluid Components: The ingredients for artificial amniotic fluid (sodium chloride, sodium bicarbonate, potassium chloride and calcium chloride dissolved in distilled water) are designed to mimic the ionic concentrations (Na+ 109, Cl− 100, HCO3− 20, K+ 6.5 and Ca2+ 1.6 mmol/L) and pH (7.0) of fetal sheep amniotic fluid. Ingredients are laboratory grade chemicals purchased from commercial vendors.

Batches of amniotic fluid (about 340 L) were mixed and filter sterilized (0.22 micrometers; http://www.emdmillipore.com/US/en/product/Standing-Stainless-Steel-Filter-Holders-%2890-and-142-mm%29, MM NF-C743) into heat-sterilized custom polypropylene carboys using a peristaltic pump. The process took about 60 minutes.

Delivery to Biobag. Sterile tubing from the glass carboys was connected to a peristaltic pump. After leaving the pump, the amniotic fluid passes through two in-line 0.22 filter cartridges (http://www.emdmillipore.com/US/en/product/WEllipak-Disposable-Filter Units,MM_NF-0523), and then through a stainless-steel heat exchanger to bring the fluid up to 39.5 degrees C. before being pumped into the BioBag. An ultrasonic clamp-on tubing flow probe and meter (http://www.transonic.com/search/?Keywords=ht110&display=search&newSearch=true&noCache=1) are used to monitor the rate of fluid deliver to the Biobag (about 50 ml/min). Amniotic fluid exits the Biobag by way of Port H located on the lower surface of the Biobag. A pressure device is incorporated into Port D to maintain pressure within the Biobag at about 8 to 10 mm Hg (normal amniotic fluid pressure in vivo). Waste amniotic fluid passes through a sterile trap prior to being sent to a floor drain. The Biobag temperature, pressure and amniotic flow were recorded on digital data logging software.

UV sterilization loop: In the current design, a peristaltic pump recirculates amniotic fluid in the Biobag (about 100 ml/min) through ports G and H after passing through an in-line, ultraviolet sterilization unit (http://www.mcmaster.com/#ultraviolet-water-purifiers/=tthkg0; catalog #8967T22). The device has broad spectrum antimicrobial properties.

Biobag heat regulation: In the current design, the Biobag rests atop a custom-designed aluminum water-heated plate to provide effective heat transfer via conduction. The heat plate is connected to a digitally controlled, recirculating water heater. A fluid-filled mattress sits atop the heat plate for greater heat control and cushioning for the animal. The heat plate, fluid cushion, and Biobag are placed within a 32 inches by 24 inches container that is covered by an insulating, transparent polycarbonate cover.

Fetal cardiopulmonary monitoring: Blood pressure was continuously recorded via ports on either side (i.e. arterial and venous limbs) of the Maquet oxygenator using clinical disposable pressure transducers (http://www.icumed.com/products/critical-care/pressure-monitoring-system/transpac-.aspx) connected to a bridge amplifier (http://www.adinstruments.com/products/bridge-amps) attached to the digital data logging system. Raw pressure signals are processed to calculate systolic and diastolic pressure, heart rate and the pressure difference across the oxygenator. An ultrasonic clamp-on tubing flow probe and meter (http://www.transonic.com/search/?Keywords=ht110&display=search&newSearch=true&noCache=1) were used to monitor the rate of blood flow to the patient.

The Biobag was used to apply extracorporeal support to earlier gestational fetuses. At earlier gestational ages (114 to 120 days gestation), we noticed greater instability at the time of cannulation and transition to the extracorporeal support system circuit resulting in bradycardia and sometimes asystole requiring atropine and epinephrine. Once on the circuit, diminishing circuit flows and progressive edema and electrolyte imbalance were encountered within a few days of cannulation necessitating a re-assessment of the physiology. In the normal fetus, there is preferential streaming of "oxygenated" umbilical venous return across the foramen ovale to the left sided circulation due to a combination of directed streaming of blood from the ductus venosus and the anatomic orientation of the foramen ovale.

In our system, return of oxygenated blood was via the superior vena cava. We postulated that this resulted in less efficient right to left flow of umbilical venous return, resulting in increased right-sided venous pressure. We also speculated that the acute increase in right-sided venous pressure, combined with the normally lower systemic blood pressure in earlier gestation lambs, would result in initial instability with subsequent reduced perfusion pressure across the membrane resulting in decreased flows, and eventually inadequate oxygen delivery in younger animals. We confirmed that right-sided venous pressures were elevated (measured abdominal IVC pressures 9.6+2 mm Hg vs. 4+2 mm Hg in normal fetuses) in the carotid artery and jugular vein cannulated animals and explored two solutions.

Our first approach was to utilize Angiotensin II, the primary vasoactive agent during mid-gestation that is present in high concentrations in the placenta, to increase systemic blood pressure and maintain perfusion pressure across the membrane. While instability during transition was still an issue requiring epinephrine, stability and circuit flows thereafter were much improved by a continuous angiotensin II infusion which could ultimately be tapered off after approximately 1 week on extracorporeal support system as systemic pressures increased. The other approach was utilization of the umbilical vein for venous return. While we initially used the jugular vein because of concern about umbilical venous spasm, we were able to cannulate the vein using a minimal manipulation technique with topical papaverine irrigation. The cannula was advanced to a position with the tip just inside the abdominal fascia and secured using a silastic cuff attached to the abdomen.

Umbilical cannulation immediately eliminated the instability during the transition to the extracorporeal support system circuit. Since initiation of the umbilical venous drainage approach, cannulation instability was significantly reduced and/or eliminated; there was no need for epinephrine, and no need for gradual initiation of circuit flow. We then opened flow to the oxygenator and immediately occluded the umbilical cord. Right-sided pressures were normal, there was an improvement in flow, and more efficient right to left transfer of oxygenated blood as demonstrated by increased carotid artery oxygen saturations and improved oxygen delivery. This approach therefore utilizes umbilical venous return with occasional Angiotensin II infusion to support systemic blood pressure, if such support is needed.

These procedures provided stable support of three lamb fetuses at 110 to 113 days gestation for up to 21 days on extracorporeal support system. From the perspective of lung development lambs at 110 to 113 days gestation are in the mid to late cannalicular phase of lung development, which is the biological equivalent of the 23 to 24 week gestation premature fetus. All three lambs demonstrated complete hemodynamic stability and stable physiologic parameters with grossly normal growth and development. After 21 days he was transitioned to mechanical ventilatory support with stable blood gases (7.48/46.7/132/99%) on minimal ventilator settings (SIMV, FiO2 30%, PIP 15 cm H20, CPAP 5 cm H20, Rate 20). He was weaning on ventilator support when he developed marked abdominal distention, respiratory decompensation, and was euthanized. He was subsequently found to have anileal intestinal obstruction due to what appeared to be inspissated meconium. The lungs appeared well developed and mature on histologic assessment with some evidence of ventilation induced injury.

These results demonstrate that extreme premature fetal lambs, corresponding biologically to a 23 to 24 week gestation premature fetus, can be supported in the extracorporeal support system for up to 3 weeks without apparent physiologic derangement or organ failure. This is in stark contrast to previously published results of attempted prolonged extracorporeal support of the fetus that have been uniformly associated with progressive cardiac failure and metabolic deterioration. The lambs are remarkably stable on the extracorporeal support system, maintain fetal circulatory pathways and metabolic parameters, and demonstrate evidence of normal maturation and growth. In addition, we have demonstrated transition to postnatal life with normal long-term survival after prolonged extracorporeal support.

There are a number of features of the current extracorporeal support system that contribute to this success. The first is an extremely low resistance oxygenator incorporated in a pumpless circuit with low surface area and priming volumes, connected to the fetal vasculature in an arterial to venous orientation. This system is comparable to the hemodynamics of the placenta itself as evidenced by the priming volumes and flows generated in our circuit. The reported placental blood volume of the sheep is 23.1 to 48.1 ml/kg, with normal placental blood flow reported as 199+/−20 ml/min/kg. Our circuit requires a priming volume of 80 to 90 ml, or 27 ml/kg for an average 120 day 3 kg fetal lamb, and flow rates in our system ranged from 90-140 ml/min/kg over our range of gestational ages. Although the flow rates are slightly less than the normal placenta, gas exchange via the oxygenator is highly efficient and near normal fetal blood gases and oxygen saturations can be maintained well within the sweep gas parameters of the oxygenator.

In addition, the pumpless design of the circuit allows for some degree of "autoregulation" of circuit flow by the fetal heart and vasculature. Flow in our circuit is dependent upon the size of the cannulas and the pressure gradient across the circuit. Our lambs consistently demonstrated the ability to increase blood pressure and flow in response to induced hypoxia by increasing systemic blood pressure. A second feature of the system is the fluid environment. The fetus in the extracorporeal support system demonstrates unimpeded fluid breathing and swallowing analogous to normal fetuses. This has resulted in normal lung development and maturation by histologic and functional criteria. A third feature is our improving ability to maintain a sterile amniotic fluid environment. The development of the Biobag with its closed design and antimicrobial features was a step forward and we aim to ultimately develop an entirely antibiotic free system. Finally, the ability to eliminate heparin reduced clinical concern related to hemorrhagic events.

Although we have applied the system to a biologically equivalent premature fetus, the 110 day fetal lamb is considerably larger (1.5-2 kg) than an extremely low birth weight premature fetus. The size equivalent fetal lamb is approximately 80 to 93 days (350 to 750 grams) and significant modifications of circuit design may be required. Antisepsis improvement is desired as well as the avoidance of conventional pharmacologic antibiotics. We have made major strides in the design of the extracorporeal support system and have seen no infection in the Biobag animals with systemic antibiotics.

It should be realized that extreme premature delivery is only anticipated 50% of the time. While a delivery directly from the uterus to the extracorporeal support system is the ideal, if a fetus could be briefly supported after delivery and placed onto extracorporeal support it would markedly expand application of this technology. This would of course require not only maintenance of a sterile system, but the ability to clear contamination from the system.

Finally, the implications of the extracorporeal support system extend beyond clinical application, and provide a model for addressing fundamental questions regarding the role of the placenta in fetal development. Long-term physiologic maintenance of a fetus amputated from the maternal-placental axis has now been achieved, making it possible to study the relative contribution of this organ to fetal maturation. The system can also be used to bridge the transition from fetal to postnatal life, which may be applied to models of congenital lung disease to expand the window of opportunity for therapeutic interventions. The extracorporeal support system therefore represents a capability that has not been previously available for research in fetal physiology, and represents a powerful new resource for numerous translational clinical applications.

In light of the foregoing, it should be understood that this disclosure is not limited to the particular embodiments described herein, but is intended to include all changes and modifications that are within the scope and spirit of the disclosure as set forth in the claims.

The invention claimed is:

1. A method of using an extracorporeal system to support a human premature fetus in an extrauterine environment and maintain the human premature fetus during maturation, the extracorporeal system including a fetal chamber and a turbidity sensor and the method comprising the steps of:
   positioning the human premature fetus in the fetal chamber designed to hold the premature fetus in a heated bath of synthetic amniotic liquid;
   filling the fetal chamber with a quantity of synthetic amniotic liquid and heating the synthetic amniotic liquid to a temperature corresponding to a temperature of amniotic fluid in utero;
   using the turbidity sensor to monitor the synthetic amniotic liquid within the fetal chamber for a presence of stool from the human premature fetus wherein the presence of stool in the synthetic amniotic liquid thereby creates a contaminated synthetic amniotic liquid within the fetal chamber;
   sensing the presence of stool from the human premature fetus in the contaminated synthetic amniotic liquid within the fetal chamber by way of the turbidity sensor and in response thereto removing the contaminated synthetic amniotic liquid from the fetal chamber and introducing fresh synthetic amniotic liquid into the fetal chamber to maintain a liquid level within the fetal chamber.

2. The method of claim 1 wherein the turbidity sensor is electronically connected to a central controller comprising a computer and a display and further comprising the step of the central controller receiving one or more signals from the turbidity sensor.

3. The method of claim 2 wherein the extracorporeal system includes a synthetic amniotic liquid inlet to the fetal chamber and a contaminated synthetic amniotic liquid outlet from the fetal chamber and further comprising the step of the central controller, in response to receiving the one or more signals from the turbidity sensor, causing the contaminated synthetic amniotic liquid to exit the fetal chamber through the synthetic amniotic liquid outlet and the fresh synthetic amniotic liquid to be introduced into the fetal chamber.

4. The method of claim 3 wherein the extracorporeal system includes a pump located on a contaminated synthetic amniotic liquid drain line connected to the contaminated synthetic amniotic liquid outlet and the central controller causes the pump to withdraw the contaminated synthetic amniotic liquid from the fetal chamber in response to receiving the one or more signals from the turbidity sensor.

5. The method of claim 1 wherein the fetal chamber has an expandable inner volume and the method includes the step of expanding the inner volume of the fetal chamber without opening the fetal chamber in response to growth of the human premature fetus.

6. The method of claim 4 wherein the extracorporeal system further includes a fresh synthetic amniotic liquid inlet line connected to the synthetic amniotic liquid inlet and a control valve and a fluid flow meter on the inlet line and further comprising the step of using the central controller to regulate flow of fresh synthetic amniotic liquid into the fetal chamber by controlling the control valve in response to input from the fluid flow meter.

7. An extracorporeal system to support a human premature fetus in a synthetic amniotic liquid and maintain the fetus during maturation, the extracorporeal system comprising:
  a fetal chamber for positioning and holding the premature fetus, wherein the fetal chamber has a lower perimeter forming a wall structure capable of holding a volume of synthetic amniotic liquid surrounding the premature fetus, wherein the fetal chamber can be enclosed to provide an enclosed environment, and wherein the wall structure is a flexible wall such that an interior volume defined by the fetal chamber is adjustable;
  a synthetic amniotic liquid circuit configured to provide fresh synthetic amniotic liquid to the fetal chamber such that the fresh synthetic amniotic liquid surrounds the premature fetus and to remove contaminated amniotic liquid from the fetal chamber, the synthetic amniotic liquid circuit having an inlet line connected to a liquid inlet port of the fetal chamber for transporting fresh synthetic amniotic liquid into the fetal chamber and an outlet line connected to a liquid outlet port of the fetal chamber for removing a quantity of synthetic amniotic liquid from the fetal chamber;
  means for heating the synthetic amniotic liquid within the fetal chamber to a temperature corresponding to a temperature of amniotic fluid in utero;
  a turbidity sensor associated with the fetal chamber to monitor the synthetic amniotic liquid surrounding the premature fetus within the fetal chamber for a presence of stool from the human premature fetus wherein the presence of stool in the synthetic amniotic liquid thereby creates a contaminated synthetic amniotic liquid within the fetal chamber; and
  a central controller comprising a computer and a display, wherein the central controller is configured to receive signals from the turbidity sensor reflecting that there is contaminated synthetic amniotic liquid within the fetal chamber.

8. The extracorporeal system of claim 7, further comprising a discharge pump positioned on the outlet line to pump contaminated synthetic amniotic liquid from the fetal chamber.

9. The extracorporeal system of claim 8, wherein the central controller regulates the discharge pump.

10. The extracorporeal system of claim 9, wherein the system is configured such that a signal from the turbidity sensor to the central controller reflecting that there is contaminated synthetic amniotic liquid within the fetal chamber causes the central controller to regulate the discharge pump to pump contaminated synthetic amniotic liquid from the fetal chamber.

11. The extracorporeal system of claim 10, wherein the system further includes a pressure sensor to monitor a liquid pressure within the fetal chamber.

12. The extracorporeal system of claim 11, wherein the system is further configured such that the central controller also controls a flow of fresh synthetic amniotic liquid through the inlet line into the fetal chamber to maintain a set liquid pressure within the fetal chamber.

13. The extracorporeal system of claim 7, further comprising a heater located on the inlet line configured to heat the fresh synthetic amniotic liquid being transported into the fetal chamber.

14. The extracorporeal system of claim 7, further comprising a fluid line coupleable to an umbilical cord of a fetus, the fluid line extending from an interior side to an exterior side of the fetal chamber.

15. The extracorporeal system of claim 7, wherein the fetal chamber includes a first end and a second end opposite the first end in a longitudinal direction, and
  wherein the liquid inlet port and the liquid outlet port are spaced from each other in the longitudinal direction.

\* \* \* \* \*